US010976076B2

(12) United States Patent
Chen et al.

(10) Patent No.: US 10,976,076 B2
(45) Date of Patent: Apr. 13, 2021

(54) METHODS, APPARATUS AND SYSTEMS FOR GENERATING AND SUPERHEATING VAPOR UNDER SUNLIGHT

(71) Applicants: Gang Chen, Carlisle, MA (US); Svetlana Boriskina, Winchester, MA (US); George Ni, Waltham, MA (US); Thomas Cooper, Toronto (CA); Seyed Hadi Zandavi, Cambridge, MA (US)

(72) Inventors: Gang Chen, Carlisle, MA (US); Svetlana Boriskina, Winchester, MA (US); George Ni, Waltham, MA (US); Thomas Cooper, Toronto (CA); Seyed Hadi Zandavi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 248 days.

(21) Appl. No.: 16/153,352

(22) Filed: Oct. 5, 2018

(65) Prior Publication Data
US 2020/0109877 A1    Apr. 9, 2020

(51) Int. Cl.
*F24S 10/17*    (2018.01)
*F24S 10/30*    (2018.01)
(Continued)

(52) U.S. Cl.
CPC ............. *F24S 10/17* (2018.05); *F24S 10/30* (2018.05); *F24S 10/80* (2018.05); *F24S 20/70* (2018.05);
(Continued)

(58) Field of Classification Search
CPC .. F24S 10/17; F24S 10/30; F24S 10/80; F24S 60/00; F24S 70/60; F24S 80/60;
(Continued)

(56) References Cited

U.S. PATENT DOCUMENTS 2,820,744 A * 1/1958 Lighter ................ C02F 1/14
202/234
3,501,381 A * 3/1970 Delano ................ B01D 1/0005
202/83
(Continued)

FOREIGN PATENT DOCUMENTS

WO    WO-8504159 A1 *  9/1985    .............. C02F 1/047

OTHER PUBLICATIONS

Zhang et al., "Floating rGO-based black membranes for solar driven sterilization." Nanoscale 9.48 (2017): 19384-19389.
(Continued)

*Primary Examiner* — Jorge A Pereiro
(74) *Attorney, Agent, or Firm* — Smith Baluch LLP

(57) ABSTRACT

A solar vapor generator includes an absorber to absorb sunlight and an emitter, in thermal communication with the absorber, to radiatively evaporate a liquid under less than 1 sun illumination and without pressurization. The emitter is physically separated from the liquid, substantially reducing fouling of the emitter. The absorber and the emitter may also be heated to temperatures higher than the boiling point of the liquid and may thus may be used to further superheat the vapor. Solar vapor generation can provide the basis for many sustainable desalination, sanitization, and process heating technologies.

23 Claims, 51 Drawing Sheets

(51) Int. Cl.
*F24S 10/80* (2018.01)
*F24S 60/00* (2018.01)
*F24S 70/60* (2018.01)
*F24S 80/60* (2018.01)
*F24S 20/70* (2018.01)
*F24S 23/00* (2018.01)

(52) U.S. Cl.
CPC ............... *F24S 60/00* (2018.05); *F24S 70/60* (2018.05); *F24S 80/60* (2018.05); *F24S 23/00* (2018.05)

(58) Field of Classification Search
CPC .. F24S 20/70; F24S 23/00; F24S 80/30; F24S 70/225; F24S 60/10; F24S 50/80; F24S 2080/502; F24S 80/56; F24S 10/10; F24S 80/65; Y02A 20/142; Y02E 10/44; Y02E 10/47; Y02W 10/37; C02F 2103/08; C02F 1/14; F22B 1/006
See application file for complete search history.

(56) References Cited

U.S. PATENT DOCUMENTS

| | | | | |
|---|---|---|---|---|
| 3,558,436 A * | 1/1971 | Foley et al. | ........... | B01D 3/106 202/196 |
| 3,565,767 A * | 2/1971 | Light | ........... | C02F 1/04 203/11 |
| 4,110,172 A * | 8/1978 | Spears, Jr. | ........... | C02F 1/10 202/234 |
| 4,166,445 A * | 9/1979 | McGraw | ........... | F24S 10/80 126/634 |
| 4,210,494 A * | 7/1980 | Rhodes | ........... | C02F 1/14 203/10 |
| 4,292,136 A * | 9/1981 | Clavier | ........... | B01D 5/0066 202/234 |
| 4,363,703 A * | 12/1982 | ElDifrawi | ........... | B01D 3/346 203/10 |
| 4,383,891 A * | 5/1983 | Clavier | ........... | F24S 23/30 202/234 |
| 4,406,749 A * | 9/1983 | Wetzel | ........... | C02F 1/14 202/234 |
| 4,596,237 A * | 6/1986 | Melchior | ........... | F24S 60/10 126/618 |
| 4,771,763 A * | 9/1988 | Wetzel, Jr. | ........... | F24S 90/00 126/646 |
| 5,650,050 A * | 7/1997 | Kaufmann | ........... | B01D 1/16 202/234 |
| 6,165,326 A * | 12/2000 | Markopulos | ........... | B01D 3/007 202/234 |
| 6,615,906 B1 * | 9/2003 | Fieback | ........... | C09K 5/063 165/10 |
| 8,833,092 B1 * | 9/2014 | Sobhani | ........... | E03B 3/28 62/93 |
| 2010/0080540 A1 * | 4/2010 | Berger | ........... | F22B 1/285 392/394 |
| 2011/0197879 A1 * | 8/2011 | Levin | ........... | F24S 70/225 126/636 |
| 2012/0298499 A1 * | 11/2012 | Lee | ........... | B01D 3/00 203/10 |
| 2015/0329378 A1 * | 11/2015 | Polk, Jr. | ........... | B01D 3/146 203/11 |
| 2015/0353379 A1 * | 12/2015 | Lee | ........... | B01D 5/0006 203/10 |
| 2016/0057948 A1 * | 3/2016 | Alkhazraji | ........... | B01D 5/0066 202/189 |
| 2016/0059148 A1 * | 3/2016 | Alkhazraji | ........... | B01D 1/0005 202/189 |
| 2016/0060136 A1 * | 3/2016 | Alkhazraji | ........... | B01D 5/0057 202/186 |
| 2016/0164451 A1 * | 6/2016 | Lenert | ........... | H01L 31/02164 136/253 |
| 2017/0038097 A1 * | 2/2017 | Ni | ........... | F24S 80/525 |
| 2017/0158525 A1 * | 6/2017 | Calene | ........... | C02F 1/14 |
| 2017/0246592 A1 * | 8/2017 | Li | ........... | B01D 67/0088 |
| 2017/0355617 A1 * | 12/2017 | Wang | ........... | B01D 1/0058 |
| 2018/0327279 A1 * | 11/2018 | Yu | ........... | B01J 20/24 |
| 2018/0356127 A1 * | 12/2018 | Hu | ........... | B01D 1/0005 |
| 2020/0101420 A1 * | 4/2020 | Jang | ........... | B01D 1/0035 |

OTHER PUBLICATIONS

Zhou et al., "3D self-assembly of aluminium nanoparticles for plasmon-enhanced solar desalination." Nature Photonics 10.6 (2016): 393. 6 pages.
Zhou et al., "Self-assembly of highly efficient, broadband plasmonic absorbers for solar steam generation." Science Advances 2.4 (2016): e1501227. 9 pages.
Zhu et al., "Transmittance of transparent windows with non-absorbing cap-shaped droplets condensed on their backside." Journal of Quantitative Spectroscopy and Radiative Transfer 194 (2017): 98-107.
Aggarwal et al., "Convective mass transfer in a double-condensing chamber and a conventional solar still." (1998). 8 pages.
Argiriou et al., "Active solar space heating of residential buildings in northern Hellas—a case study." Energy and buildings 26.2 (1997): 215-222.
ASTM. Standard G173-03—Standard Tables for Reference Solar Spectral Irradiances?: Direct Normal and Hemispherical on 37° Tilted Surface. 03, (2013). 21 pages.
Bae et al., "Flexible thin-film black gold membranes with ultrabroadband plasmonic nanofocusing for efficient solar vapour generation." Nature communications 6 (2015): 10103. 9 pages.
Bertie et al., "Infrared intensities of liquids XX: The intensity of the OH stretching band of liquid water revisited, and the best current values of the optical constants of H2O (I) at 25 C between 15,000 and 1 cm? 1." Applied Spectroscopy 50.8 (1996): 1047-1057.
Cengel, Heat Transfer: A Practical Approach. Second Edition (McGraw-Hill, 2003). 874 pages.
Cowlard et al., "Vitreous carbon—a new form of carbon." Journal of Materials Science 2.6 (1967): 507-512.
Ghasemi et al., "Solar steam generation by heat localization." Nature communications 5 (2014): ncomms5449. 8 pages.
Hale et al., "Optical constants of water in the 200-nm to 200-µm wavelength region." Applied optics 12.3 (1973): 555-563.
Harvey, W. D. et al. Measurements of total hemispherical emittance for chromel and for alumel wires, NASA TM-X-2359. (1971). 12 pages.
Hu et al., "Tailoring Graphene Oxide Based Aerogels for Efficient Solar Steam Generation under One Sun." Advanced materials 29.5 (2017): 1604031. 5 pages.
Ito et al., "Multifunctional Porous Graphene for High?Efficiency Steam Generation by Heat Localization." Advanced Materials 27.29 (2015): 4302-4307.
Kabeel et al., "Review of researches and developments on solar stills." Desalination 276.1-3 (2011): 1-12.
Kalogirou, "The potential of solar industrial process heat applications." Applied Energy 76.4 (2003): 337-361.
Li et al., "Graphene oxide-based efficient and scalable solar desalination under one sun with a confined 2D water path." Proceedings of the National Academy of Sciences 113.49 (2016): 13953-13958.
Liu et al., "A bioinspired, reusable, paper-based system for high-performance large-scale evaporation." Advanced Materials 27.17 (2015): 2768-2774.
Liu et al., "Extremely Cost-Effective and Efficient Solar Vapor Generation under Nonconcentrated Illumination Using Thermally Isolated Black Paper." Global Challenges 1.2 (2017): 1600003. 10 pages.
Mohammadasajadi et al., "A flexible anti-clogging graphite film for scalable solar desalination by heat localization." Journal of Materials Chemistry A 5.29 (2017): 15227-15234.
Morciano et al., "Efficient steam generation by inexpensive narrow gap evaporation device for solar applications." Scientific reports 7.1 (2017): 11970. 9 pages.

(56) References Cited

OTHER PUBLICATIONS

Neumann et al., "Compact solar autoclave based on steam generation using broadband light-harvesting nanoparticles." Proceedings of the National Academy of Sciences 110.29 (2013): 11677-11681.
Neumann et al., "Solar vapor generation enabled by nanoparticles." ACS nano 7.1 (2012): 42-49.
Ni et al., "A salt-rejecting floating solar still for low-cost desalination." Energy & Environmental Science 11.6 (2018): 1510-1519.
Ni et al., "Steam generation under one sun enabled by a floating structure with thermal concentration." Nature Energy 1.9 (2016): nenergy2016126. 19 pages.
Ni et al., "Volumetric solar heating of nanofluids for direct vapor generation." Nano Energy 17 (2015): 290-301.
NIST Standard Reference Simulation Website. (National Institute of Standards and Technology). Accessed at doi: http://doi.org/10.18434/T4M88Q on Feb. 6, 2018. 4 pages.
Nukiyama, "The maximum and minimum values of the heat Q transmitted from metal to boiling water under atmospheric pressure." International Journal of Heat and Mass Transfer 9.12 (1966): 1419-1433.
Orgill et al., "Correlation equation for hourly diffuse radiation on a horizontal surface." Solar energy 19.4 (1977): 357-359.
Otanicar et al., "Nanofluid-based direct absorption solar collector." Journal of renewable and sustainable energy 2.3 (2010): 033102. 14 pages.
Persad et al., "Expressions for the evaporation and condensation coefficients in the Hertz-Knudsen relation." Chemical reviews 116. 14 (2016): 7727-7767.
Qiblawey et al., "Solar thermal desalination technologies." Desalination 220.1-3 (2008): 633-644.
Rabl, "Comparison of solar concentrators." Solar energy 18.2 (1976): 93-111.
Reda et al., "Solar position algorithm for solar radiation applications." Solar energy 76.5 (2004): 577-589.
Shang et al., "Solar steam generation: Steam by thermal concentration." Nature Energy 1.9 (2016): 16133. 2 pages.
Sharqawy et al., "Thermophysical properties of seawater: a review of existing correlations and data." Desalination and water Treatment 16.1-3 (2010): 354-380.
Shurcliff, "Transmittance and Reflection Loss of Multi-plate Planar Window of a Solar-radiation Collector: Formulas and Tabulations of Results for the case n= 1 • 5." Solar Energy 16.3-4 (1974): 149-154.
Sodha et al., "Double basin solar still." Energy Conversion and Management 20.1 (1980): 23-32.
Surwade et al., "Water desalination using nanoporous single-layer graphene." Nature nanotechnology 10.5 (2015): 459-464.
Tao et al. "Solar-driven interfacial evaporation." Nature Energy (2018), 11 pages.
Taylor et al., "Applicability of nanofluids in high flux solar collectors." Journal of Renewable and Sustainable Energy 3.2 (2011): 023104. 16 pages.
Tiwari et al., "Present status of solar distillation." Solar energy 75.5 (2003): 367-373.
Tow, "The antireflective potential of dropwise condensation." JOSA A 31.3 (2014): 493-499.
Wang et al., "Evaporation: Bio-Inspired Evaporation Through Plasmonic Film of Nanoparticles at the Air—Water Interface (Small 16/2014)." Small 10.16 (2014): 3233-3233.
Wang et al., "Paper-based membranes on silicone floaters for efficient and fast solar-driven interfacial evaporation under one sun." Journal of Materials Chemistry A 5.31 (2017): 16359-16368.
Wang et al., "Solar steam generation through bio-inspired interface heating of broadband-absorbing plasmonic membranes." Applied energy 195 (2017): 414-425.
Weinstein et al., "Concentrating solar power." Chemical reviews 115.23 (2015): 12797-12838.
Whitaker, "Forced convection heat transfer correlations for flow in pipes, past flat plates, single cylinders, single spheres, and for flow in packed beds and tube bundles." AIChE Journal 18.2 (1972): 361-371.
Widyolar et al., "Performance of the Merced demonstration XCPC collector and double effect chiller." Journal of Solar Energy Engineering 136.4 (2014): 041009. 14 pages.
Xu et al., "Mushrooms as Efficient Solar Steam?Generation Devices." Advanced Materials 29.28 (2017): 1606762. 5 pages.
Yang et al., "Functionalized graphene enables highly efficient solar thermal steam generation." ACS nano 11.6 (2017): 5510-5518.
Zeng et al., "Solar evaporation enhancement using floating light-absorbing magnetic particles." Energy & Environmental Science 4.10 (2011): 4074-4078.

* cited by examiner

| | |
|---|---|
| Gain heat transfer coefficient, $U_{gain}$ | 12.8 W m$^{-2}$K$^{-1}$ |
| Loss heat transfer coefficient, $U_{loss}$ | 4.6 W m$^{-2}$K$^{-1}$ |
| Superheater effectiveness, $\varepsilon$ | 0.8 |
| Optical efficiency, $\eta_{opt}$ | 0.758 |
| Break-even flux, $\dot{q}_{solar,0}$ | 452 W m$^{-2}$ |
| Maximum efficiency, $\eta_{max}$ | 0.566 |

FIG. 17A

| FEP film, 50 μm thick | |
|---|---|
| Solar transmittance, $\tau_{solar}$ | 0.951 |
| Infrared transmittance, $\tau_{IR}$ | 0.454 |
| Selective surface | |
| Solar absorptance, $\alpha_{ss}$ | 0.924 |
| Emittance at 150 °C, $\epsilon_{ss}$ | 0.081 |
| Emitter coating | |
| Emittance at 150 °C, $\epsilon_e$ | 0.941 |

FIG. 20

METHODS, APPARATUS AND SYSTEMS FOR GENERATING AND SUPERHEATING VAPOR UNDER SUNLIGHT

GOVERNMENT SUPPORT

This invention was made with Government support under Grant No. DE-SC0001299 awarded by the Department of Energy. The Government has certain rights in the invention.

BACKGROUND

The sun is a vast source of clean, renewable energy, which when harnessed, may reduce humanity's reliance on non-renewable and polluting fossil fuels (e.g., crude oil, coal, or natural gas). Solar energy is capable of being transformed into several useful forms including electricity, various chemical fuels, and heat. In particular, heat generated from solar energy has been shown to have several uses including, but not limited to, driving various industrial processes (e.g., cooking, washing, drying), heating residential or commercial spaces, and replacing fossil fuels as a heat source in conventional power plants. In yet another application, sunlight may be absorbed to produce heat that is then used to vaporize (i.e., evaporate and/or boil) a liquid. The resulting vapor (i.e., the gas phase of the liquid) may then be used in various applications including desalination (e.g., water purification), sterilization, or power generation (e.g., in a Rankine cycle). In the foregoing manners, heat derived from solar energy may reduce, or in some instances, replace conventional fossil-fuel based boilers.

SUMMARY

The present disclosure is directed to various implementations of a solar vapor generator for the generation and/or superheating of vapor from a liquid, respective components of the solar vapor generator, and methods relating to the same. In one example, the solar vapor generator includes an absorber in thermal communication with an emitter. The absorber absorbs incident sunlight, thus producing heat that is then transferred to the emitter via thermal conduction. The emitter then emits the heat as thermal radiation to radiatively heat and vaporize a liquid, thus producing vapor. In one aspect, since heat is transferred to the liquid via electromagnetic radiation (photons), the emitter may be physically separated from the liquid during operation, thereby substantially reducing fouling of the absorber and/or the emitter.

Furthermore, the absorber/emitter may be used to superheat the vapor. Thus, in some implementations the temperature of the vapor may be increased above the boiling point of the liquid at ambient pressure and/or without solar concentration. The superheated vapor generated by the concepts disclosed herein may be used in various applications including, but not limited to, sterilization (e.g., a solar vapor generator coupled to an autoclave to enable sterilization of medical equipment in remote locations with little access to electricity), cooking, laundering, absorption/adsorption cooling, and process heating, desalination, and waste water treatment. This process can also be used to heat liquids other than water. It should be appreciated that while the solar vapor generator may generate and superheat vapor at ambient pressure and/or without solar concentration, in some implementations, the solar vapor generator may be designed to be pressurized and/or include a solar concentrator.

In one exemplary implementation, a solar vapor generator includes an absorber to absorb sunlight, such that the sunlight is converted into heat. The solar vapor generator also includes a housing, where a first side of the absorber is disposed on the housing. The housing is used to transfer heat from the absorber to the emitter. The solar vapor generator also includes an emitter, disposed on a first side of the housing, to receive the heat from the housing and to emit at least a portion of the heat as thermal radiation. The solar vapor generator also includes a basin, mechanically coupled to the housing, to position the emitter such that the emitter is physically separated from a liquid. When the liquid is present, the liquid absorbs at least some of the thermal radiation close to the surface region of the liquid, and is thus vaporized, resulting in the generation of vapor.

The housing of the solar vapor generator may further include an interior cavity with an opening to admit the generated vapor into the interior cavity of the housing such that the vapor, when present, receives a portion of the heat from the housing as the vapor flows through the interior cavity. The housing may also include an outlet for the vapor to flow out of the solar vapor generator for subsequent consumption and/or use. In some implementations, the interior cavity of the housing may be filled, at least in part, by at least one of a porous material or a finned channel. The housing may further be formed from at least one of aluminum, copper, carbon steel, stainless steel, polypropylene, or polyethylene. A radiation shield may also be disposed between the emitter and the liquid to control the temperature of the vapor by reflecting a first portion of the thermal radiation back to the emitter. The radiation shield may include an aperture to transmit a second portion of the thermal radiation towards the liquid.

The solar vapor generator may further include the liquid, which may be at least one of water, glycol, hydrofluorocarbons, hydrocarbons, or perfluorocarbons. In some implementations, the basin may be comprised of a plurality of sidewalls that form a cavity with a first end and second end, to contain the liquid when present. The first end of the housing may be substantially open and mechanically coupled to the first side of the emitter, wherein the second end may be substantially closed. In some implementations, a first portion of the liquid may be proximate to the emitter and include a surface of the liquid that substantially absorbs the thermal radiation. In this case, the basin may be comprised of a plurality of sidewalls that form a cavity with a first end and a second end, the first end being substantially open and mechanically coupled to the first side of the emitter and the second end being substantially open and submerged in the liquid. A thermally insulating layer may be disposed within the cavity defined by the plurality of sidewalls and submerged in the liquid to substantially reduce the transport of heat from the first portion of the liquid to the remaining liquid. The thermally insulating layer may include one or more perforations to allow the liquid to flow through the thermally insulating layer. In some implementations, the thermally insulating layer may also provide sufficient buoyancy such that the absorber, the housing, and the emitter can float on the liquid. The solar vapor generator may also include at least one of a buoy or a weight, mechanically coupled to at least one of the housing or the basin, to adjust the position of the thermally insulating layer within the liquid.

In another exemplary implementation, a solar vapor generator includes an absorber to absorb sunlight, where the sunlight is converted into heat by the absorber. The solar vapor generator may also include a housing disposed on a first side of the absorber to transport the heat from the absorber to an emitter disposed on a first side of the housing.

The emitter may receive at least a portion of the heat and emit the portion of the heat as thermal radiation. The solar vapor generator may also include a basin disposed on a first side of the emitter and coupled to the housing, to contain a liquid that, when present, is physically separated from the emitter to absorb at least some of the thermal radiation and thereby undergo vaporization to generate a vapor. The housing may include at least one opening to allow the vapor to flow through the at least one opening into an interior cavity of the housing. The vapor may then receive a portion of the heat from the housing as it flows along a path through the interior cavity where the housing includes an outlet for the vapor to flow out of the solar vapor generator.

In some implementations, the emitter may emit the thermal radiation at one or more wavelengths corresponding to one or more absorption bands of the liquid, wherein each one of the absorption bands has a penetration depth up to 100 μm in the liquid, when present. The solar vapor generator may also include a thermally insulating cover, disposed on a second side of the absorber, to thermally insulate the absorber from a surrounding environment. The thermally insulating cover may include a first portion that is substantially transparent to the sunlight where the first portion is aligned to the absorber. In some implementations, the thermally insulating cover is at least one of a polymer glazing with one or more layers, or an aerogel, or an evacuated space. The solar vapor generator may also include a thermally insulating enclosure, substantially surrounding the absorber, the housing, the emitter, and the basin, to substantially inhibit the transfer of heat from the solar vapor generator to a surrounding environment. In some implementations, the solar vapor generator may also include a solar concentrator, in optical communication with the absorber, to increase the intensity of the sunlight from about 1 sun to about 20 suns.

In yet another exemplary implementation, a method of generating vapor may be comprised of the following steps: (1) absorbing at least a portion of sunlight incident on an absorber, (2) converting, by the absorber, at least a portion of the absorbed sunlight to heat, (3) transferring the heat from the absorber to an emitter, (4) emitting a first portion of the heat as thermal radiation from the emitter to a first liquid disposed proximate to the emitter so as to cause the first liquid to vaporize and produce a vapor, wherein the emitter is physically separated from the first liquid, and (5) heating the vapor using a second portion of the heat from the absorber. The method may also be preceded by the step of varying an intensity of the sunlight from about 0.5 suns to about 20 suns. The method may also include the steps of storing a third portion of the heat from the absorber in a thermal storage media and controllably generating or controllably heating the vapor based at least in part on the stored portion of the heat in the thermal storage media. In some implementations, the method may be followed by the steps of removing heat from the vapor so as to condense the vapor into a second liquid and transporting at least a portion of the heat removed from the vapor back to the emitter to evaporate the first liquid.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 17A is a table of model parameters used for the steady-state analysis of the solar vapor generator of FIG. 11A.

FIG. 20 of optical properties for various materials used in the solar vapor generator of FIG. 11A.

DETAILED DESCRIPTION

Following below are more detailed descriptions of various concepts related to, and implementations of, radiative-based solar vapor generation apparatuses and methods of generating and superheating vapor. It should be appreciated that various concepts introduced above and discussed in greater detail below may be implemented in numerous ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

Figure 1:
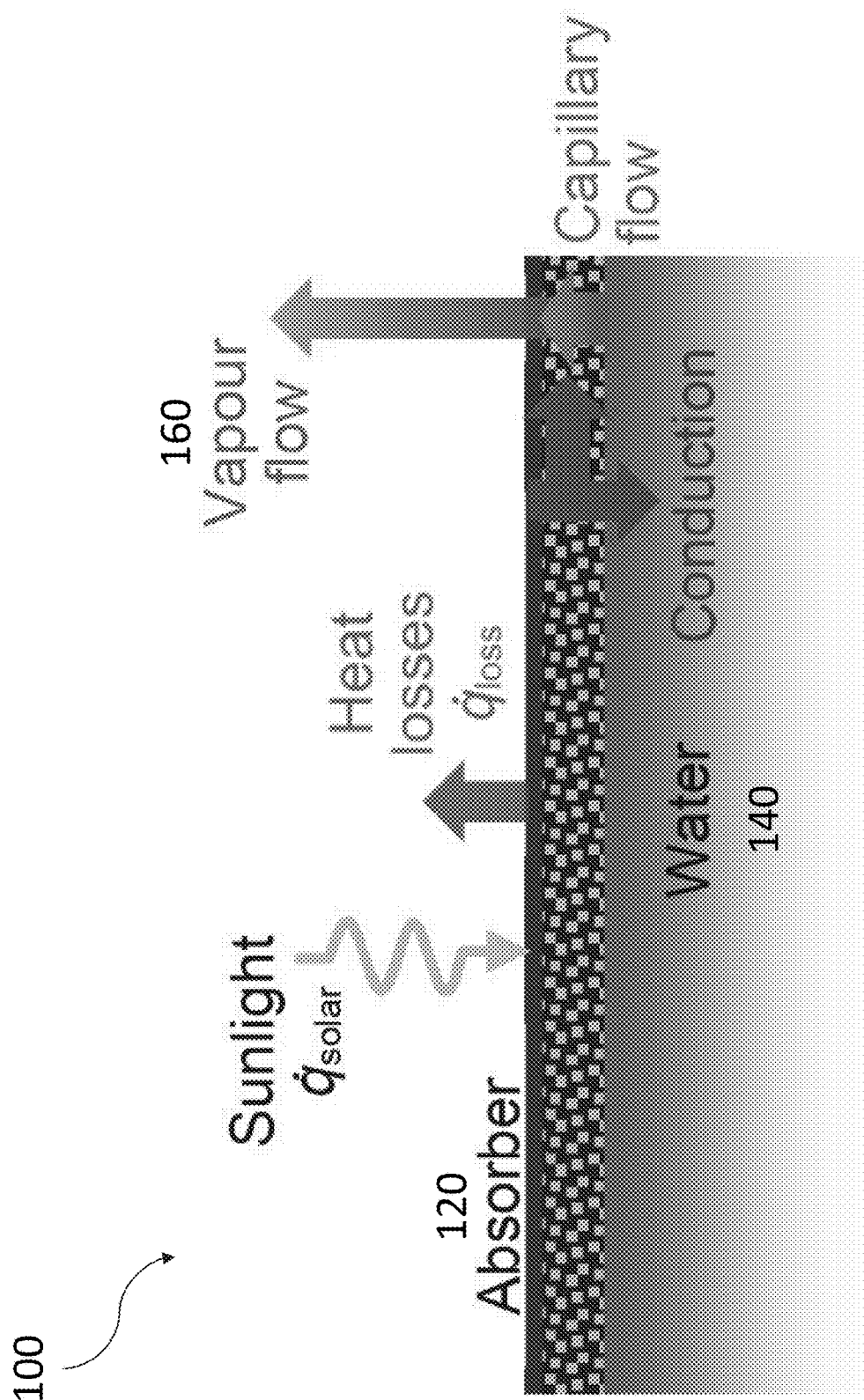
FIG. 1 shows a previously demonstrated solar vapor generator, where an absorber is placed in contact with water and transfers heat from the absorbed sunlight to the water via thermal conduction.

FIG. 1 shows an illustration of a solar vapor generator 100 as taught by Ni et al., *Energy Environ. Sci.*, 2018, 11, 1510-1519, Ni et al., *Nature Energy*, 1, 16126, 2016, Ni et at, Nano Energy, 17, 290, 2015, and Ghasemi et al., Nature Communications, 5, 4449, 2014 The solar vapor generator 100 typically includes an absorber 120 to absorb and convert incident sunlight into heat. Various types of monolithic structures and particle suspensions have been used as an absorber in a solar vapor generator including, but not limited to, black paints and fabrics (e.g., as used in conventional solar stills), nanoparticle suspensions, high-porosity membranes, and nano-patterned materials. However, despite the various types of absorbers that have been previously used, the heat generated by the absorber is typically transferred to a liquid via thermal conduction. As illustrated in FIG. 1, the absorber 120 may be placed into physical contact with a liquid 140 so as to directly transfer heat from the absorber 120 to the liquid 140. In other instances, an insulating layer may be placed between the absorber and the liquid where the liquid is fed into a portion of the absorber via wicking and/or gravity.

The Inventors, however, have recognized and appreciated that the source of liquid used in previous solar vapor generators often contains unwanted materials. For example, the liquid may be seawater, which is an abundant source of potentially potable water. When vaporized, seawater typically leaves behind concentrated salts and other impurities that are prone to contaminating and/or clogging the absorber, an issue that is often conventionally referred to as fouling. Over time, fouling may reduce or even inhibit the generation of steam from a conventional solar vapor generator. Previous approaches towards reducing the severity of fouling have included daily cleaning and rinsing, material recycling, and developing anti-fouling and/or salt-rejecting materials, and structures (e.g., Ni et al., *Energy Environ. Sci.*, 2018, 11, 1510-1519). These approaches also typically increase labor and material costs associated with operating a conventional solar vapor generator. The flow of water through previous solar vapor generators is also typically achieved via pumping, which consumes electricity, or via gravity, which requires elevation of parts of, or the entire system.

Additionally, in the conventional solar vapor generator 100 described above, the temperature of the vapor 160 produced by the solar vapor generator 100 is typically limited to the boiling point of the liquid 140 (also referred to herein as the saturation temperature). For example, the boiling point of water is 100° C. at atmospheric pressure. When additional heat is generated by the absorber 120, the additional heat is typically transferred to the liquid 140, causing the liquid 140 to vaporize and produce more vapor 160, rather than raising the temperature of the vapor 160. Thus, the temperature of the vapor 160 remains limited to the boiling point of the liquid 140.

Furthermore, in some instances, conventional solar vapor generators may operate below the boiling point of the liquid 140, thus evaporation of the liquid 140 is typically governed by mass transfer resulting from a liquid-vapor concentration gradient. The reliance on mass transfer leads to a trade-off between heat and mass transport. For instance, covering the device to reduce convection losses can actually reduce system efficiency due to a concomitant reduction in mass transport.

Another challenge associated with past solar vapor generators is the condensation of vapor. Typically, a plastic cover, disposed above the absorber is used for condensation. Liquid droplets formed on the plastic cover reduces solar irradiation onto the absorber and reduces the system efficiency, from a high open evaporation efficiency over 80% down to ~30% or below. Furthermore, the condensed liquid might need to be pumped for subsequent use. Pumping typically requires electricity, which may not be readily available for certain applications and/or may complicate the system design.

In many applications, superheated vapor (e.g., vapor at a temperature higher than the saturation temperature for a given pressure) may increase the efficiency and/or power output of a system (e.g., a Rankine cycle) and/or is necessary to meet specific requirements. For example, in sterilization, health safety standards for medical and food safety sterilization require steam to be at a temperature of 121-135° C. to kill pathogenic microorganisms and their spores. Industrial processes often need steams with temperature higher than 100° C. However, conventional approaches to surpass 100° C. vapor have been based on either pressurizing the liquid to increase the boiling point and/or concentrating sunlight (e.g., in excess of 20 suns, where 1 sun is equal to 1000 $Wm^{-2}$) to heat a floating membrane, which vaporizes liquid and transfers a portion of the heat to the vapor. Both approaches typically increase system complexity, resulting in greater costs.

Figure 2:
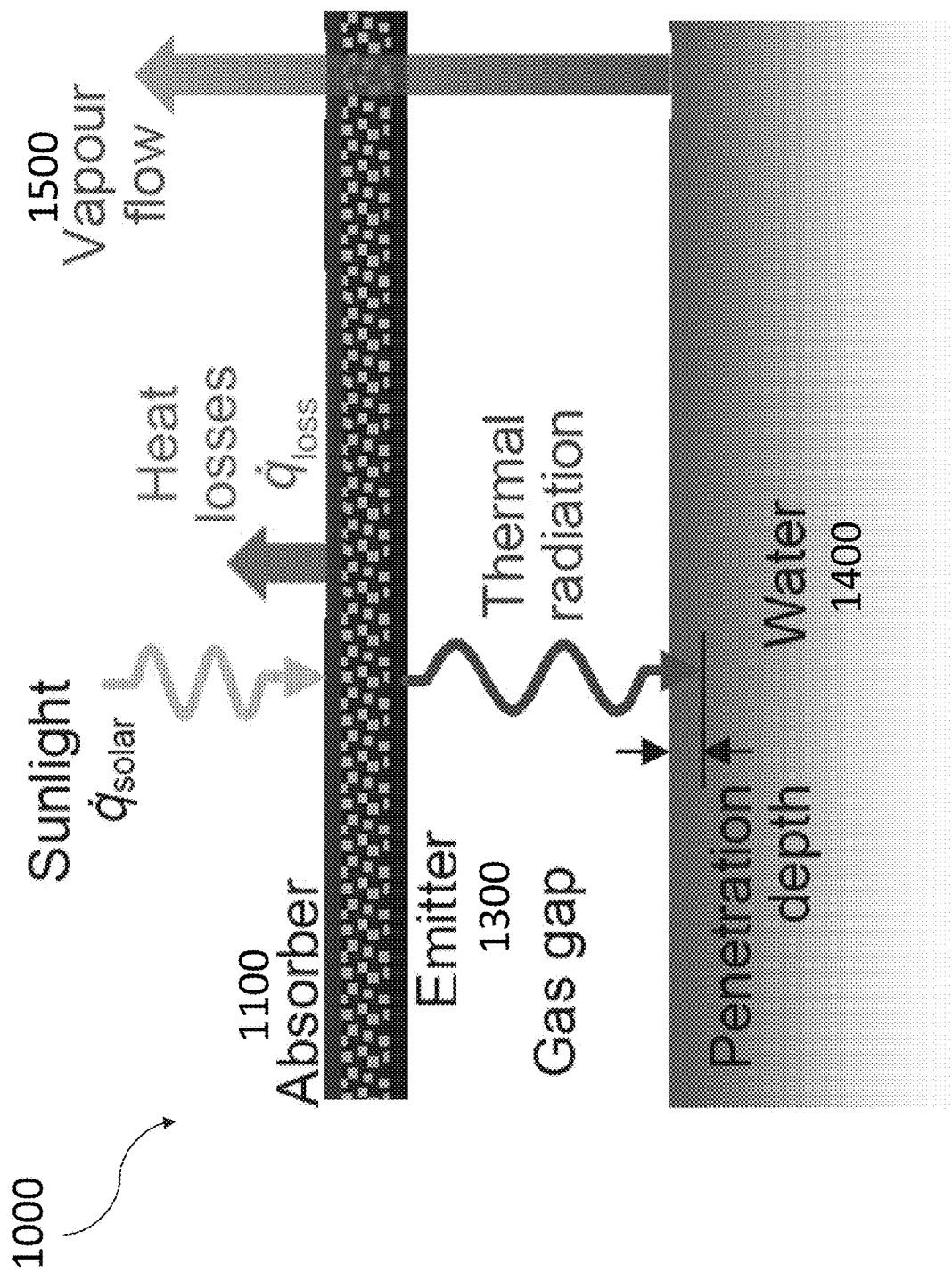
FIG. 2 shows an exemplary solar vapor generator, according to some inventive implementations of the present disclosure, where the absorber is physically separated from the water and an emitter is used to radiatively heat the water.

The present disclosure is thus directed to an inventive solar vapor generator that includes an emitter in thermal communication with an absorber to radiatively heat and vaporize a liquid and produce a vapor. In contrast to conventional solar vapor generators, transferring heat via thermal radiation does not require physical contact between two media. An exemplary solar vapor generator 1000 is illustrated in FIG. 2 to provide an overview of the concept. As illustrated in FIG. 2 and discussed in greater detail below, an emitter 1300 of a solar vapor generator 1000 is substantially physically decoupled from a liquid 1400, which can substantially reduce fouling of an absorber 1100 and/or the emitter 1300. Furthermore, the vapor 1500 may flow through at least a portion of the absorber 1100 so as to receive additional heat from the absorber 1100 and the emitter 1300, thus superheating the vapor 1500. In this manner, the temperature of the vapor 1500 can increase above the boiling point of the liquid 1400 without pressurization and/or solar concentration.

Radiative Heating of the Liquid and a Reduction in Fouling

The solar vapor generator 1000, as described in the present disclosure, generates vapor 1500 by utilizing the liquid 1400 itself to absorb at least a portion of the thermal radiation emitted by the emitter 1300. The absorption of a beam of radiation as it propagates through an absorbing medium may generally be described by the Beer-Lambert law as follows, $$\tau_\lambda(L) = \frac{I_\lambda(L)}{I_{\lambda,0}} = e^{-\kappa_\lambda L} \quad (1)$$

where $\tau_\lambda(L)$ is the spectral transmittance, defined as the intensity $I_\lambda$ of a beam at a distance L, relative to the incident intensity $I_{\lambda,0}$ at L=0. The spectral absorption coefficient $\kappa_\lambda$ quantifies the strength of absorption in the liquid 1400 and its reciprocal, $1/\kappa_\lambda$, may be interpreted as the penetration depth of a photon of wavelength λ. Based on Eq. (1), the penetration depth is defined as the distance at which the intensity of incident light decreases to about 1/e of its original value at the surface of a material.

Figure 3A:
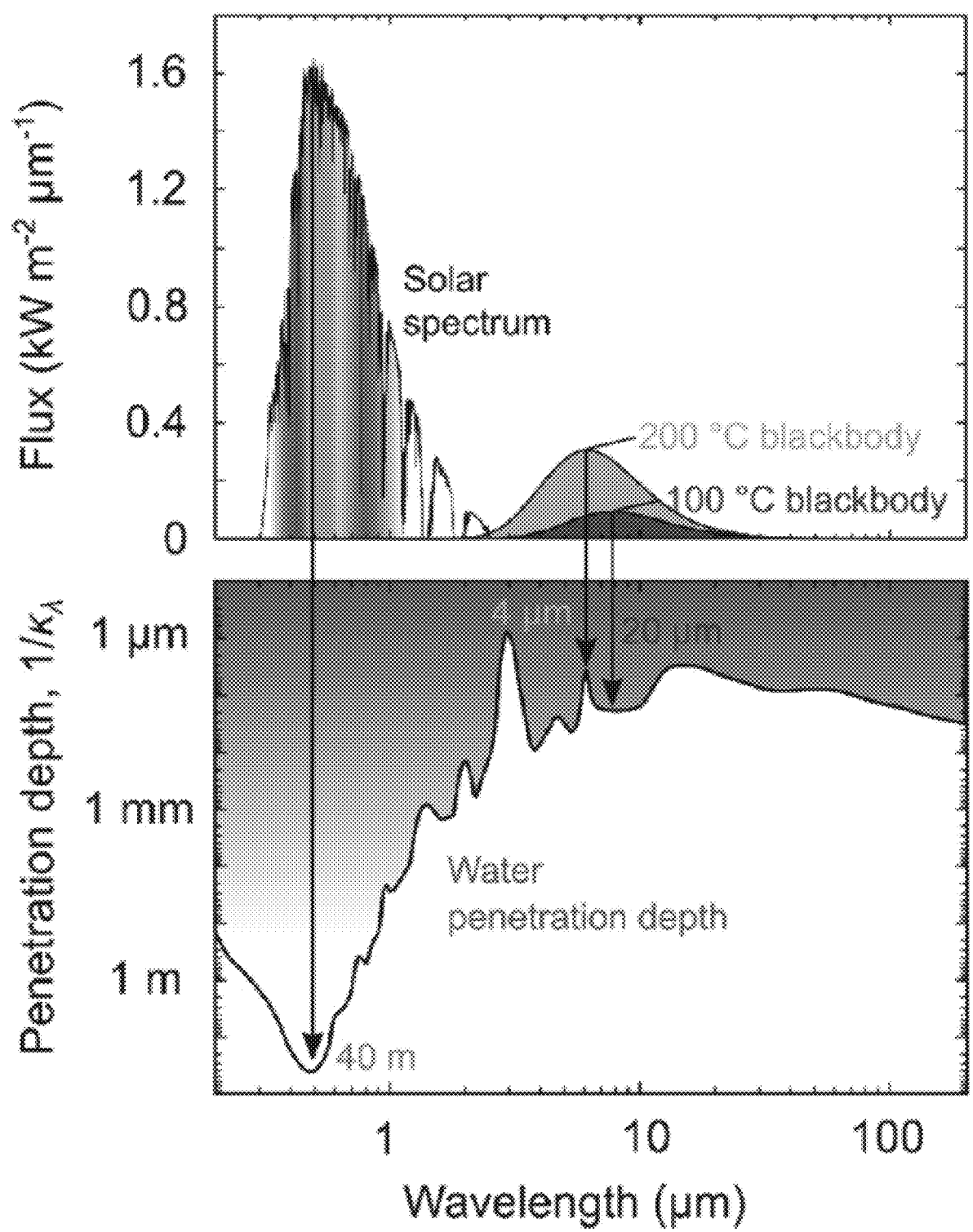
FIG. 3A shows the spectral radiative flux of the sun at sea level and a blackbody at various temperatures with correspondence to the photon penetration depth of liquid water.
Figure 3B:
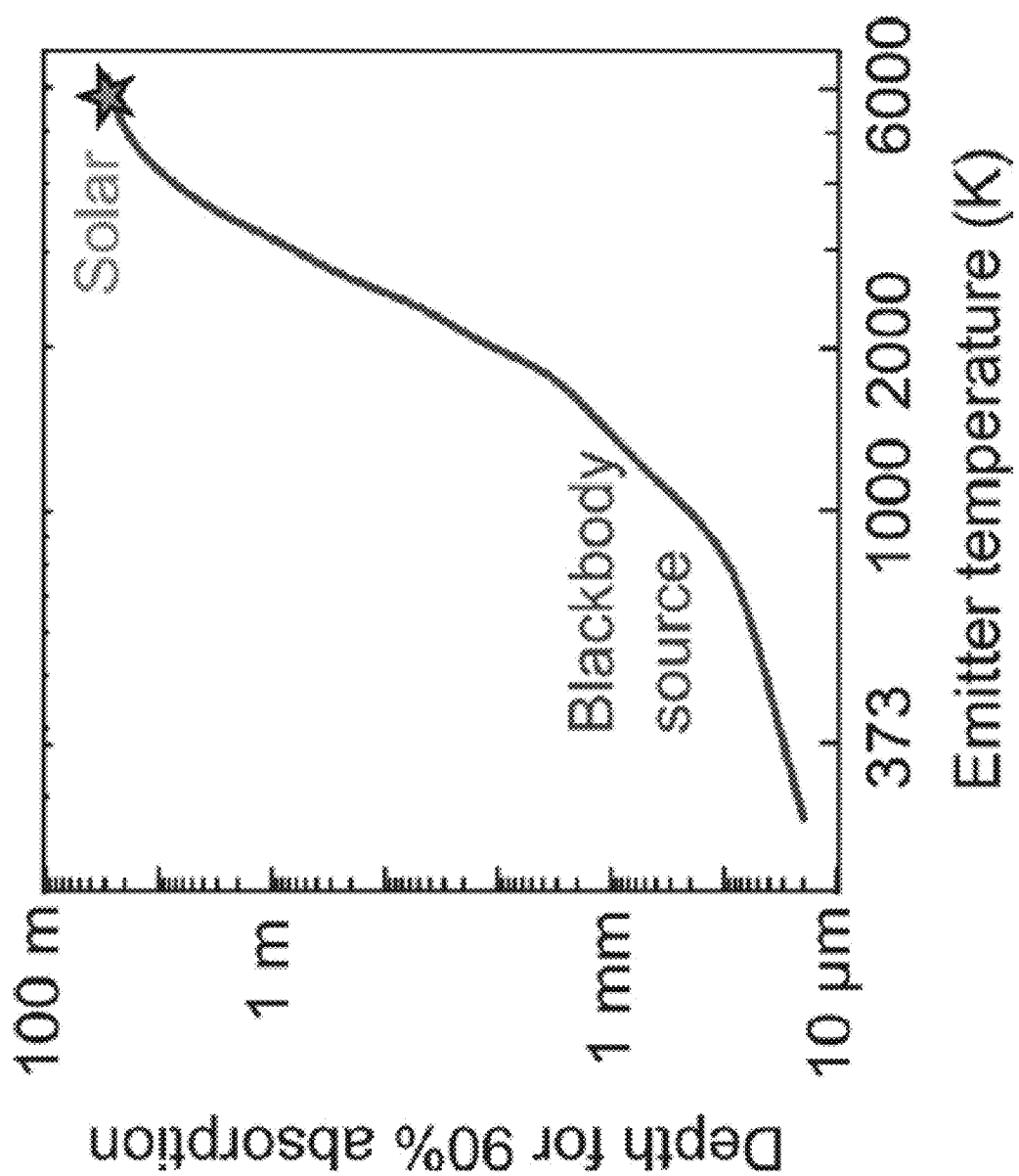
FIG. 3B shows the photon penetration depth for water to absorb 90% of incident radiation as a function of the temperature for a blackbody source.

As an illustrative example, the liquid 1400 may be water according to some implementations of the disclosure. FIG. 3A details the penetration depth of water (bottom panel) as a function wavelength spanning optical and far infrared (IR) regimes. The penetration depth is compared to the spectral radiative flux of the sun as well as blackbody sources at temperatures of 100° C. and 200° C. As shown in FIG. 3A, water is a poor absorber of photons at wavelengths corresponding to the solar spectrum. For instance, the peak spectral radiative flux of the solar spectrum corresponds to a penetration depth in water of about 40 m, which is an impractically large volume of liquid to absorb thermal radiation for the purposes of heating up the liquid to accelerate evaporation. FIG. 3B shows a spectrally averaged penetration depth of water, defined as the penetration depth to absorb 90% of the thermal radiation emitted by a blackbody at varying temperatures. As shown in FIG. 3B, in the case of the sun, which is approximated as blackbody source at 6000 K, the spectrally averaged penetration depth is about 20 m.

In contrast to solar wavelengths, photons at infrared (IR) wavelengths, including near-infrared (NIR), mid-infrared (MIR), and far-infrared regimes (FIR), may be readily absorbed by liquid water. As shown in FIG. 3A, the spectral radiative flux for the blackbody sources at 100° C. and 200° C. span a wavelength range of about 2.5 µm to about 25 µm that substantially overlaps with the vibrational absorption bands of the $H_2O$ molecule. At these wavelengths, the penetration depths range from about 1 µm to about 100 µm, which is several orders of magnitude smaller compared to solar wavelengths. As shown in FIG. 3A, the spectrally averaged penetration depth for a blackbody source at 500° C. or less is about 100 µm or less, which again is several orders of magnitude smaller than the 20 m for solar radiation.

To reconcile the different absorptive properties of water at solar and IR wavelengths, the absorber 1100 may be configured to absorb incident sunlight and the emitter 1300 may be configured to emit IR thermal radiation. The combination of the absorber 1100 and the emitter 1300 functions as a thermal downconverter to convert sunlight at short wavelengths to thermal radiation at long wavelengths. Since the spectrally averaged penetration depth of water is typically less than about 100 µm, water may readily function as its own absorber. In this manner, the absorber 1100 and the emitter 1300 may be physically separated from the liquid 1400 during operation, thereby substantially reducing fouling of the absorber 1100 and/or the emitter 1300 due to contaminants in the liquid 1400. This approach may be generally applied to other types of liquid 1400 that absorbs IR thermal radiation.

Additionally, while the solar vapor generator 1000 operates at the boiling point of the liquid 1400, the evaporation mechanism is fundamentally different from conventional pool boiling. In pool boiling, the heat source is at a solid-water interface and excess heat (e.g., superheating from the walls) is necessary to nucleate a bubble, which then rises to the cooler liquid-vapor interface. In the case of the solar vapor generator 1000 described herein, the effective heat source may be localized to within the penetration depth of the liquid 1400 (e.g., about 100 µm or less for water) from the liquid-vapor interface, such that vapor generation occurs by interfacial evaporation and bubble formation is not necessarily required.

Superheating of the Liquid

As described above, the solar vapor generator 1000 may physically and thermally decouple the absorber 1100 and the emitter 1300 from the liquid 1400. Heat from the absorber 1100 and the emitter 1300 may be used to superheat the vapor 1500, such that the vapor 1500 exhibits a temperature higher than the boiling point of the liquid 1400. A 1D analysis of the solar vapor generator 1000 in FIG. 2 may be used to conceptually demonstrate, at least to first order, superheating of the vapor. Again, the liquid 1400 may be assumed to be water in this exemplary analysis. A steady-state energy balance on the absorber 1100/emitter 1300 may define the net heat flux transferred to the liquid 1400 as $\dot{q}_{gain} = \eta_{opt} \cdot \dot{q}_{solar} - \dot{q}_{loss}$, where $\eta_{opt}$ is the optical efficiency (discussed in detail further below), $\dot{q}_{solar}$ is the incident solar flux, and $\dot{q}_{loss}$ represents all forms of heat loss to the environment. An overall heat transfer coefficient may be defined for the gain and loss terms as: $U_{gain} \equiv \dot{q}_{gain}/(T_e - T_w)$ and $U_{loss} \equiv \dot{q}_{loss}/(T_e - T_\infty)$, where $T_e$ is the temperature of the absorber 1100 and the emitter 1300 (assumed to be equal), $T_w$ is the water temperature, and $T_\infty$ is the temperature of the ambient environment. Using the heat transfer coefficients $U_{gain}$ and $U_{loss}$, $T_e$ may be solved as follows, $$T_e = \frac{\eta_{opt} \dot{q}_{solar} + U_{gain} T_w + U_{loss} T_\infty}{U_{loss} + U_{gain}} \quad (2)$$

In general, $U_{gain}$ and $U_{loss}$ may vary as a function of temperature such that Eq. (2) should be solved iteratively. However, a simple analytical model may be obtained by assuming that $U_{gain}$ and $U_{loss}$ are remain substantially constant over a particular temperature range, which renders Eq. (2) explicit. $U_{loss}$ may include radiation, conduction and convection heat transfer from the system to environment. For example, the loss may be taken as $U_{loss} = 4.6$ W m$^{-2}$K$^{-1}$, which is comparable to a laboratory-scale solar vapor generator described below. $U_{gain}$ encompasses all modes of heat transfer from the emitter 1300 to the liquid 1400, which is dominated by radiation heat transfer. Assuming a simplified case of radiative heat exchange between two blackbodies for a planar emitter 1300 and liquid 1400, $U_{gain}$ is the radiation heat transfer coefficient $\sigma(T_w^2 + T_e^2)(T_w + T_e)$, which may be approximately 13 W m$^{-2}$K$^{-1}$ for $T_w = 373$ K and $T_e = 398$ K. Based on these values for $U_{gain}$ and $U_{loss}$, the temperature $T_e$ may then be determined. Under the conditions where $\dot{q}_{solar} = 1000$ W m$^{-2}$ (equivalent to 1 sun), $\eta_{opt} = 0.76$ (a representative value based on the laboratory-scale prototype described below), and $T_\infty = 25°$ C., Eq. (2) gives an equilibrium absorber 1100/emitter 1300 temperature of $T_e = 124°$ C.

In the case where the liquid 1400 is water, the high temperature of the absorber 1100 and the emitter 1300 provides the potential to superheat the vapor 1500 to temperatures above 100° C. (i.e., the boiling point of water). As shown in FIG. 2, the vapor 1500 may pass through a portion of the emitter 1300 and/or the absorber 1100, which transfers heat to the vapor 1500 via solid-vapor heat transfer, thereby superheating the vapor 1500. The vapor 1500 may reach a temperature up to $T_e$. For this exemplary analysis, the sensible heat of the vapor 1500 is assumed to be negligible in the energy balance on the absorber 1100/emitter 1300 used to determine $T_e$, as the sensible heat is substantially smaller than $\dot{q}_{solar}$, $\dot{q}_{gain}$ and $\dot{q}_{loss}$ when the vapor temperatures are less than 160° C. However, in instances where the vapor temperatures may be sufficiently high, the sensible heat of the vapor 1500 may be included in the analysis. As will be described further below, this analysis in conjunction with more detailed transient heat transfer models, which also captures nonlinear effects and secondary effects such as the sensible heat associated with superheating, may be used to assess the operation of a solar vapor generator disclosed herein.

An Exemplary Solar Vapor Generator

Figure 4A:
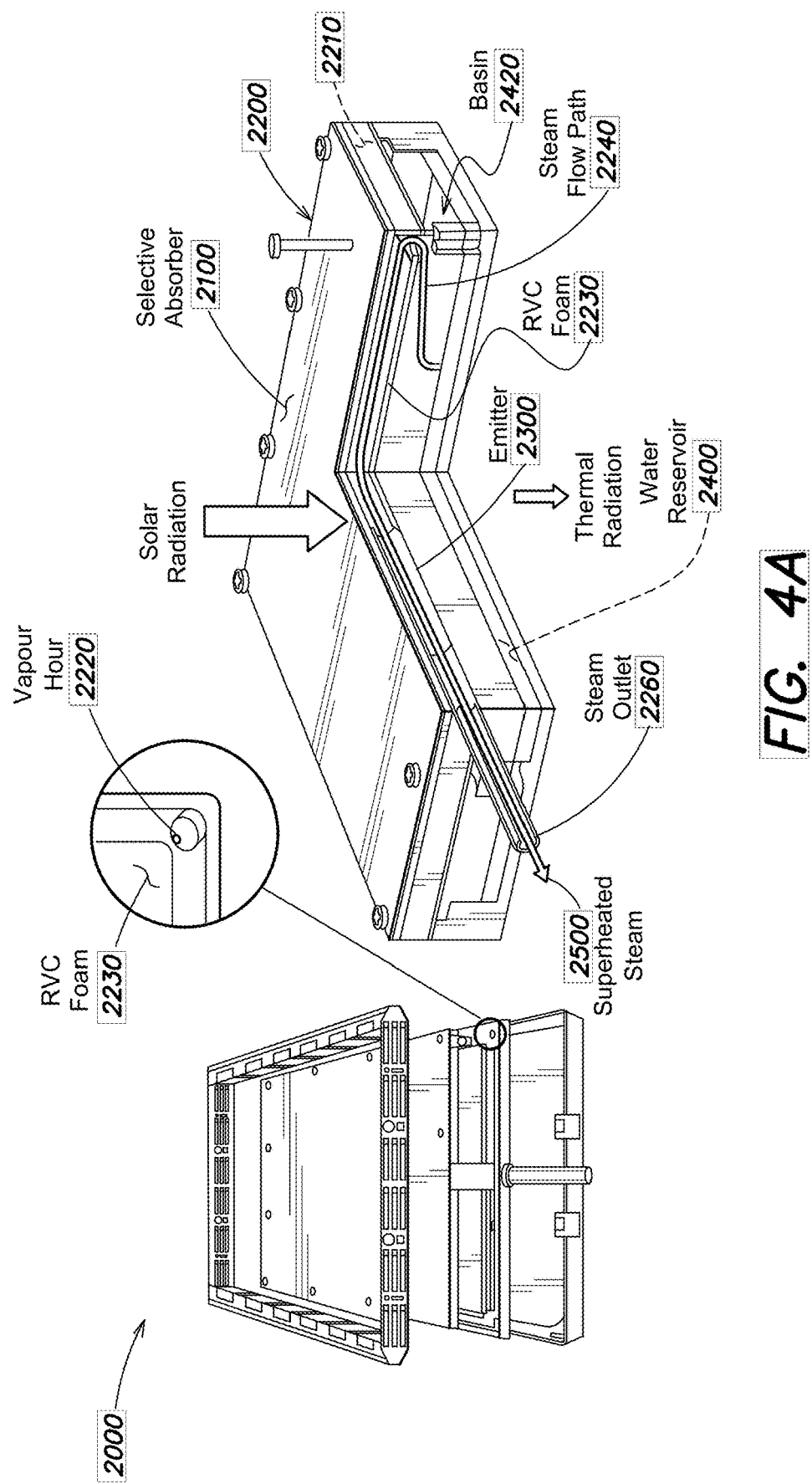
FIG. 4A shows an exemplary solar vapor generator, according to some implementations of the disclosure.
Figure 4B:
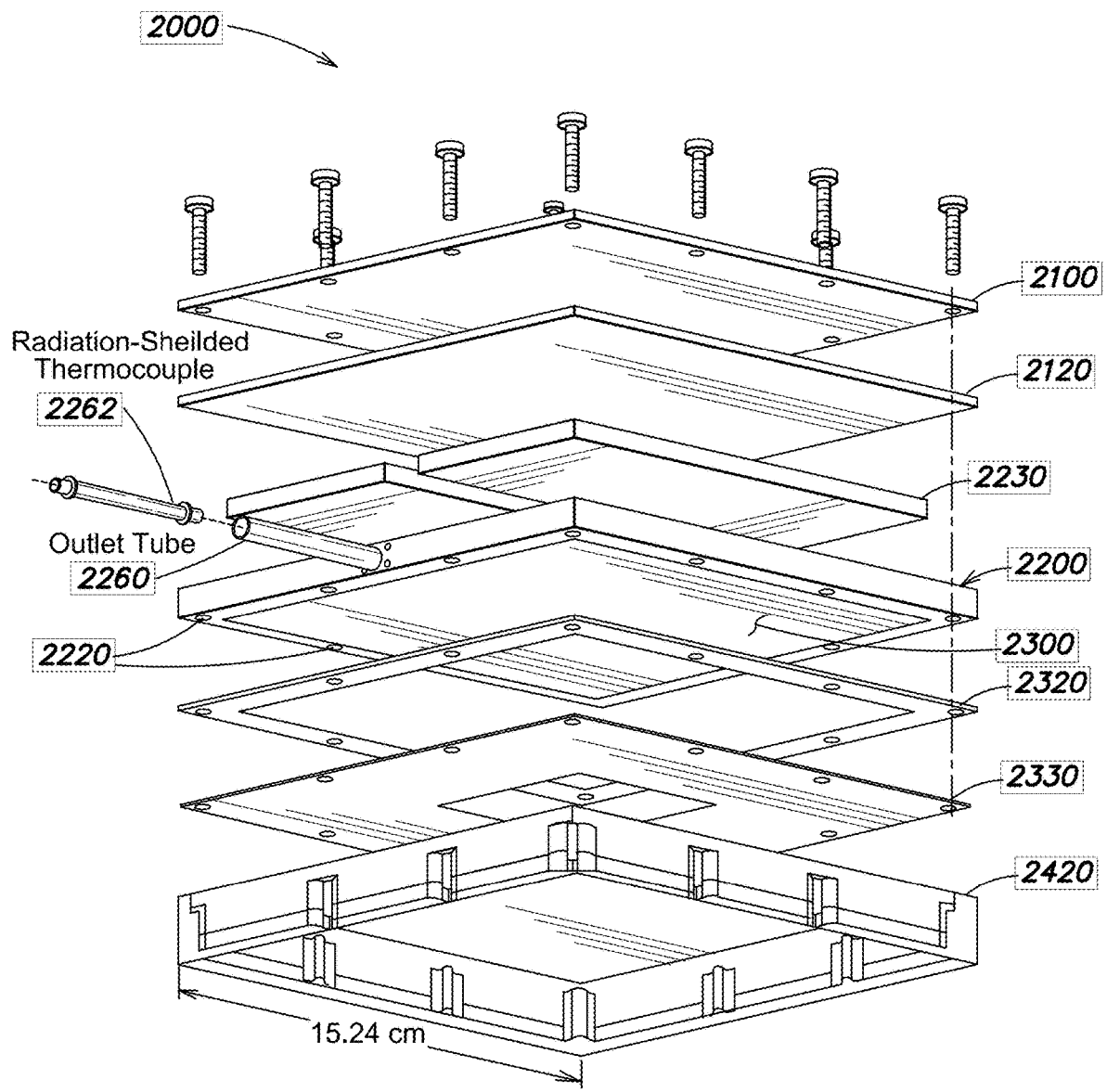
FIG. 4B shows a bottom perspective exploded view of the solar vapor generator shown in FIG. 4A.

An exemplary design for a solar vapor generator 2000 is shown in FIGS. 4A and 4B. The solar vapor generator 2000 includes an absorber 2100 to absorb incident sunlight, thereby producing heat. The absorber 2100 may be disposed onto at least a portion of a housing 2200, which mechanically supports the absorber 2100 and functions to transfer heat from the absorber 2100 to an emitter 2300 (e.g., through the walls of the housing 2200 or through the air/vapor 2500 contained within the housing 2200). The emitter 2300 may be disposed onto at least a portion of the housing 2200 to receive heat from the housing 2200 and emit the heat as thermal radiation. A liquid 2400 may be disposed proximate the emitter 2300 so as to receive and absorb the thermal radiation, resulting in heating of the liquid 2400. In some implementations, the liquid 2400 may be stored in a basin 2420, which is mechanically coupled to the housing 2200, to allow the solar vapor generator 2000 to be readily portable and deployable on land. Once the liquid 2400 is heated to its boiling point, the liquid 2400 undergoes a phase change to produce a vapor 2500. The vapor 2500 may be flowed through an interior cavity 2210 of the housing 2200 to receive additional heating from the absorber 2100 and/or the emitter 2300 via the housing 2200, thus superheating the vapor 2500 to temperatures higher than the saturation temperature. The vapor 2500 may then flow out of the solar vapor generator 2000 via an outlet 2260 disposed on at least one side of the housing 2200.

Absorber

The primary function of the absorber 2100 is to absorb and convert sunlight into heat. The absorber 2100 may be shaped to substantially conform to at least one side of the housing 2200 so as to increase thermal conduction from the absorber 2100 to the housing 2200. For example, the absorber 2100 may be substantially flat and disposed on to a corresponding flat side of the housing 2200. In another example, the housing 2200 may have at least one side with a convex or a concave curvature. The absorber 2100 may be shaped so as to conform to the convex or concave shape of the at least one side of the housing 2200. The absorber 2100 may be dimensioned to be substantially similar in size to the at least one side of the housing 2200.

In some implementations, the absorber 2100 may include substrate. If heat losses from the absorber 2100 are sufficiently reduced (e.g., by incorporating thermally insulating media as discussed in more detail below), the absorber 2100 may be dimensioned to be larger than the at least one side of the housing 2200. The larger absorber 2100 can absorb more sunlight, thus increasing the total heat input into the solar vapor generator 2000. The substrate of the absorber 2100 may then conduct heat to the side of the housing 2200 having smaller dimensions, effectively concentrating the heat absorbed by the absorber 2100 to a smaller area. In some implementations, the substrate may form at least a portion of the side of the housing 2200.

The absorber 2100 may be a continuous structure with an absorptive surface that substantially spans the entirety of the absorber 2100. In some implementations, the absorber 2100 may be comprised of a plurality of absorbing elements arranged so as to form an absorptive surface. The plurality of absorbing elements may enable the absorber 2100 to more readily conform to non-planar surfaces without imposing undesirable mechanical stress and/or strain on the absorbing surface. For example, the absorbing elements may be comprised of hard, brittle materials that may fracture if placed onto a non-planar surface and/or have poor thermal contact to the housing 2200. By placing smaller absorbing elements onto a non-planar surface, the mechanical bending forces imposed on each of the absorbing elements may be substantially reduced and the thermal contact substantially increased.

In some implementations, the absorber 2100 may be configured to substantially absorb incident light corresponding to solar wavelengths. At the solar wavelengths, the absorber 2100 may be polarization insensitive. The absorber 2100 may also be configured to be absorptive over a broad range of incident angles such that the absorber 2100 may remain in a static position while providing sufficient heat input to generate vapor as the sun traverses the sky during the day. In some implementations, a solar tracking system may be coupled to the solar vapor generator 2000, which adjusts the orientation of the absorber 2100 such that incident sunlight is at about normal incidence with respect to the absorber 2100 as the position of the sun changes during the day.

Figure 5A:
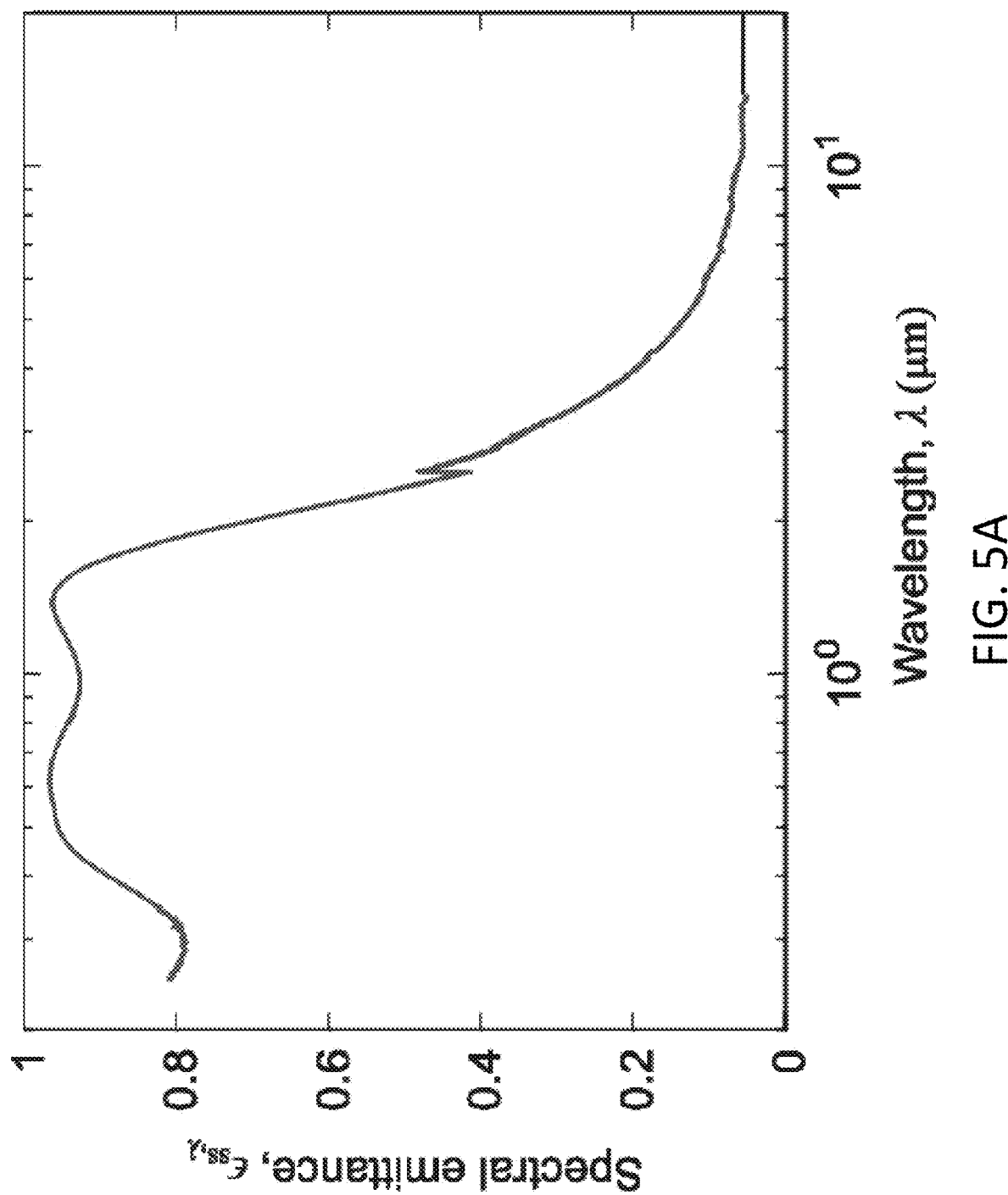
FIG. 5A shows the spectral emittance of an exemplary selective surface as a function of wavelength.
Figure 5B:
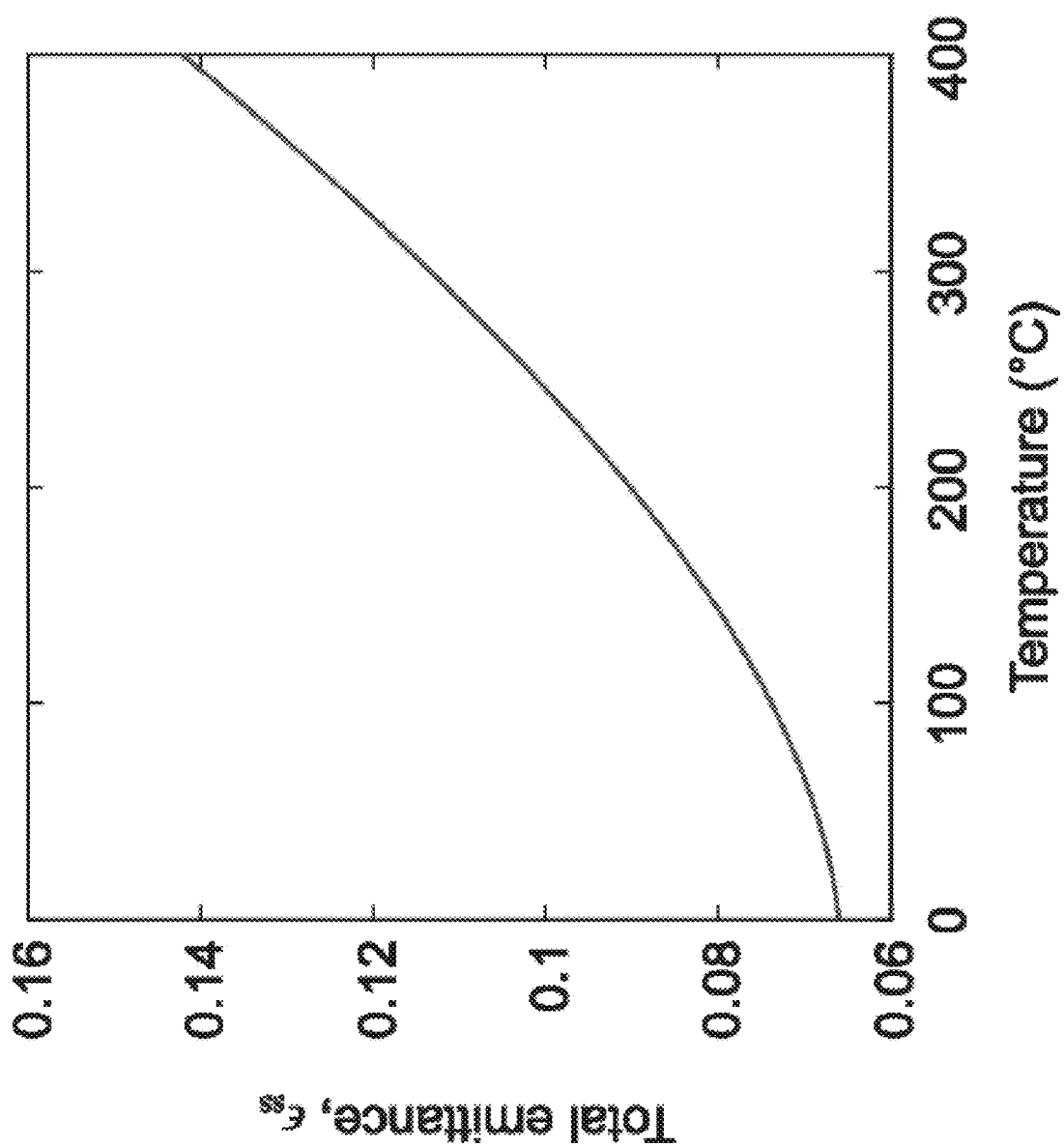
FIG. 5B shows the total emittance of the selective surface of FIG. 5A as a function of the temperature of the selective surface.

In order to reduce radiative losses to the ambient environment, the absorber 2100 may be further configured to be non-emissive at IR wavelengths. For example, the absorber 2100 may be a selective surface. In a preferred implementation, the absorber 2100 may exhibit a cut-off wavelength, where shorter wavelengths exhibit an absorptance greater than about 0.9 and longer wavelengths exhibit an emittance less than about 0.1. FIG. 5A shows an exemplary spectral emittance of a selective surface, showing the emittance is greater than about 0.9 at wavelengths ranging between 300 nm to 1050 nm and less than 0.1 at wavelengths between about 5 μm and 20 μm. FIG. 5B shows the total emittance, integrated over wavelength and angle, of the selective surface of FIG. 5A as a function of the emitter temperature. As shown, the total emittance of the selective surface remains below 0.1 for temperatures below about 250° C. The total emittance also increases as the emitter temperature increases due to the radiative flux of the selective surface shifting to shorter wavelengths, corresponding to a higher spectral emittance. It should be appreciated that the properties of the selective surface in FIGS. 5A and 5B are exemplary, and may vary based on the design of the selective surface.

The cut-off wavelength of the absorber 2100 may be tuned based on the solar spectrum and the desired operating temperature of the solar vapor generator 2000. For example, the cut-off wavelength may be tuned to correspond to an edge of an atmospheric absorption band (e.g., $H_2O$ or $CO_2$)

to increase solar absorption while reducing thermal radiation losses. In another example, a higher emitter temperature may be desired. The higher temperature, however, shifts thermal radiation losses from the absorber 2100 to shorter wavelengths (i.e., a higher temperature blackbody). The cut-off wavelength may thus be tuned to shorter wavelengths to reduce the thermal radiation losses from the absorber 2100 to the ambient environment.

As described above, the absorber 2100 may include a separate absorptive surface coupled to a substrate. The substrate may be used to facilitate handling and/or assembly of the absorber 2100. In some implementations, the absorber substrate may also be thermally conductive to increase heat conduction to the housing 2200. The absorber 2100 may be coupled to the substrate and/or to the housing 2200 using various coupling mechanisms including, but not limited to screw fasteners, bolt fasteners, clips, clamps, brazing, welding, and adhesives (e.g., silicone adhesive). In some implementations, particularly where the absorber substrate of the absorber 2100 is mechanically coupled to a surface of the housing 2200 (e.g., enclosed surface on second end of housing 2200), a thermal interface material may be disposed between the absorber 2100 and the housing 2200 to reduce the thermal interface resistance, thus increasing heat conduction to the housing 2200. The coupling mechanism may also impart a clamping force to press the absorber 2100 onto the housing 2200, further reducing the thermal interface resistance. In some implementations, the absorber 2100 may include a gasket 2120 disposed between the absorber 2100 and the housing 2200 to form a substantially airtight seal between the interior cavity 2210 of the housing 2200 and the ambient environment. The substrate of the absorber 2100 may include a plurality of grooves and/or trenches to facilitate alignment with the gasket 2120 during assembly.

In some implementations, the absorptive surface may be deposited onto the absorber substrate of the absorber 2100 using various deposition methods including, but not limited to, sputtering, spraying, and dip coating. The absorptive surface of the absorber 2100 may be formed from various absorptive materials and/or coatings including, but not limited to Alanod eta plus®, a composite of copper and copper oxide, cermets, black chromium, and nickel-plated anodized aluminum. The absorber substrate may be formed from various metals including, but not limited to, aluminum, copper, carbon steel, and stainless steel. In some implementations, the absorber substrate of the absorber 2100 may be formed from polymers including, but not limited to, polyethylene and polypropylene. In instances where the absorber substrate is a polymer, the absorber substrate may be dimensioned to have a lower thermal resistance (e.g., by reducing the thickness of the absorber substrate). In some implementations, the solar vapor generator 2000 may generate sufficient vapor 2500, which may also be used to transfer heat from the absorber 2100 to the emitter 2300.

Housing

The housing 2200 provides mechanical support to the various components of the solar vapor generator 2000 and may also be used to conduct heat generated by the absorber 2100 to the emitter 2300 for radiative heating of the liquid 2400 and/or the vapor 2500 for superheating. As describe above, the housing 2200 may be a hollow enclosure comprising a plurality of sidewalls coupled together, defining the interior cavity 2210 of the housing 2200. The plurality of sidewalls may further define a first end and a second end, where the first end is substantially enclosed. In some implementations, the second end may also be substantially enclosed prior to assembly with the absorber 2100. As described above, in some implementations, the substrate of the absorber 2100 may couple to the second end of the plurality of sidewalls of the housing 2200 to enclose the interior cavity 2210.

The dimensions of the housing 2200 may be tailored to satisfy several aspects of the solar vapor generator 2000 including, but not limited to reducing the thermal resistance between the absorber 2100 and the emitter 2300 and reducing heat losses from the housing 2200. For example, the absorber 2100 and the emitter 2300 may be disposed on opposing sides of the housing 2200 where the height of the housing 2200 is reduced in order to reduce the thermal resistance between the absorber 2100 and the emitter 2300. This geometry also reduces the portion of the housing 2200 exposed to the ambient environment (e.g., the sides of the housing 2200 that are not coincident with the absorber 2100 and the emitter 2300), thus reducing parasitic heat losses to the ambient environment.

The housing 2200 may be formed from materials including, but not limited to aluminum, copper, carbon steel, stainless steel, polyethylene, and polypropylene. Depending on the materials used to form the housing 2200, various manufacturing methods may be used including, but not limited to machining, welding, casting, injection molding, or any combinations of the foregoing. The housing 2200 may also include a plurality of features (e.g., bolt holes, threaded connectors, snap fits) to facilitate mechanical coupling of the housing 2200 to various components of the solar vapor generator 2000 including the absorber 2100, the emitter 2300 and the basin 2420.

The housing 2200 may include one or more vapor holes 2220 disposed along the portion of the housing 2200 proximate to the liquid 2400 to facilitate a flow of the vapor 2500 into the interior cavity 2210 of the housing 2200. For example, the vapor holes 2220 may be disposed along the periphery of the portion of the housing 2200 where the emitter 2300 is located, as shown in FIG. 4B. The housing 2200 may also include an opening for the outlet 2260 (as will be described in more detail below). As the vapor 2500 flows through the interior cavity 2210, heat may be transferred from the housing 2200 to the vapor 2500 via thermal conduction and/or convection. The amount of heat received by the vapor 2500 will depend, in part, on the length of the flow path 2240 through the interior cavity 2210. FIG. 4A shows an exemplary flow path 2240 that the vapor 2500 may follow as it flows through the interior cavity 2210 of the housing 2200.

Generally, a longer flow path 2240 corresponds to greater superheating of the vapor 2500 by increasing the residence time for heat to transfer from the housing 2200 to the vapor 2500. In some implementations, the flow path 2240 may be increased by filling at least a portion of the interior cavity 2210 with a porous medium 2230, which creates a long, tortuous path for the vapor 2500 to flow through. The porous medium 2230 may be heated by the housing 2200 via thermal conduction and/or convection such that during operation, the porous medium 2230 is at a temperature higher than the saturation temperature of the vapor 2500. In this manner, the vapor 2500 may be superheated as the vapor 2500 flows through the porous medium 2230. The porous medium 2230 may be various types of foam having a high specific surface area to increase convective heat transfer including, but not limited to reticulated vitreous carbon (RVC) foam (e.g., ERG Duocell® 100 PPI), graphitic foam, and metallic foam. In some implementations, the porous medium 2230 may be disposed in the interior cavity of the housing 2200 with the edges simply in physical contact with the housing. The porous medium 2230 may be dimensioned to be larger than the dimensions of the interior cavity 2210 such that the porous medium 2230 is compressed when placed into the interior cavity 2210. The compressive force that arises due to the compression of the porous medium 2230 may increase the thermal contact between the porous medium 2230 and the housing 2200. In some implementations, the thermal contact between the porous medium 2230 and the housing 2200 may be improved by bonding or soldering the porous medium 2230 to the housing 2200. In this manner, more heat may be transferred to the porous medium 2230, thus increasing superheating of the vapor 2500.

The interior cavity 2210 may also be shaped to increase the flow path 2240. For example, the interior cavity 2210 may include a plurality of flow channels in a serpentine arrangement where vapor 2500 may flow from at least one vapor hole 2220 to the outlet 2260 through the serpentine flow channel. The walls of the plurality of flow channels may be formed from the same material as the housing 2200 and thus, may also reduce the thermal resistance between the absorber 2100 and the emitter 2300. In some implementations, one or more fins may be disposed in each flow channel in the plurality of flow channels to increase convective heat transfer from the interior cavity 2210 to the vapor 2500. The fins may be oriented such that the flow of vapor 2500 is not substantially impeded by the fins. The fins may be various types of shapes including, but not limited to, a rectangle, a cylinder, a tapered pin, and a tapered rectangular fin.

In some implementations, the housing 2200 may be further partitioned such that a plurality of interior cavities 2210 are formed, each having at least one vapor hole 2220 and at least one outlet 2260. In this manner, the pressure in each interior cavity 2210 in the plurality of interior cavities 2210 is less likely to affect the pressure in another cavity 2210. Additionally, for larger-scale solar vapor generators 2000, the use of multiple interior cavities 2210 may allow for a potentially lower pressure drop such that the vapor pressure generated by evaporating and/or boiling the liquid 2400 may still be sufficient to flow superheated vapor 2500 through each interior cavity 2210. In some implementations, a plurality of housings 2000 may also be used instead in the solar vapor generator 2000. For example, each housing 2000 in the plurality of housings 2000 may be substantially identical and may be assembled as an array with one or more absorbers 2100 and emitters 2300.

It should be understood and appreciated that the interior cavity 2210 formed in the housing 2200 and/or between the absorber 2100 and the emitter 2300 provides, in part, a path to guide the vapor 2500 through higher temperature regions of the interior cavity 2210. In some implementations, the emitter 2300 may be directly coated and/or disposed onto the backside of the absorber 2100. Rather than flow through the emitter 2300 and/or absorber 2100, the vapor 2500 may instead flow along the surface of the emitter 2300, which is at a higher temperature than the saturation temperature of the vapor 2500, for superheating. In some implementations, the emitter 2300 may include fins to further increase heat transfer between the emitter 2300 and the vapor 2500 for superheating.

Emitter

The emitter 2300 emits heat as IR thermal radiation to radiatively heat the liquid 2400. In some implementations, the emitter 2300 may be a separable component that couples to the housing 2200. Similar to the absorber 2100, the emitter 2300 may include a substrate to support an emissive surface and to facilitate assembly and handling of the emitter 2300. The emitter 2300 may be coupled to the housing 2200 with various coupling mechanisms including, but not limited to screw fasteners, bolt fasteners, clips, clamps, brazing, welding, and adhesives. In some implementations, the emitter 2300 may be a coating deposited directly onto a portion of the housing 2200 to simplify fabrication and integration of the emitter 2300 and thus, reduce manufacturing costs.

In some implementations, the emitter 2300 may be a broadband emitter configured to emit thermal radiation across a large range of IR wavelengths. For example, the emitter 2300 may exhibit an emittance near unity at wavelengths spanning the radiative spectra of a blackbody source at a particular temperature. The broadband nature of the emitter 2300 may allow for compatibility with various types of liquid 2400 so long as the liquid 2400 absorbs at least a portion of the thermal radiation to sufficiently raise the temperature of the liquid 2400 to its boiling point. In some implementations, the emitter 2300 may be a narrowband emitter configured to emit thermal radiation at a select few IR wavelengths that correspond to the vibrational absorption bands of the liquid 2400. By tailoring the emitter 2300 to emit only at wavelengths where the liquid 2400 strongly absorbs thermal radiation, the liquid 2400 may be heated to its boiling point using less thermal energy, thus allowing for a higher emitter 2300 temperature and more superheating of the vapor 2500.

The emitter 2300 may be formed from various materials and/or coatings including, but not limited to carbon black, Zynloyte® Hi-Temp paints, Pyromark® High Temperature Paint, and textured metal films. Depending on the materials used and whether the emitter 2300 is a separable component or a coating, various manufacturing methods may be used to fabricate emitter 2300 including aerosol painting, brush painting, dip coating, vacuum deposition, and chemical vapor deposition. In some implementations where the emitter 2300 is a coating, the emitter 2300 may be formed from a material that is readily removable (e.g., through use of a paint thinner) to facilitate recoating of the housing should the emitter 2300 be replaced. In some implementations, the emitter 2300 may be formed from a material with sufficient mechanical integrity to allow for spray cleaning (e.g., compressed air cleaning) or physical cleaning (e.g., with a cleaning wipe).

Liquid

The liquid 2400 provides the source for generation of the vapor 2500 in the solar vapor generator 2000. The liquid 2400 may generally be any liquid that exhibits a boiling point less than the operating temperature of the emitter 2300 to ensure vaporization of the liquid 2400 occurs during operation. In some implementations, the liquid 2400 may be in an open pool, wherein the solar vapor generator 2000 is floated on the surface of the pool. In some implementations, the liquid 2400 may be stored in the basin 2420, allowing for greater portability of the solar vapor generator 2000. The emitter 2300 should be positioned proximate to the surface of the liquid 2400, but at a sufficient distance such that during operation, the emitter 2300 remains substantially separated from the liquid 2400 to reduce fouling of the emitter 2300. For example, if the solar vapor generator 2000 is floated on a pool of the liquid 2400 in an outdoor environment, the distance between the emitter 2300 and the liquid 2400 may be chosen to be sufficiently large to accommodate possible alterations in the distance during operation (e.g., due to waves, gusts of wind tilting the solar vapor generator 2000). In another example, if the liquid 2400 is contained in the basin 2420, the distance between the emitter 2300 and the liquid 2400 may be smaller to reduce the overall size and form factor of the solar vapor generator 2000.

The liquid 2400 may be various purified or contaminated liquids including, but not limited to purified water, seawater, glycol, hydrofluorocarbons, hydrocarbons, or perfluorocarbons. In some implementations, the solar vapor generator 2000 may be used as a boiler in a Rankine power cycle where the liquid 2400 may be water or various organic liquids. In such instances, the liquid 2400 used may depend on other factors including the chemical compatibility of the liquid 2400 with the materials used to form the emitter 2300, the housing 2200, and/or the basin 2420, and the operating temperature of the liquid 2400, including the degree of superheating of the vapor 2500 desired.

Basin

As described above, the basin 2420 may be used in some implementations to contain the liquid 2400, allowing the solar vapor generator 2000 to be portable and deployable on land. The basin 2420 may include a plurality of sidewalls that align with the plurality of sidewalls of the housing 2200. The basin 2420 may be enclosed on at least one side to form a cavity to store the liquid 2400 with an open end to facilitate filling of the liquid 2400 stored in the basin 2420. The open end also allows vapor to flow out of the basin 2420 and into, for example, the interior cavity 2210 of the housing 2200. The height of the basin 2420 may be adjusted depending on the desired volumetric capacity of liquid 2400 to be stored in the solar vapor generator 2000. The basin 2420 may be coupled to the emitter 2300 and/or the housing 2200 with various coupling mechanisms including, but not limited to screw fasteners, bolt fasteners, clips, clamps, brazing, welding, and adhesives. In some implementations, a gasket 2320 may be disposed between the basin 2420 and the housing 2200 to substantially seal the cavity of the basin 2420 storing the liquid 2400 from the ambient environment.

Figure 10A:
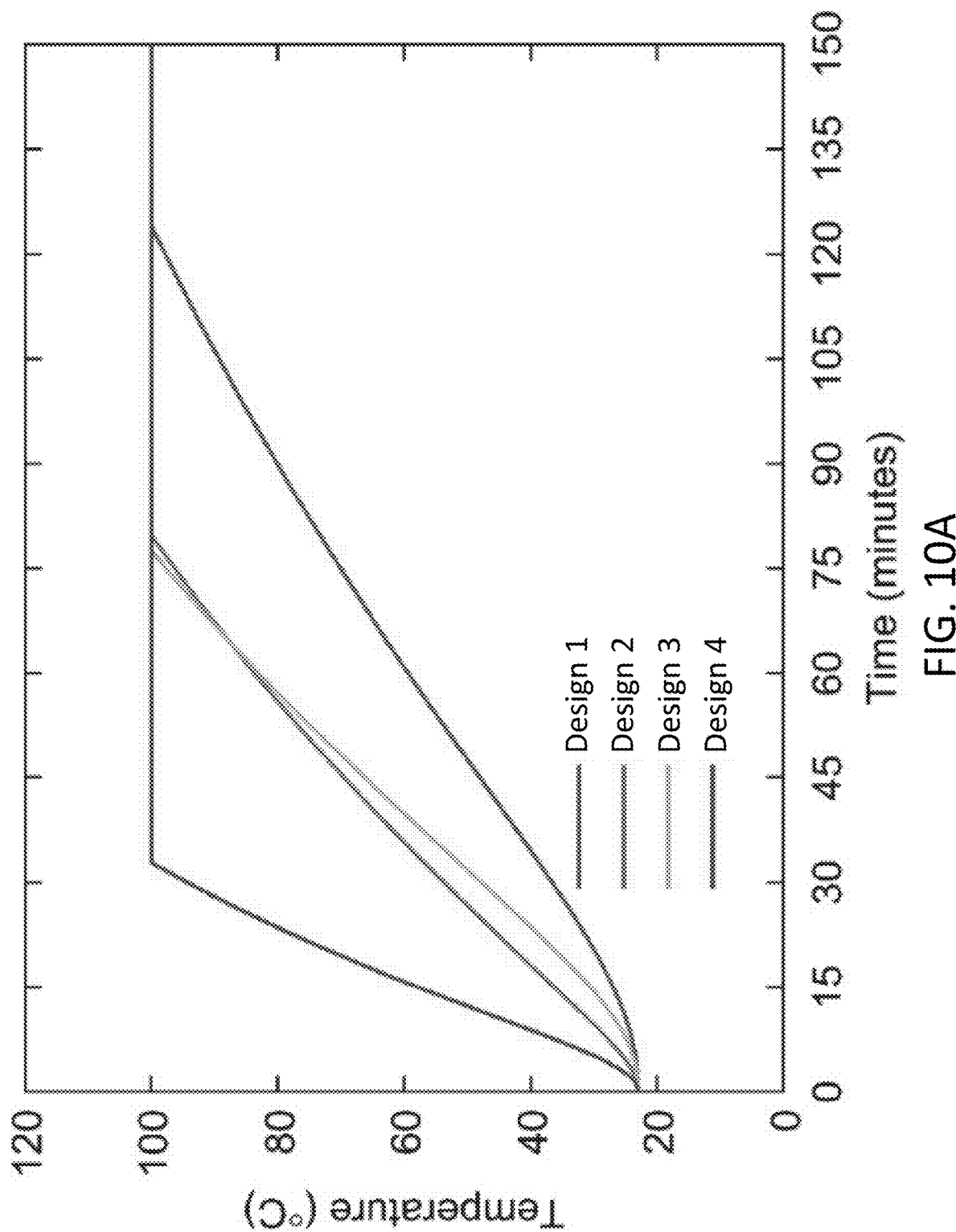
FIG. 10A shows the temperature multiple solar vapor generators as a function time, according to various implementations of the disclosure.
Figure 10B:
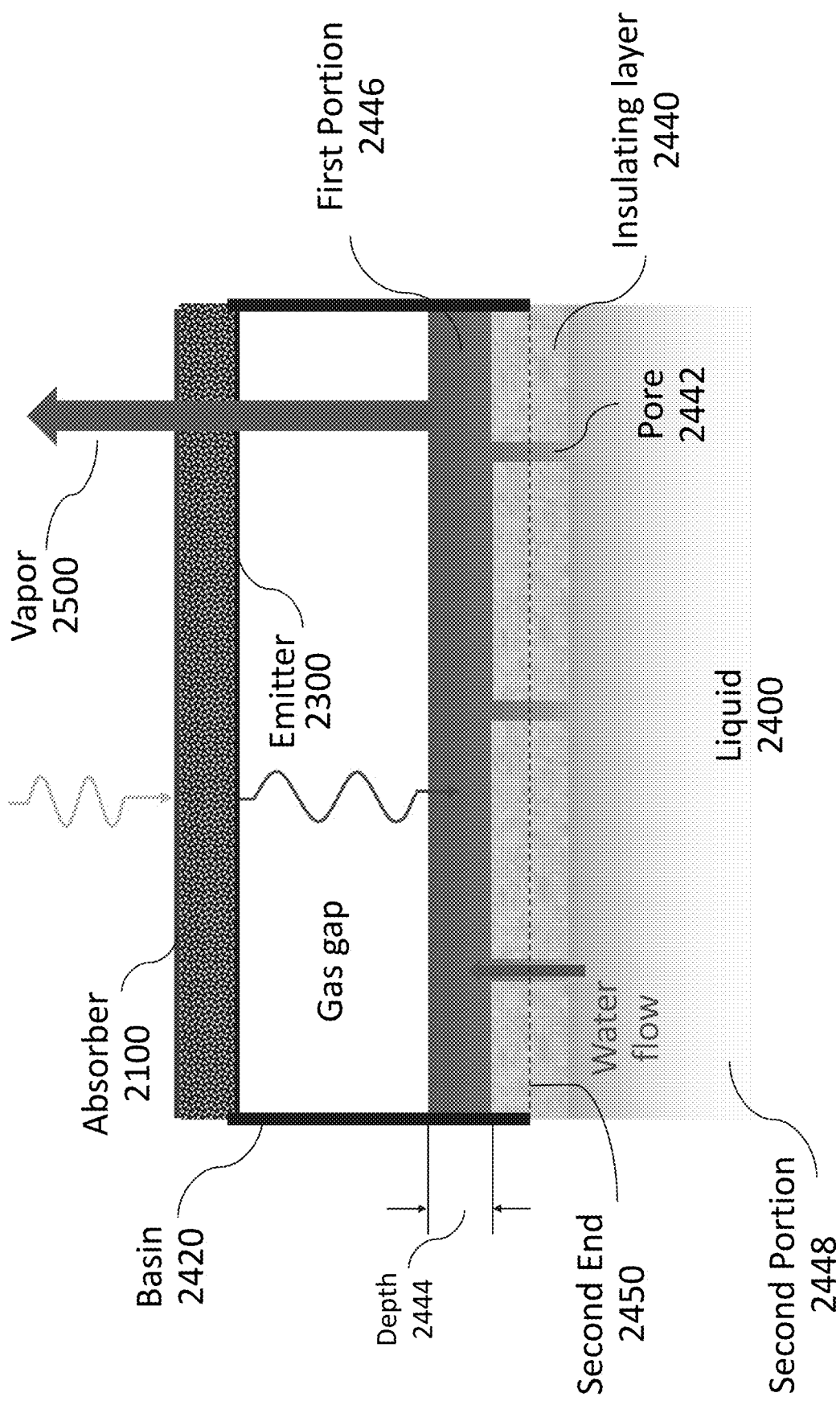
FIG. 10B shows an exemplary solar vapor generator with a thermally insulating layer submerged below the liquid, according to various implementations of the disclosure.

In some implementations, the basin 2420 may be comprised of a plurality of sidewalls defining two ends (i.e., a first end and a second end). The sidewalls may extend from the first end, which may be substantially open and coupled to the emitter 2300 and/or the housing 2200, to the second end, which may be substantially open and, in some instances, positioned in the liquid 2400. In this manner, the solar vapor generator 2000 may be deployed onto a body of liquid 2400 (e.g., a pool, a pond) larger than the solar vapor generator 2000 where the liquid 2400 flows into the basin 2420. The first open end may be used to allow vapor to flow out of the basin 2420 and into, for example, the interior cavity 2210 of the housing 2200 during operation. The second open end may be disposed opposite to the first open end and, in some instances, submerged into the liquid 2400 (e.g., a pond, a pool). In some implementations, the basin 2420 may be coupled to a thermally insulating layer to position the thermally insulating layer at a desired depth in the liquid 2400, as described in further detail below. An exemplary basin 2420 according to these implementations is also shown in FIG. 10B detailing a second end 2450 in the basin 2420

The basin 2420 may be formed from various materials that are compatible for high temperature operation in lieu of the boiling point of the liquid 2400 and preferably thermally insulating to reduce heat losses to the environment. For example, the basin 2420 may be formed from materials including, but not limited to polyetherimide, glass-ceramic composites (e.g., MACOR®), and fiberglass. The basin 2420 may be hydrophobic or solvophobic depending on the type of liquid 2400, reducing the deposition of contaminants from the liquid 2400 along the sides of the basin 2420. In some implementations, the interior cavity of the basin 2420 may also be coated with an IR reflective coating to reflect unabsorbed thermal radiation back to the liquid 2400 and/or the emitter 2300, thus reducing radiative heat losses.

Outlet

Figure 6A:
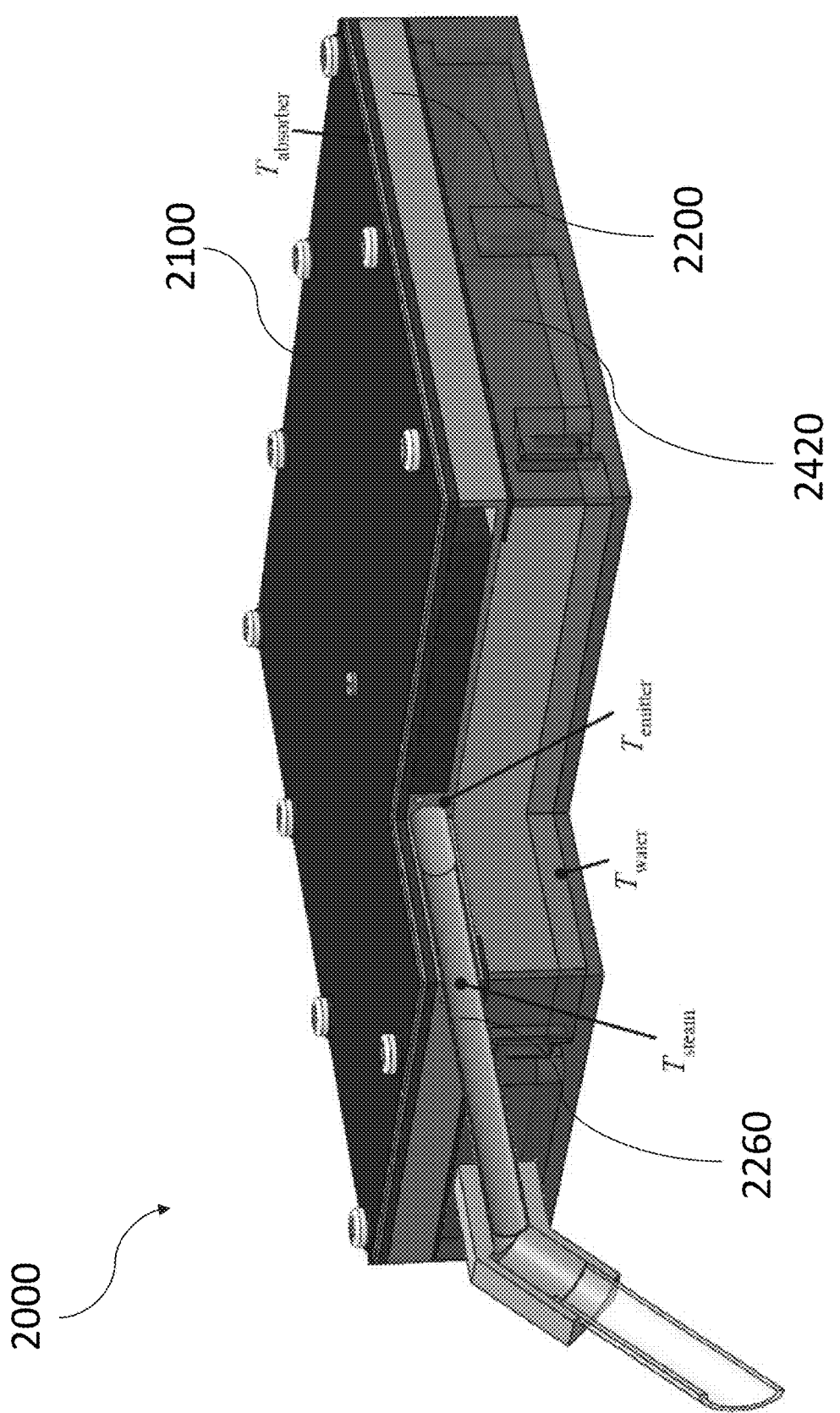
FIG. 6A is a top perspective view of the solar vapor generator shown in FIG. 4A detailing the outlet inserted into the housing of the solar vapor generator.

The outlet 2260 may be used to allow the superheated vapor 2500 to flow out of the solar vapor generator 2000. In some implementations, the outlet 2260 may be a substantially tubular pipe, where at least a portion of the outlet 2260 is inserted into an opening in the housing 2200 for assembly, as shown in FIG. 6A. The outlet 2260 may then be coupled to subsequent piping systems using standard pipe fittings for distribution and consumption. The outlet 2260 may be coupled to the housing 2200 using various coupling mechanisms including, but not limited to screw fasteners, bolt fasteners, clips, clamps, brazing, welding, and adhesives.

Figure 6B:
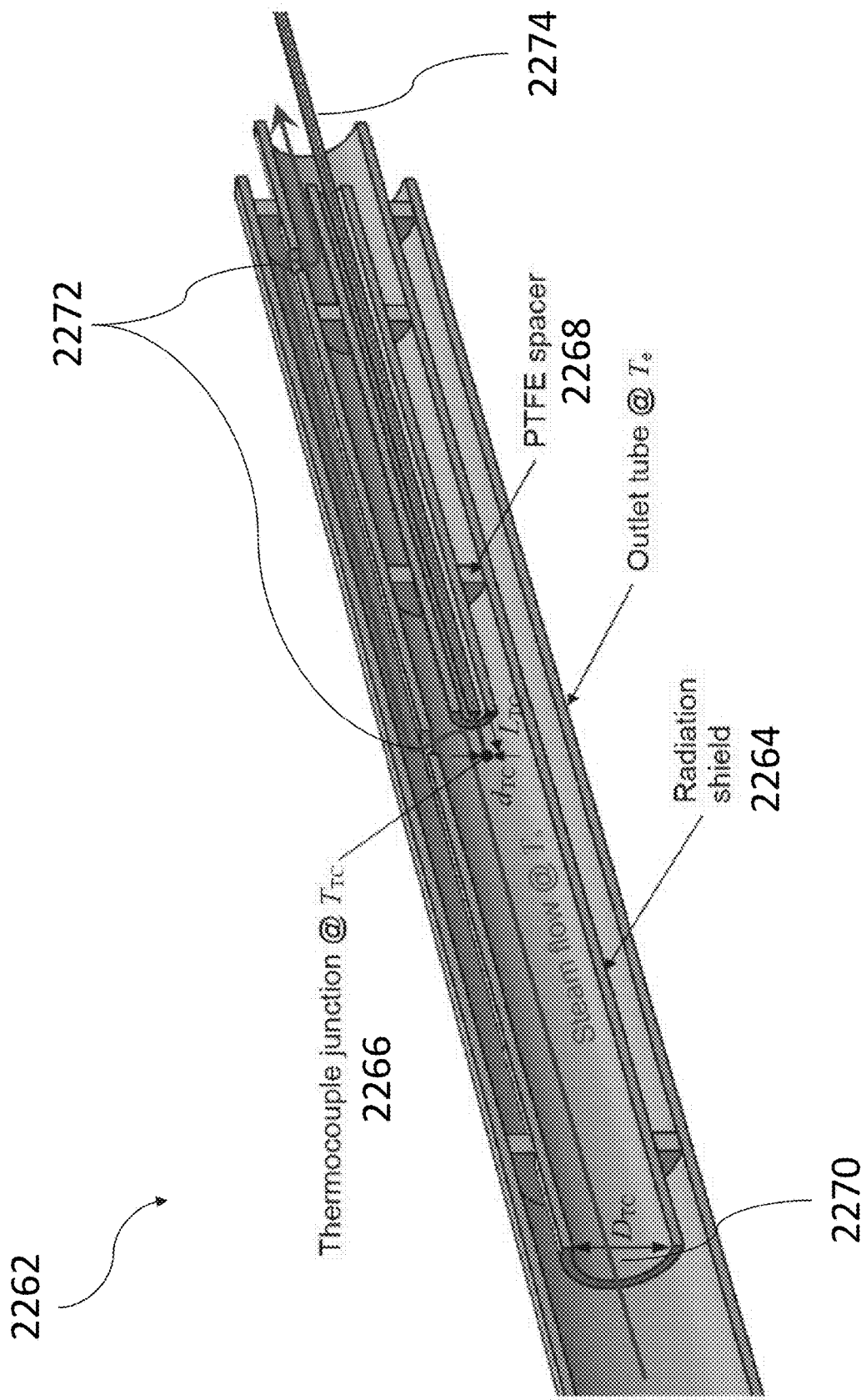
FIG. 6B is an illustration of a radiation-shielded thermocouple to measure the temperature of steam flowing out of the solar vapor generator of FIG. 6A.

The outlet 2260 may also include a radiation-shielded thermocouple, or other temperature sensor, disposed in the tubular section of the outlet 2260 to more accurately measure the temperature of the superheated vapor 2500. Typically, measuring the temperature of a gas may be affected by radiation from various components in the solar vapor generator 2000 and the ambient environment. To improve the accuracy of the temperature measurement, the radiation-shielded thermocouple may be designed such that radiation contributions are reduced and thermal convection contributions from the superheated vapor 2500 are increased. FIG. 6B shows an exemplary radiation-shielded thermocouple 2262, which may be comprised of a tubular housing 2264, partially disposed inside the outlet 2260 to provide radiation shielding to reduce thermal radiation contributions. A thermocouple 2266 may be disposed within the tubular housing 2264 to measure the temperature. The thermocouple 2266 may be supported by one or more spacers 2268 such that a sensing end of the thermocouple 2266 is physically suspended within the tubular housing 2264 to reduce thermal conduction contributions through the solid material of the thermocouple and shield. The one or more spacers 2268 may also be thermally insulating. Superheated vapor 2500 may flow from an entrance 2270, through a plurality of pass-through holes 2272 disposed along the sides of the tubular housing 2264, and through an exit 2274, as illustrated in FIG. 6B.

Thermally Insulating Cover

In some implementations, a thermally insulating cover 2600 may be disposed onto the absorber 2100 to thermally insulate the solar vapor generator 2000, particularly the absorber 2100, from the ambient environment by reducing thermal conduction and convection heat losses. A portion of the thermally insulating cover 2600 should be substantially transparent at solar wavelengths to allow sunlight to pass through the thermally insulating cover 2600 and absorbed by the absorber 2100. Various optically transparent, thermally insulating structures and/or materials may be used to form the thermally insulating cover 2600 including, but not limited to silica aerogels, conventional single, double, or triple-glazed glass structures, and vacuum-insulated windows (e.g., two glass panels mechanically spaced apart where the cavity formed by the two panels is evacuated). In some implementations, the transparent portions of the thermally insulating cover 2600 may be configured to be reflective at IR wavelengths to further reduce thermal radiation losses from the absorber 2100 (e.g., by reflecting thermal radiation emitted by the absorber 2100 back to the solar vapor generator 2000). The thermally insulating cover 2600 may also be formed from materials that provide ultraviolet resistance and chemical stability to increase the operable lifetime.

In some implementations, the thermally insulating cover 2600 may be laid onto the absorber 2100 of the solar vapor generator 2000 without further coupling to the solar vapor generator 2000. In some implementations, the thermally insulating cover 2600 maybe coupled to the housing 2200 and/or a thermally insulating enclosure (described in more detail below) using various coupling mechanisms including, but not limited to screw fasteners, bolt fasteners, clips, clamps, brazing, welding, and adhesives.

Figure 7A:
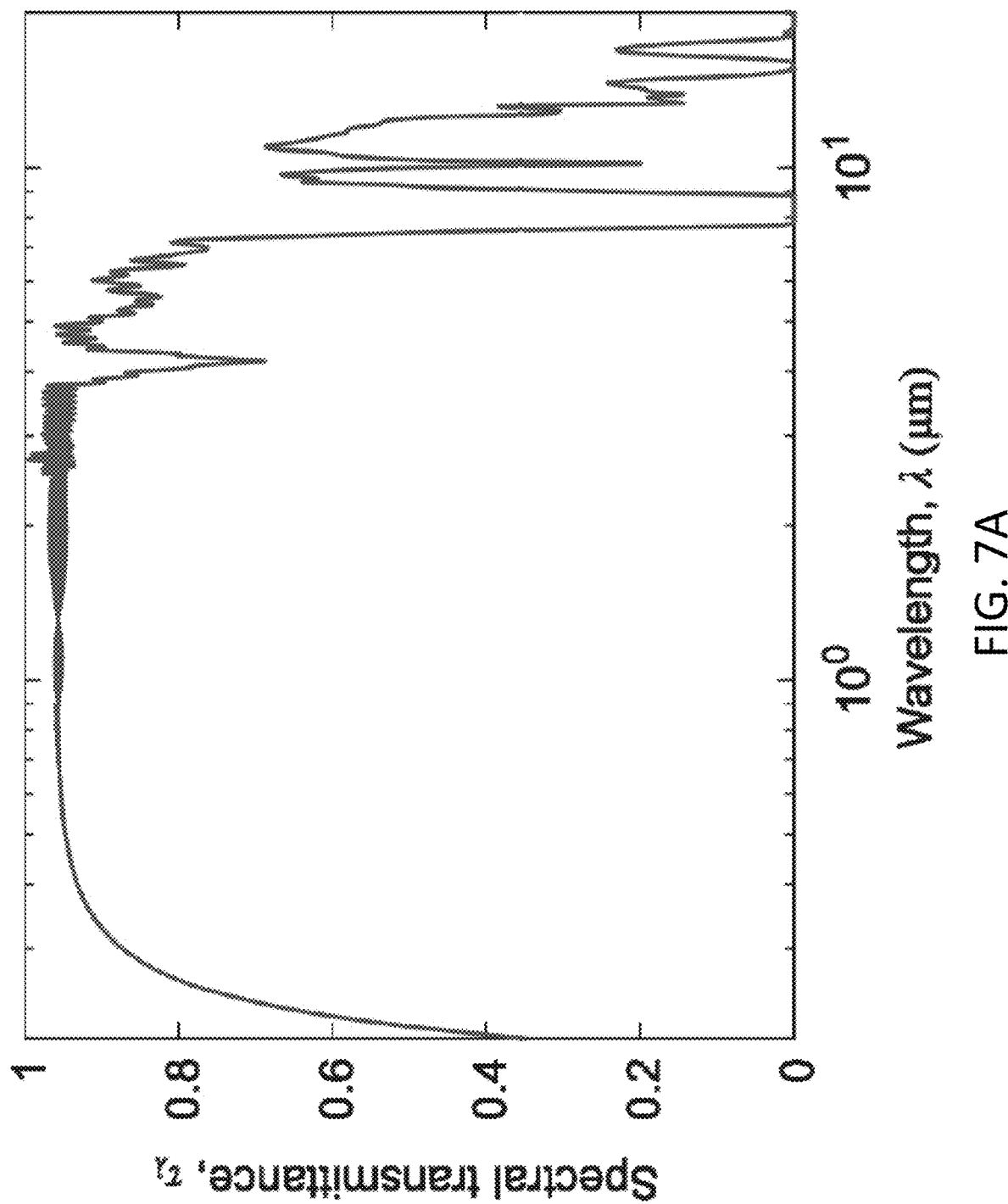
FIG. 7A shows the direct spectral transmittance of the 50 μm thick FEP film of FIG. 7A as a function of wavelength.

In one example, the thermally insulating cover 2600 may be a single- or multi-layer polymer glazing system. In general, a glazing system comprises a layer of one or more transparent sheets that are each separated by a gap of near-stationary air such that natural convection is substantially reduced. Typically, as the number of layers in the glazing system increases, the thermal resistance increases while the solar transmittance decreases. Conventional glazing systems, such as the single, double, or triple-glazed glass structures mentioned above, utilize bulky and expensive glass sheets. In contrast, polymers may provide a higher solar transmittance than glass due to a lower index of refraction (less reflection losses) and may also allow for lower costs and flexibility. For example, fluorinated ethylene propylene (FEP) may be used as the transparent polymer, which can exhibit a spectral transmittance greater than about 95% at solar wavelengths, as shown in FIG. 7A, and a total solar transmittance of about 95% for a 50 µm thick film (IR transmittance about 45%), while providing chemical stability and ultraviolet resistance.

Figure 7B:
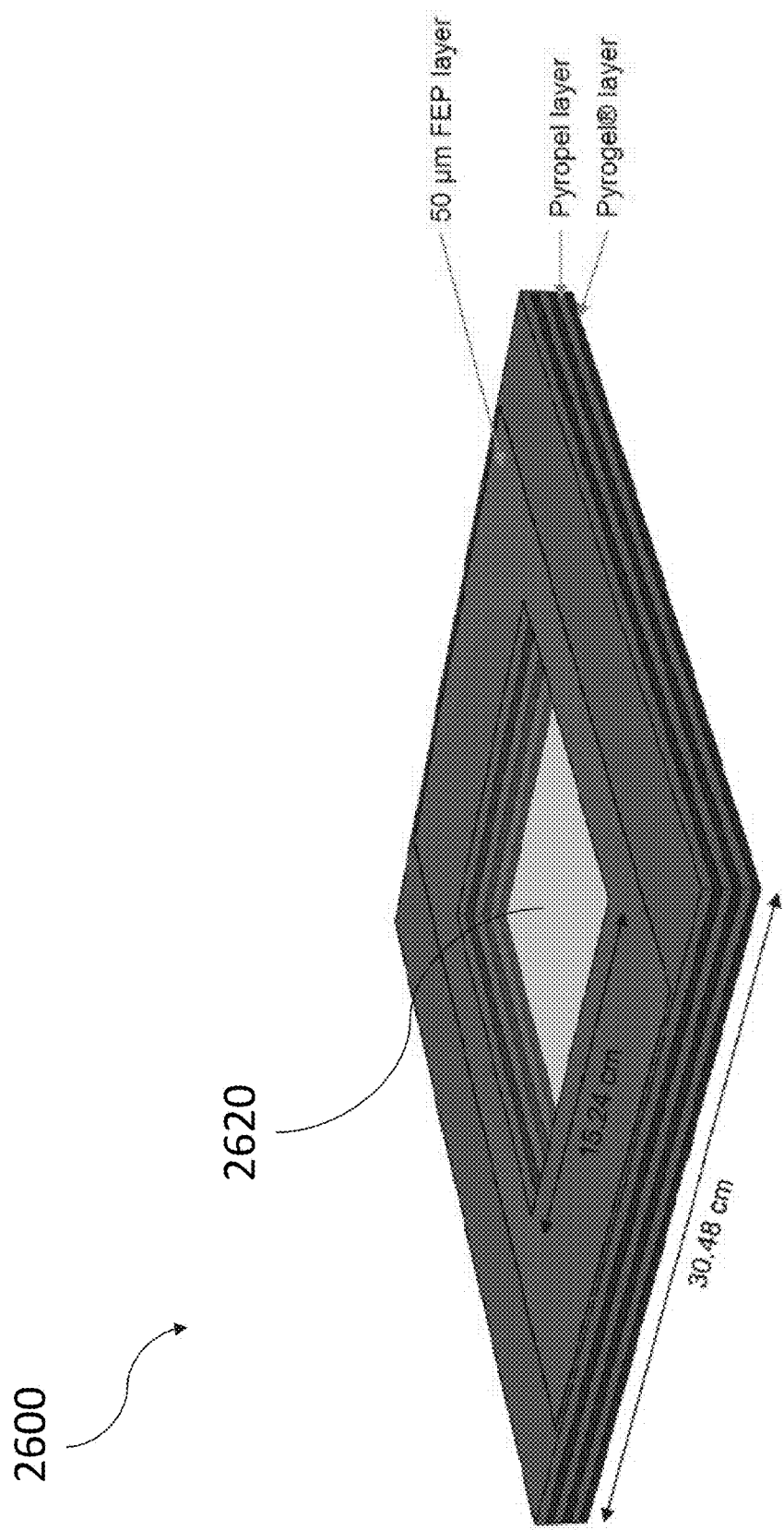
FIG. 7B shows a top perspective view of the thermally insulating cover.

FIG. 7B shows an exemplary thermally insulating cover 2600 as a triple layer polymer glazing system. Each layer in the polymer glazing system may be comprised of an aerogel felt sheet (e.g., Aspen Aerogels® Pyrogel® 2250 DS), a semi-rigid polyimide foam board (e.g., Pyropel MD12), and a 50 µm thick FEP layer (e.g., Toray Advanced Film Co. TOYOFLON™). Pyropel may provide a combination of low thermal conductivity (0.036 W m$^{-2}$K$^{-1}$ at room temperature) and mechanical rigidity to support compliant materials such as the FEP film. Pyrogel® was chosen for its ultra-low thermal conductivity (0.015 W m$^{-2}$K$^{-1}$ at room temperature) to reduce thermal conduction losses through the thermally insulating cover. As shown in FIG. 7B, each Pyropel and the Pyrogel® layer may include an opening 2620 aligned with the plurality of layers to form an aperture comprised of three layers of FEP film with an air gap between each layer.

Thermally Insulating Enclosure

A thermally insulating enclosure 2700 may also be disposed around the solar vapor generator 2000, to thermally insulate the solar vapor generator 2000 from the ambient environment by reducing heat losses, such as thermal conduction, convection, and radiation losses. In some implementations, the thermally insulating enclosure 2700 may be combined with a thermally insulating cover 2600 described above to substantially enclose the solar vapor generator 2000. The thermally insulating enclosure 2700 may be formed from one or more thermally insulating materials able to operate at varying temperature ranges including, but not limited to aerogels, fiberglass, mineral wool, polyurethane foam, and expanded polystyrene foam.

Figure 8:
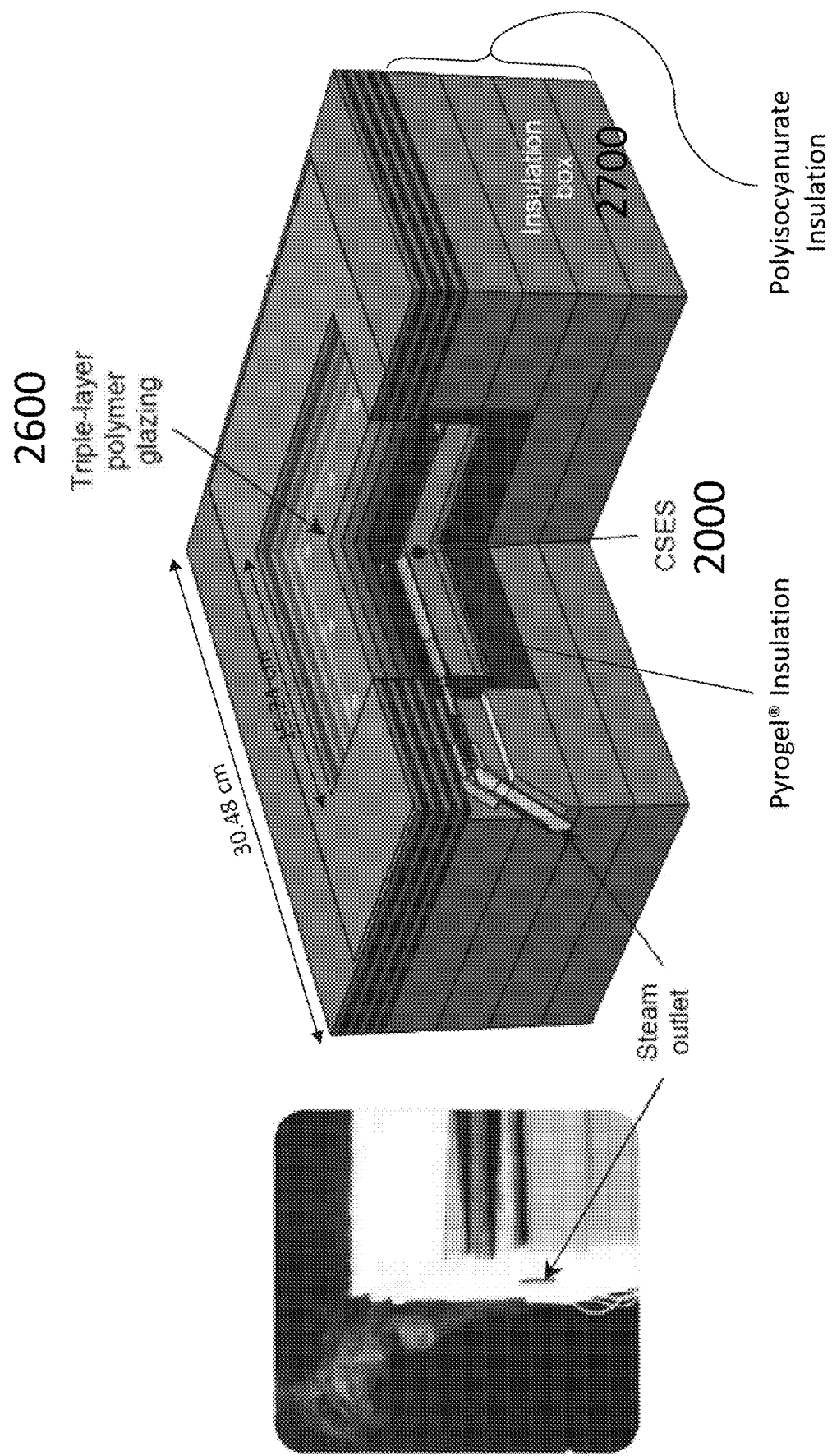
FIG. 8 shows the exemplary solar vapor generator shown in FIG. 4A disposed in a thermally insulating enclosure and a thermally insulating cover to reduce heat losses from the solar vapor generator to the surrounding environment.

In one example shown in FIG. 8, the thermally insulating enclosure 2700 may include one or more layers of aerogel felt (e.g., Aspen Aerogels® Pyrogel® 2250 DS), disposed on the bottom of the solar vapor generator 2000 (e.g., where the basin 2420 may be located) and the sides of the solar vapor generator 2000. This may be additionally followed by several layers of a mechanically rigid, thermally insulating material such as polyisocyanurate insulation (e.g., Dow TUFF-R™ with a thermal conductivity 0.027 Wm$^{-2}$K$^{-1}$ at room temperature) to form rigid enclosure to mechanically support the solar vapor generator 2000 during operation and handling. In some implementations, the thermally insulating enclosure 2700 may include different amounts of thermal insulation disposed on the bottom of the solar vapor generator 2000 compared to the sides of the solar vapor generator 2000. For example, the solar vapor generator 2000 may have a sufficiently large lateral area (e.g., a large top and bottom surface) such that heat losses from the sides of the solar vapor generator 2000 are small. The amount of thermal insulation disposed on the sides of the solar vapor generator 2000 may be substantially reduced, or eliminated entirely.

Radiation Shield

Figure 9:
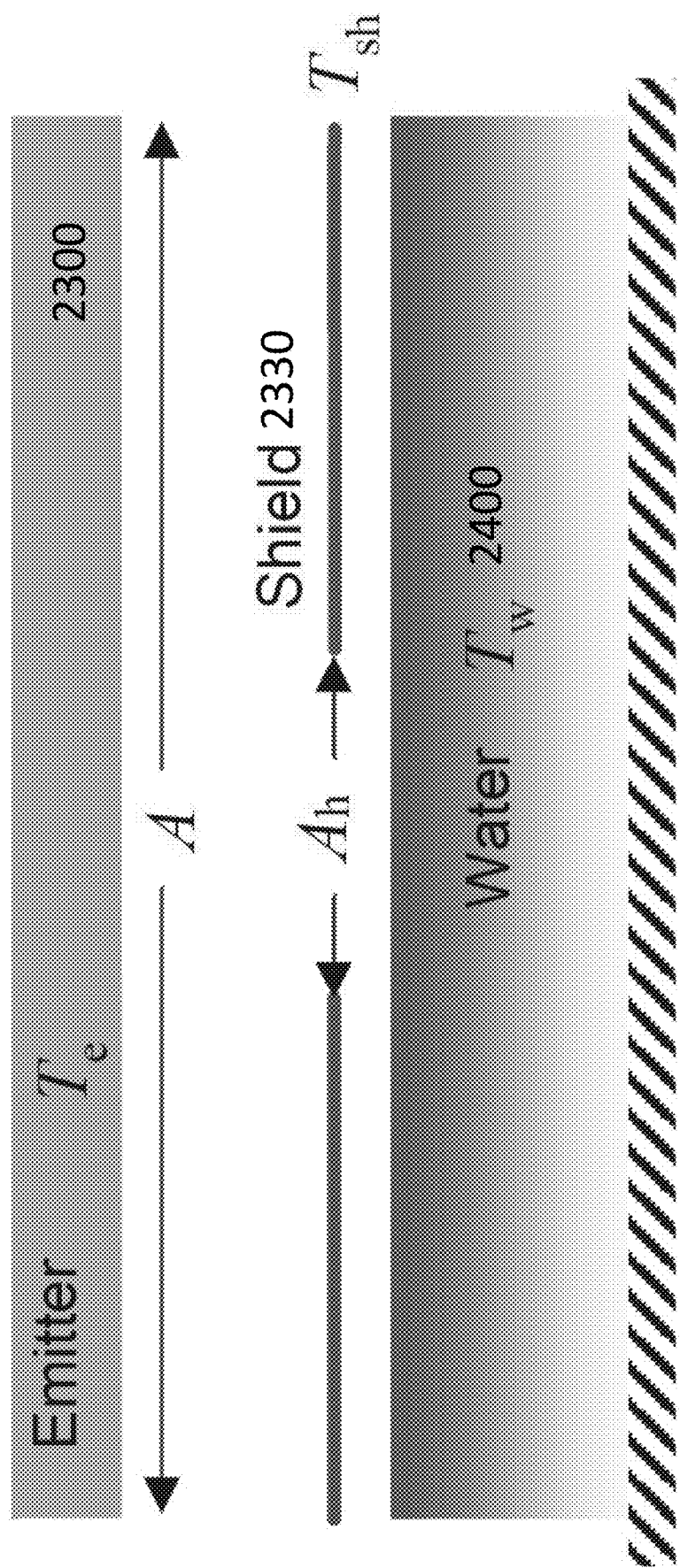
FIG. 9 is an illustration detailing the implementation of a radiation shield in a solar vapor generator, according to some implementations of the disclosure.

In some implementations, a radiation shield 2330 may be disposed between the emitter 2300 and the basin 2420, as shown in FIG. 9, to control the temperature of the emitter 2300 and/or the temperature of the superheated vapor 2500. The radiation shield 2330 may be a reflective layer with one or more openings to allow thermal radiation from the emitter 2300 to pass through the radiation shield 2330 and heat the liquid 2400. The thermal radiation incident on the remaining portions of the radiation shield 2330 may be reflected back to the emitter 2300 and, hence, "recycled" in the sense that heat remains in the emitter 2300/housing 2200. In this manner, the radiation shield 2330 may control the view factor from the emitter 2300 to the liquid 2400, thus changing the amount of radiative heating of the liquid 2400.

By adjusting the total area of the one or more openings, the portion of the total thermal radiation emitted by the emitter 2300 used to radiatively heat the liquid 2400 may be changed. If the total area of the one or more openings is relatively large, more thermal radiation is used to radiatively heat the liquid 2400, resulting in a higher vapor generation rate and a lower superheated vapor 2500 temperature/emitter 2300 temperature. Conversely, if the total area of the one or more openings is relatively small, more thermal radiation is recycled, resulting in a lower vapor generation rate and a higher superheated vapor 2500 temperature/emitter 2300 temperature. In one example, a radiation shield 2330 may be constructed from aluminium foil and placed between the emitter 2300 and the liquid 2400 to reduce the effective emissivity of the emitter 2300 allowing control of the emitter 2300 and superheated vapor 2500 temperature. The degree of shielding may be controlled by changing the size of the central hole in the radiation shield 2330.

The radiation shield 2330 may be various types of apertures including, but not limited to an iris diaphragm and a Venetian blind type shutter. In some implementations, the radiation shield 2330 may be actively controllable to allow dynamic adjustments to the vapor generation rate and/or the superheated vapor 2500 temperature. The radiation shield 2330 may be coupled to a sensor (e.g., the radiation-shielded thermocouple 2262 described above) to for an active feedback loop, where the combination of the actively controllable radiation shield 2330 and the sensor allows for the superheated vapor 2500 leaving the solar vapor generator 2000 to maintain a temperature corresponding to a desired lower threshold. For example, variations in solar irradiation due to the time of day (e.g., morning, afternoon, evening), inclement weather (e.g., cloudy, partly cloudy), and season (e.g., summer, fall, winter, spring) may affect the amount of solar irradiation incident on the solar vapor generator 2000. Thus, by adjusting the amount of thermal radiation used to radiatively heat the liquid 2400, the superheated vapor 2500 may be maintained at a desired temperature.

Submerged Thermally Insulating Layer

The volume of liquid 2400 used in the solar vapor generator 2000 may vary from a relatively small volume of liquid 2400 stored in the basin 2420 to a relatively large volume of liquid 2400 such as an open pool or tank of liquid 2400. The volume of liquid 2400 may be proportional to the thermal mass radiatively heated by the emitter 2300. Generally, a larger (or smaller) thermal mass corresponds to a longer (or shorter) period of time (also referred to herein as the "transient heat-up time") to heat the liquid 2400 to its boiling point.

In some implementations, it may be beneficial to reduce the transient heat-up time to accommodate the diurnal and intermittent nature of sunlight. A reduction in the transient heat-up time may be accomplished, at least in part, by reducing the thermal mass of the liquid 2400 heated by the emitter 2300. Additionally, the thermal mass of the components in the solar vapor generator 2000 (e.g., the absorber 2100, the housing 2200, and the emitter 2300) may also be reduced. FIG. 10A shows the transient thermal response for several exemplary designs of the solar vapor generator 2000 where the liquid 2400 is water. Design 1 uses RVC foam as a porous media in the housing 2200 for superheating (discussed in more detail below). Design 2 uses a copper mesh as a porous media in the housing 2200 for superheating and the thermal mass of the components of the solar vapor generator 2000 are further reduced by 75%. Design 3 is substantially similar to Design 1 with the difference being the mass of the liquid 2400 in the basin 2420 is reduced by 75%. Design 4 is substantially similar to Design 2 with the difference being the mass of the liquid 2400 in the basin 2420 is reduced by 75%. As shown in FIG. 10A, a reduction in thermal mass may substantially reduce the transient heat-up time.

In one example, the thermal mass of the liquid 2400 may be reduced by decreasing the size of the components of the solar vapor generator 2000 and/or decreasing the volume of liquid 2400 being vaporized. However, this may adversely affect the amount of superheated vapor 2500 that can be produced by the solar vapor generator 2000. In order to decrease the thermal mass of the liquid 2400 without substantially reducing the generation rate of superheated vapor 2500, it should be appreciated that the liquid 2400 may support vibrational absorption bands that enable thermal radiation from the emitter 2300 to be absorbed in relatively small volumes.

For examples where the liquid 2400 is water, FIG. 3A, shows the penetration depth for water at wavelengths longer than about 2.5 µm ranges from between about 1 µm to about 100 µm as previously discussed. Nearly all the thermal radiation may be absorbed within a few integer multiples of the penetration depth (e.g., from about 3 µm to about 300 µm). As a result, the thermal radiation and the resultant heating of the liquid 2400 is initially confined near the surface of the liquid 2400. The heat deposited near the surface of the liquid 2400 may then thermally conduct and/or convect to the remaining volume of liquid 2400 below the surface. Thus, larger volumes of liquid 2400 typically take a longer amount of time to be heated.

In some implementations, a thermally insulating layer 2440 may be disposed in the liquid 2400 (e.g., fully submerged) proximate to the surface of the liquid 2400 at a depth 2444 such that the liquid 2400 is partitioned into a first portion 2446 including the surface of the liquid 2400 and a second portion 2448 comprising the remaining volume of liquid 2400, as illustrated in FIG. 10B. The thermally insulating layer 2440 may be used where the solar vapor generator 2000 utilizes a deep basin 2420 or a large body of liquid 2400 (e.g., a pond). The first portion of liquid 2446 may be heated by the emitter 2300 while the thermally insulating layer 2440 substantially reduces heat transfer between the first portion of liquid 2446 and the second portion of liquid 2448. In this manner, the heat deposited in the liquid 2400 may be substantially localized to the first portion of liquid 2446, thus the thermal mass of the liquid 2400 is effectively reduced to the first portion of liquid 2446 resulting in shorter transient heat-up times.

The thermally insulating layer 2440 may be formed from thermally insulating, structured materials (e.g., perforated, porous materials) including, but not limited to exfoliated graphite and carbon foam, air filled bubble wraps, and other materials with a low effective thermal conductivity. In this manner, thermal conduction and convection between the first portion of liquid 2446 and the second portion of liquid 2448 may be substantially reduced while still allowing the liquid 2400 to flow through the thermally insulating layer 2440, albeit in a restricted manner. Thus, the second portion of liquid 2400 may replenish the first portion of liquid 2446 in a controlled manner as it is vaporized so as to maintain a reduced thermal mass without significantly affecting the total yield of superheated vapor 2500. Additionally, the thermally insulating layer 2440 may also be sufficiently buoyant such that the solar vapor generator 2000 can be floated onto the liquid 2400 during operation. The buoyancy of the thermally insulating layer 2440 may be further designed to maintain a desired depth 2444 of the first portion of liquid 2446 during operation and/or the depth of the thermally insulating layer 2440. The porosity 2442 of the thermally insulating layer 2440 may also be relatively larger compared to conventional solar vapor generators that utilize a porous medium for intake of liquid 2400. The larger porosity 2442 enables the thermally insulating layer 2440 to be less prone to fouling and also improves ease of cleaning.

In some implementations, additional buoys and weights may be disposed on the solar vapor generator 2000 to control the depth 2444 of the thermally insulating layer 2440 within the liquid 2400. In this manner, the volume and depth of the first portion of the liquid 2446 may be adjusted by the buoys and/or weights, thus affecting the thermal mass of the liquid 2446 and the transient heat-up time.

Solar Concentration

It should be appreciated that the solar vapor generator 2000 as described herein may generate vapor 2500 under 1 sun illumination or less. Therefore, unlike conventional solar vapor generator systems, solar concentration is not necessary for operation of the solar vapor generator 2000, which simplifies and reduces the cost of the solar vapor generator 2000. However, in some applications, higher temperature vapor 2500 and/or higher flow rates of vapor 2500 may be desirable to warrant use of a solar concentrator. For example, the solar vapor generator 2000 may be used in a power cycle where the costs of a solar concentrator are small compared to the potential improvements to the efficiency and/or power output of the power cycle that greater superheating engenders. In another example, a solar concentrator may be used in locations where direct sunlight is less available (e.g., at higher latitudes).

In such applications, a solar concentrator may be utilized with the solar vapor generator 2000. The solar concentrator should be in optical communication with the absorber 2100 to direct sunlight towards the absorber 2100, but may or may not be physically coupled to the solar vapor generator 2000.

The solar concentrator may provide solar concentrations ranging from about 1 sun to about 20 suns. A higher solar concentration corresponds to a higher heat input into the solar vapor generator 2000, which allows for superheated vapor 2500 at higher temperatures and a higher vapor generation rate. In some implementations, the solar concentrator may be a stationary non-tracking optical concentrator.

Pumping Mechanism

Generally, when the liquid 2400 reaches its boiling point, any additional heat added to the liquid 2400 will cause the liquid 2400 to evaporate, thus producing vapor 2500. If the solar vapor generator 2000 is substantially sealed, the generation of vapor 2500 may increase the internal pressure of the solar vapor generator 2000, causing the boiling point of the liquid 2400 to increase. Thus, as more heat is added and more vapor 2500 is produced, the temperature and the pressure of the liquid 2400 would continually increase. Once the solar vapor generator 2000 is opened to the ambient environment (e.g., through use of a valve), the pressure difference between the interior of the solar vapor generator 2000 and the ambient environment may cause the vapor 2500 to flow out of the solar vapor generator 2000. Instead, if the solar vapor generator 2000 is substantially open, such that there is no flow restriction, any additional heat added to the liquid 2400 will mostly cause evaporation (i.e., the pressure rise in the solar vapor generator 2000 may be negligibly small).

In the case where the solar vapor generator 2000 is configured to partially restrict the flow of vapor 2500 (e.g., filling the interior cavity 2210 of the housing 2200 with a porous medium 2230, or designing the interior cavity 2210 to have a long flow path 2240), the pressure at the interface of the liquid 2400 and the vapor 2500 may be higher than the ambient pressure. In some implementations, the solar vapor generator 2000 may be configured to have a sufficiently low flow resistance such that the vapor pressure generated by vaporizing the liquid 2400 and producing vapor 2500 drives a flow of vapor 2500 through the interior cavity 2210 of the housing 2200 and the outlet 2260.

In some implementations, the flow resistance may be sufficiently large such that the vapor pressure is not sufficient to drive a flow of vapor 2500 through the solar vapor generator 2000. For example, the solar vapor generator 2000 may be scaled to a larger size, resulting in a substantially longer flow path 2240, which might result in greater superheating, but a higher flow resistance. In such instances, a pump may be coupled to the solar vapor generator 2000 to help drive the vapor 2500 along the longer flow path 2240. For example, the housing 2200 may include one or more pairs of inlets and outlets to allow a pump to be coupled along a portion of the flow path 2240.

An Exemplary Solar Vapor Generator in Combination with a Thermal Storage System

In some implementations, the solar vapor generator 2000 may incorporate and/or couple to a thermal storage system to enable the controlled generation of vapor 2500, particularly during periods of time when solar irradiation is substantially reduced (e.g., during inclement weather) or nonexistent (e.g., during night time). For example, the absorber 2100 may generate excess heat (e.g., more heat is generated than is necessary to superheat the vapor 2500 to a desired temperature), which may then be controllably released such that the production of superheated vapor 2500 is less sensitive to fluctuations in incident sunlight (e.g., day and night cycles). The thermal storage system may be passively controlled such that the amount of heat transferred from the thermal storage system to the solar vapor generator 2000 is based, in part, on the temperature difference between the thermal storage medium and at least one component of the solar vapor generator 2000 (e.g., the housing 2200, the liquid 2400, the emitter 2300). The thermal storage system may also be actively controlled where a controlling mechanism (e.g., a valve, a switch) may be used to not only maintain a desired output (e.g., a desired vapor generation rate, a desired vapor 2500 temperature), but to also allow changes to the desired output during operation.

The thermal storage system may be comprised of a material having a high heat capacity disposed in the interior cavity 2210 of the housing 2200. For example, the thermal storage medium may be a phase change material having a phase transition temperature higher than the boiling point of the liquid 2400 such that the emitter 2300 may be maintained at a temperature sufficient to evaporate the liquid 2400 while allowing at least a portion of heat to be stored as latent heat. In another example, the thermal storage medium may be a material having a high heat capacity, but does not change phases within the operating temperature range of the liquid 2400. The thermal storage medium may be various materials including, but not limited to paraffin wax, water, molten salts, concrete, glycol, hydrofluorocarbons, hydrocarbons, and perfluorocarbons. In some instances, the thermal storage medium may be the same liquid 2400 used for vapor generation, but substantially sealed such that the boiling point is higher than the liquid 2400 that produces vapor 2500.

The thermal storage system may also be a standalone system that couples to the solar vapor generator 2000 to transfer heat. For example, the thermal storage system may be comprised of a thermal storage medium, as described above, with a pumping system that flows a working fluid to transfer heat from the thermal storage system to the solar vapor generator 2000 through, for instance, one or more inlets/outlets disposed on the housing 2200. The interior cavity 2210 may include a separate set of channels for the working fluid to transfer heat to the housing 2200 and the vapor 2500 without directly contacting the vapor 2500.

An Exemplary Solar Vapor Generator in Combination with a Heat Recovering System

The solar vapor generator 2000 may also be combined with a heat recovering system, particularly in applications where the vapor 2500 does not need to be used at elevated temperatures such as the boiling point of the liquid 2400 or higher. For example, in desalination applications, the solar vapor generator 2000 may vaporize seawater and the resultant steam may then be condensed into potable water. As the vapor 2500 cools down and condenses into a liquid, heat is released, which is typically lost to the ambient environment. The function of the heat recovering system is to thus utilize at least a portion of the heat for use in various processes. In some implementations, the heat recovering system may utilize heat from the solar vapor generator 2000 for various industrial processes (e.g., cooking, washing, drying), heating residential or commercial spaces, and replacing fossil fuels as a heat source in conventional power plants. In some instances, the heat recovering system may transfer heat back to the solar vapor generator 2000 to evaporate additional liquid 2400. The heat recovering system may be coupled to the outlet 2260 or to a piping system coupled to the outlet 2260 to extract heat from the vapor 2500. The heat recovering system may receive heat via a heat exchanging system, such as a parallel-flow or a counter-flow heat exchanger where a working fluid receives heat from the vapor 2500.

An Exemplary Solar Vapor Generator in a Multi-Stage System

The solar vapor generator 2000 may be designed to operate at a pressure higher than ambient pressure. In some implementations, the solar vapor generator 2000 may be pressurized by restricting the flow of vapor 2500 either by introducing a restriction internally within the solar vapor generator 2000 along the flow path 2240 or by introducing a restriction downstream after vapor 2500 flows out of the solar vapor generator 2000 through the outlet 2420. For example, a valve may be disposed down stream from the solar vapor generator 2000. Once a restriction is introduced, the solar vapor generator 200 will naturally self-pressurize during operation (e.g., when the liquid 2400 is heated). For example, the pressure in the basin 2420 may be from about 1.1 atm to about 3.0 atm. The higher pressure may increase the boiling point of the liquid 2400, which typically increases the saturation temperature at which the vapor 2500 is generated. Additionally, the higher pressure may also provide a driving force to flow the vapor 2500 through the solar vapor generator 2000 and the outlet 2260. In this manner, by pressurizing the solar vapor generator 2000, higher temperature vapor 2500 may be generated and transported to a second system coupled to the solar vapor generator 2000 for subsequent use.

In some implementations, the second system may contain a second fluid (i.e., a liquid or a gas) that receives a portion of the heat carried by the vapor 2500. The second fluid may be substantially identical to the vapor 2500 and/or the liquid 2400 or may have a different chemical composition and/or contain different amounts of contaminants and/or impurities. In one example, a contact-based heat exchanger may be used where the vapor 2500 may be flowed directly onto or into the second fluid thus transferring heat to the second fluid. For instance, the solar vapor generator 2000 may be used to produce potable water from a contaminated source where the vapor 2500 is mixed with air such that the heat from the vapor 2500 is used to heat the air for subsequent climate control.

In another example, the heat exchanger (e.g., a shell/tube heat exchanger) may be used where the heat from the vapor 2500 is transferred to the second fluid through a solid material, such as a metal, a ceramic, or a polymer shaped and dimensioned such that the thermal resistance between the vapor 2500 and the second fluid is relatively small. In this manner, the second fluid may be physically isolated from the vapor 2500 in cases where mixing of the vapor 2500 and the second fluid is undesirable. For instance, the second fluid may be chemically incompatible with the liquid 2400. In another instance, it may be desirable to only transfer heat from the vapor 2500, thus preserving the properties of the vapor 2500, such as in desalination where the vapor 2500 may condense into a more purified state of the liquid 2400.

In some implementations, the second fluid may be sufficiently heated to cause the second fluid to vaporize (e.g., by evaporation and/or boiling). Thus, a portion of the heat carried by the vapor 2500 may be used to produce additional vapor from a different source of liquid. The second system may also be pressurized using similar approaches to the solar vapor generator 2000. The pressure of the second system may be greater than the ambient pressure, but lower than the pressure of the solar vapor generator 2000. In one aspect, the pressure of the second system may be tailored to allow vapor 2500 to flow from the solar vapor generator 2000 into the second system. In another aspect, the second system may also produce vapor at elevated temperatures and pressures greater than ambient conditions, to then be used in subsequent systems operating at a lower pressure, such as in a multi-stage system.

The second system may also receive additional heat from other sources, such as the sun, a power plant, or a nuclear reactor. In one example, the second system may be another solar vapor generator 2000 that operates at a lower pressure compared to the first solar vapor generator 2000. Sunlight may be absorbed by the second system to generate heat, which may be used to vaporize the second fluid and/or further superheat the vapor 2500 from the first solar vapor generator 2000 to higher temperatures. In some implementations, the second system may also operate in the dark where no additional heat other than from the vapor 2500 is provided. Under these conditions, the second system may still be pressurized.

Figure 21A:
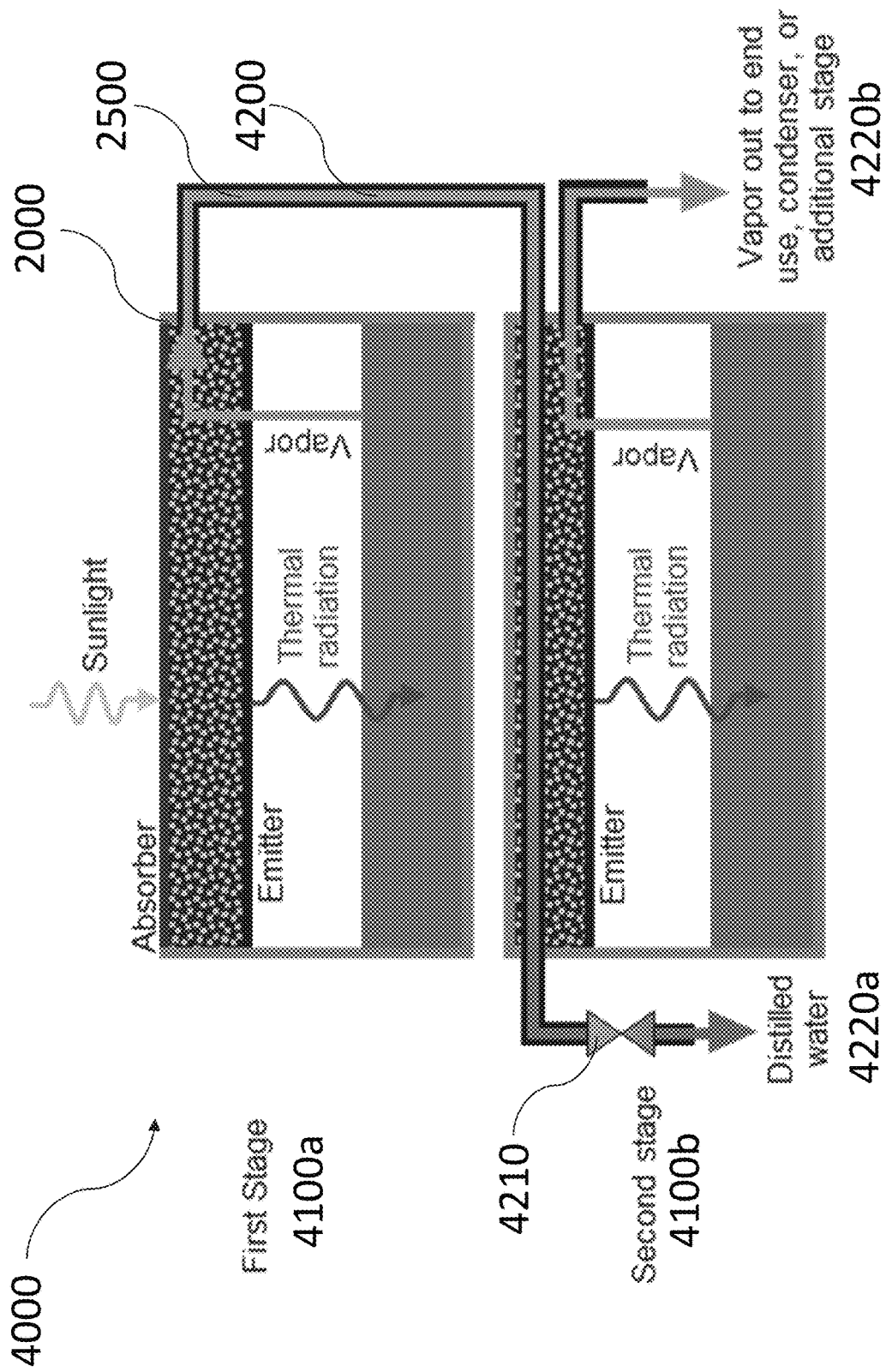
FIG. 21A shows an exemplary two-stage system that utilizes a solar vapor generator as the first stage and a heat exchanger as the second stage.

FIG. 21A details an exemplary two-stage system 4000 where the first stage 4100a is a solar vapor generator 2000. Vapor 2500 may flow out of the first stage 4100a via piping 4200 and into a second stage 4100b. The piping 4200 may extend through the second stage 4100b. In some implementations, the second stage 4100b, as illustrated in FIG. 21A, may also be a contactless system that utilizes an emitter, physically separated from a liquid, to radiatively heat a liquid and produce a vapor. The second stage 4100b may receive heat directly from the vapor 2500 (e.g., latent heat released when the vapor 2500 condenses into a liquid) rather than from direct sunlight. For example, in the case where the liquid in both the first stage 4100a and the second stage 4100b is water, it may be preferable in some applications for the first stage 4100a to be pressurized such that the boiling point of the liquid 2400 is at least about 135° C., corresponding to a pressure of about 3 atm. A valve 4210 may also be disposed at the outlet 4220a to facilitate pressurization of the first stage 4100a. In this manner, distilled water may be produced at the outlet 4220a and the vapor produced by the second stage 4100b may flow out of the outlet 4220b for direct consumption, into a condenser, or into yet another stage coupled to the two-stage system 4000. In this manner, a plurality of stages may be sequentially arranged to recover a significant portion of the latent heat of vaporization of the first stage. For the second stage 4100b, and subsequent stages, the separation between the basin and the emitter may also substantially reduce fouling of any pipes and/or tubes used for heat exchange and for flowing the vapor generated by the second stage 4100b.

Figure 21B:
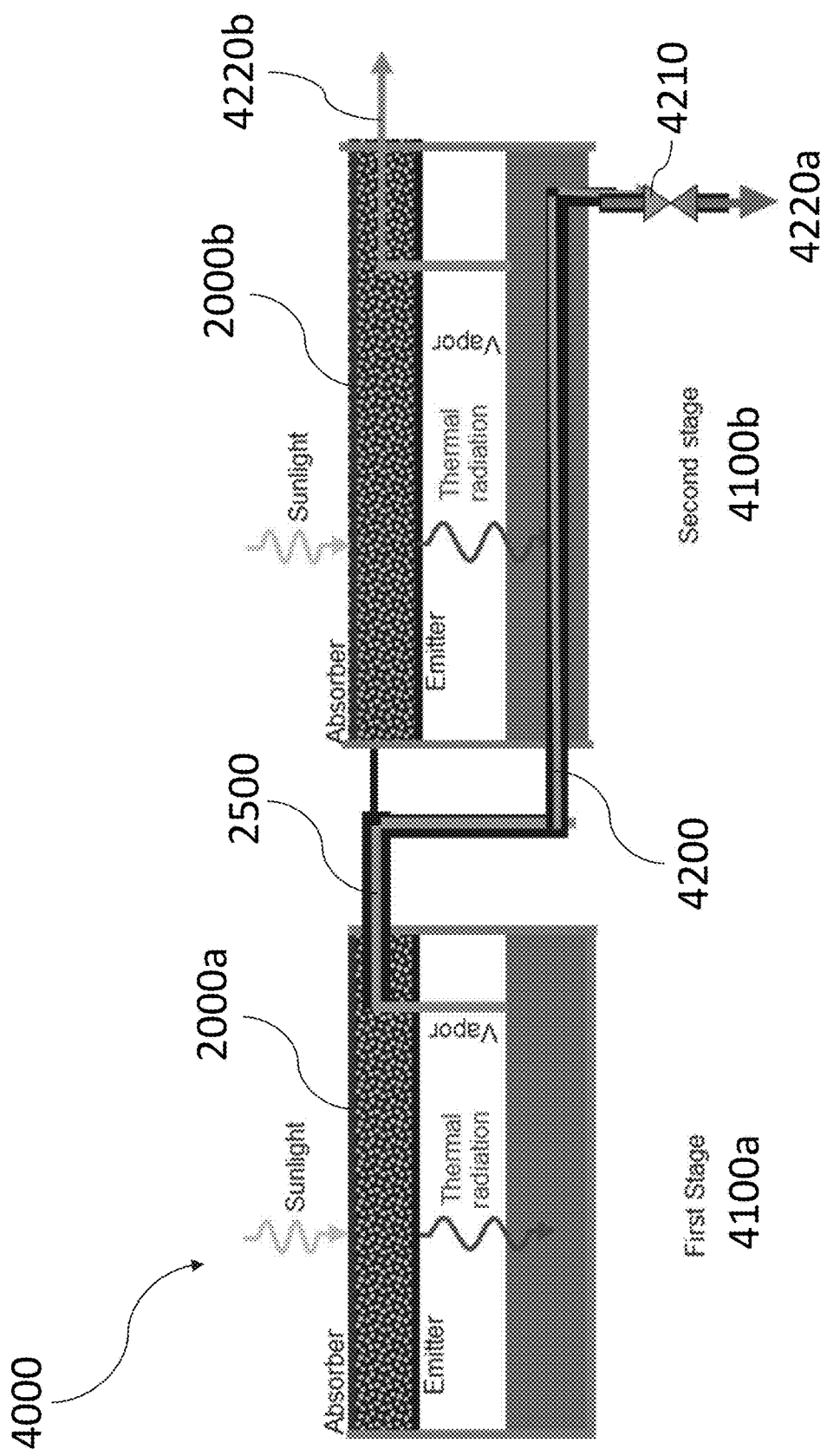
FIG. 21B shows an exemplary two-stage system that utilizes two solar vapor generators as the first stage and the second stage.

FIG. 21B shows another exemplary two-stage system 4000 where the first stage 4100a and the second stage 4100b are both a solar vapor generator 2000. In this case, the first stage 4100a may flow vapor 2500 through piping 4200, which is guided through the liquid of the second stage 4100b. In some implementations, as the vapor 2500 flows through the second stage 4100b, latent heat may be released by the vapor 2500 as the vapor 2500 condenses into a liquid. The vapor 2500 and/or liquid may then flow out through the outlet 4220a. A valve 4210 may be included to pressurize the liquid in the first stage 4100a such that the pressure of the first stage 4100a is higher than the pressure of the second stage 4100b such that the boiling point of the liquid 2400 is also higher. In this way the vapor 2500 from the first stage will condense at a higher temperature than the liquid of the second stage will evaporate, such that the heat released when the vapor 2500 from first stage condenses is transferred to the evaporating water in the second stage. The second stage 4100b may also absorb sunlight, which provides an additional heat source to facilitate vaporization of the liquid and superheating of the vapor in the second stage 4100b. Since the second stage 4100b will receive heat from both sunlight and the vapor 2500, the second stage 4100b may be larger in area than the first stage 4100a, or may have a higher vapor productivity. In some implementations, subsequent stages may be coupled in a serial manner to the second stage 4100*b* (e.g., the second stage 4100*b* is connected to a third stage, the third stage is connected to a fourth stage, etc.). Each subsequent stage may be operated at a pressure lower than the preceding stage. In this manner, a plurality of stages may be sequentially arranged to recover a significant portion of the latent heat of vaporization of the first stage. This may be controlled, in part, by utilizing a pressure regulation valve on each stage to control the pressure.

Figure 21C:
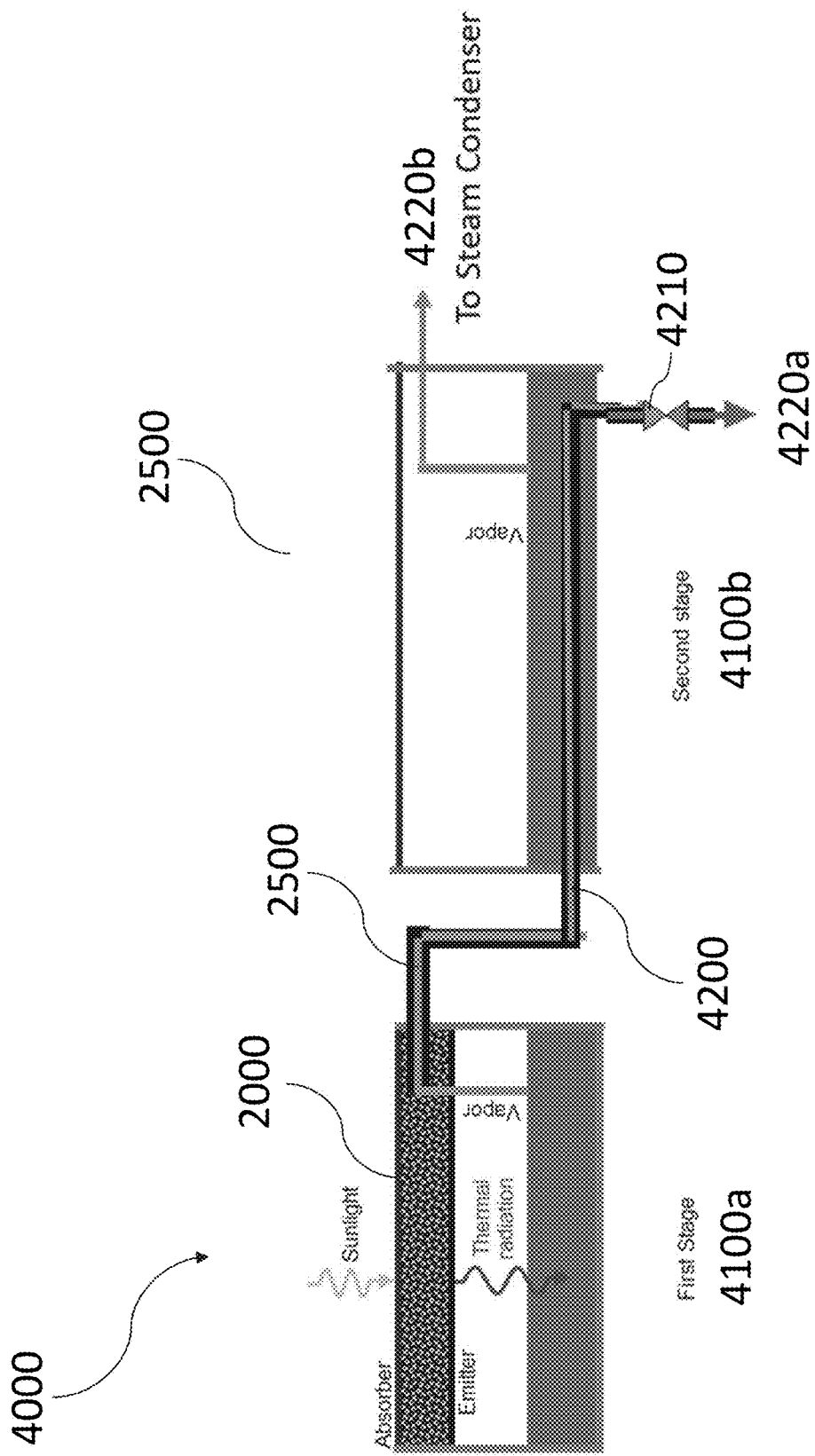
FIG. 21C shows an exemplary two-stage system that utilizes a solar vapor generator as the first stage and a heat exchanger that operates in the dark as the second stage.

FIG. 21C shows another exemplary two-stage system 4000 where the first stage 4100*a* is a solar vapor generator 2000 and the second stage 4100*b* is a heat exchanger. In this case, the first stage 4100*a* may flow vapor 2500 through piping 4200, which is guided through the liquid of the second stage 4100*b*. In some implementations, as the vapor 2500 flows through the second stage 4100*b*, latent heat may be released by the vapor 2500 as the vapor 2500 condenses into a liquid. The vapor 2500 and/or liquid may then flow out through the outlet 4220*a*. A valve 4210 may be included to pressurize the liquid in the first stage 4100*a* such that the pressure of the first stage 4100*a* is higher than the pressure of the second stage 4100*b* such that the boiling point of the liquid 2400 is also higher. In this way the vapor 2500 from the first stage will condense at a higher temperature than the liquid of the second stage will evaporate, such that the heat released when the vapor 2500 from first stage condenses is transferred to the evaporating water in the second stage. In this example, the second stage 4100*b* may not receive additional heat from another source (e.g., sunlight). In some implementations, subsequent stages may be coupled in a serial manner to the second stage 4100*b* with each subsequent stage operated at a lower pressure than the preceding stage. In this manner, a plurality of stages may be sequentially arranged to recover a significant portion of the latent heat of vaporization of the first stage. In some implementations, the vapor 2500 generated by the first stage 4100*a* may be transported along a relatively long distance to a location where the second stage 4100*b* and subsequent stages are located. In one example, the solar vapor generator 2000 may be used to augment a conventional multi-effect distillation system based on the design shown in FIG. 21C.

In one exemplary application, a multi-stage desalination system may be comprised of a plurality of solar vapor generators 2000 coupled together such that the vapor 2500 from one solar vapor generator 2000 flows into another solar vapor generator 2000. In this manner, the heat supplied by the vapor 2500 when condensing into a more purified liquid 2400 may be recycled and used to generate more vapor 2500 and purified liquid 2400, increasing the overall yield rate and system efficiency. In another exemplary application, the solar vapor generator 2000 may supply pressurized steam to drive a steam turbine to produce electrical power and a potable source of water. This may be accomplished by incorporating the solar vapor generator 2000 into a Rankine cycle (e.g., an organic Rankine cycle) to supplement or replace a conventional boiler.

An Empirical Laboratory Demonstration of an Exemplary Solar Vapor Generator

An exemplary laboratory-scale solar vapor generator 3000 was prototyped based on the design shown in FIGS. 4A and 4B. The solar vapor generator 3000 was built for the purposes of demonstrating non-contact evaporation of water, as the liquid, and subsequent superheating of steam, as the vapor, at low solar flux levels. The solar vapor generator 3000 includes a basin machined from polyetherimide (PEI), a high temperature polymer, to reduce thermal conduction losses from the water through the sidewall of the basin. PEI is also hydrophobic, hence inhibits salts and other contaminants in the water from climbing up the sidewall of the basin. In this example, the basin is dimensioned to store up to 400 g of water. The solar vapor generator 3000 also includes a housing machined from 6061 aluminum alloy disposed onto the open end of the basin where the interface between the basin and the housing is sealed using a silicone gasket. The housing includes an interior cavity with an open top end, which is substantially filled with RVC foam to increase the flow path of the saturated steam as it passes through the interior cavity to increase superheating. The bottom of the housing facing the basin was painted with a high-emissivity paint Zynolyte® Hi-Temp, thus forming the emitter. The solar vapor generator 3000 also includes an absorber, comprised of a selective surface (Alanod eta plus®) attached to a 6061 aluminum substrate using a thin layer of silicone adhesive. A silicone gasket was used to seal the interface between the bottom of the absorber (i.e., the bottom of the aluminium substrate) and the top of the RVC foam and the edge of the housing. The solar vapor generator 3000 was assembled using 12 polyether ether ketone (PEEK) assembly screws. PEEK was chosen to reduce heat conduction from the absorber to the water. Leaks through the screw holes were sealed by silicone washers. The solar vapor generator 3000 also included a thermally insulating cover, according to the exemplary design shown in FIG. 7B, and a thermally insulating enclosure, according to the exemplary design shown in FIG. 8.

For this laboratory-scale solar vapor generator 3000, the emitter is disposed at a finite distance from the water surface to reduce fouling. When saturated steam is generated by the radiative heating of the water, the saturated steam leaves the basin and enters the housing through 12 discrete vapor holes disposed towards the edges of the housing. In this manner, saturated steam flows laterally through the RVC foam towards the center of the interior cavity, thus increasing the residence time and enhancing solid-vapor heat exchange. This flow arrangement also forces the steam to exit through the hottest part of the system (i.e., the center) thus increasing the degree of superheat. The superheated steam exits through a single outlet tube, inserted into the housing. A custom-built radiation-shielded thermocouple was inserted into the outlet tube to measure the temperature of the superheated vapor.

Using the laboratory-scaled solar vapor generator 3000 described above, a series of experiments were performed to evaluate the solar vapor generator 3000 under various operating conditions.

Case 1: Laboratory Testing

Figure 11A:
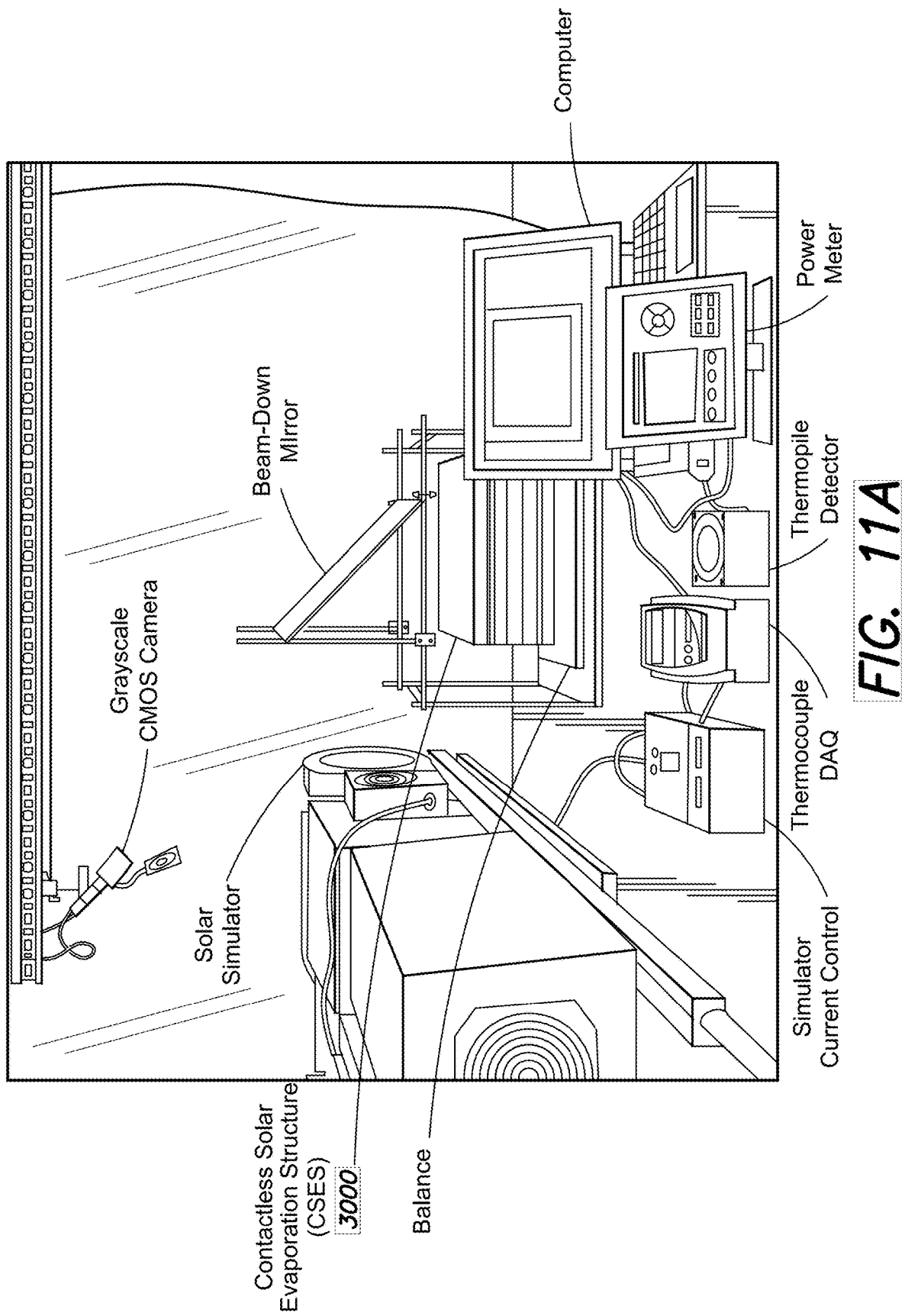
FIG. 11A is a photograph of a metrology system and a solar vapor generator to experimentally characterize the solar vapor generator.

Laboratory testing was conducted where the solar vapor generator 3000 contained 100 g of water and was operated under simulated solar radiation at solar flux levels ranging from 0.5 to 1.8 suns. FIG. 11A shows a photograph of the laboratory experimental setup. A solar simulator (e.g., ScienceTech, SS-1.6K) outputs simulated sunlight, which is directed onto the solar vapor generator 3000 via a mirror. The solar simulator nominally outputs a solar flux of about 1000 Wm$^{-2}$. Due to the slightly divergent beam exiting the simulator, the flux can be adjusted by moving the beam-down mirror/solar vapor generator 3000 assembly toward/away from the simulator outlet to increase/decrease the flux. The flux can then be fine-tuned by adjusting the current delivered to the lamp. Using both techniques, the flux was varied between 500 and 1800 Wm$^{-2}$ over the course of the experiments. A photodetector (e.g., a thermopile, Newport, 818P-001-12 with a Newport, 818P-001-12) and a camera (e.g., a grayscale CMOS camera, Basler acA1920-25 gm) may be used to measure the intensity and spatial distribution of the simulated sunlight incident on the solar vapor generator 3000, respectively. The temperature and the mass of the generated steam (i.e., measured as change in mass of solar vapor generator 3000) were measured using a radiation-shield thermocouple (e.g., Omega 5TC-TT-K-36/40-36/72 with a Omega DAQPRO 5300) and a balance (e.g., A&D EJ3000), both of which were coupled to a computer, respectively.

A typical laboratory experiment included: (1) filling the basin with 100 g of distilled water and placing the solar vapor generator 3000 into the thermally insulated cover and the thermally insulated enclosure, (2) performing a solar flux measurement to measure the amount of sunlight incident on the solar vapor generator 3000, (3) measuring the temperature and mass of steam generated by the solar vapor generator 3000 as a function of time under simulated sunlight under steady state conditions, (4) turning off the solar simulator and measuring the temperature and mass of steam during cool down followed by a final mass measurement. The temperatures and mass were continuously monitored over the course of the experiment.

Figure 11C:
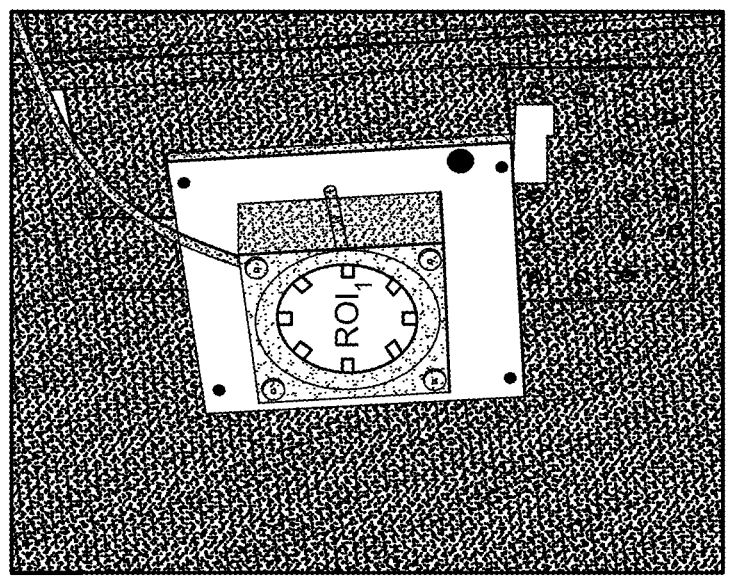
FIG. 11C is a grayscale image of the thermopile detector of FIG. 11B.
Figure 11B:
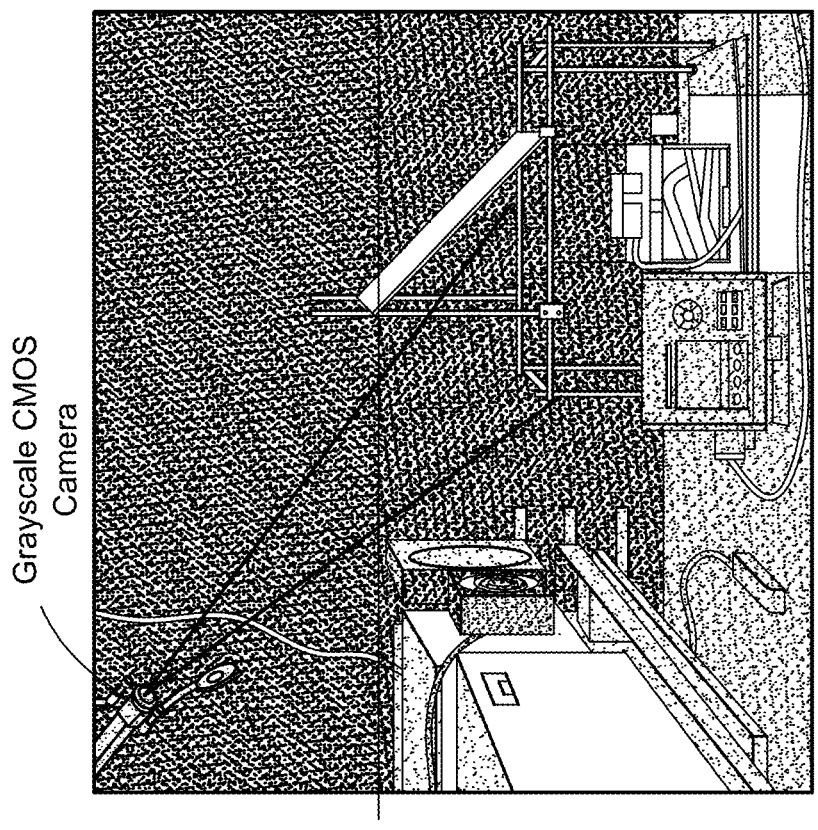
FIG. 11B is a photograph of the metrology system of FIG. 11A where a thermopile detector is placed at a focal plane of a solar simulator to calibrate the incident solar flux before characterization of the solar vapor generator.
Figure 11E:
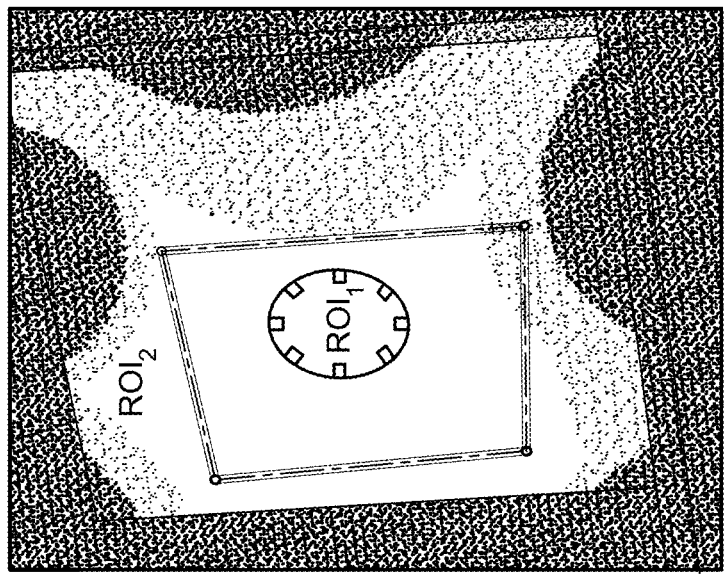
FIG. 11E is a grayscale image of the Lambertian target of FIG. 11D.
Figure 11D:
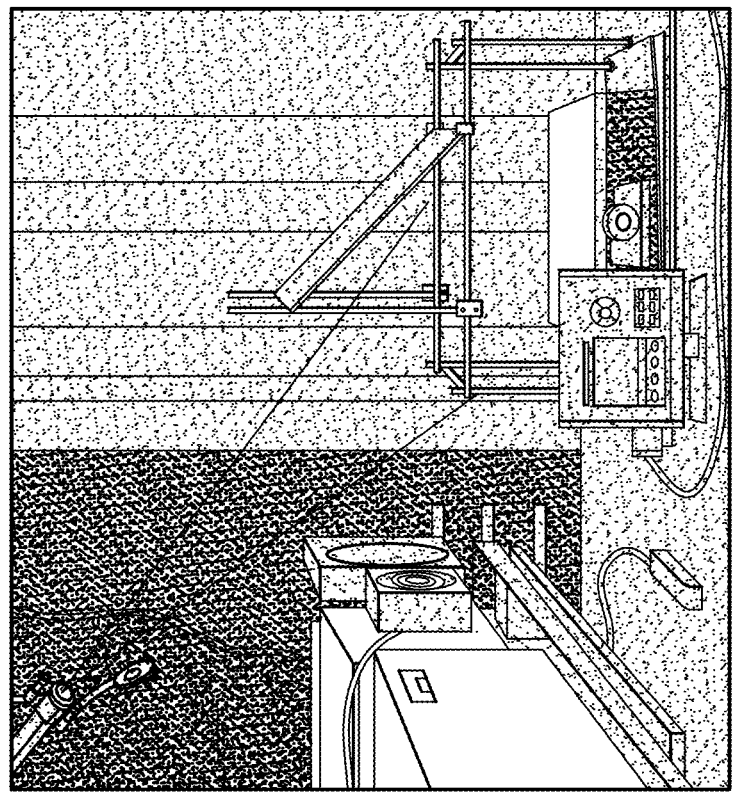
FIG. 11D is a photograph of the metrology system of FIG. 11A where a Lambertian target is placed at a focal plane of the solar simulator to calibrate the spatial variation in incident solar flux before characterization of the solar vapor generation.

Specifically, before installing the solar vapor generator under the simulator beam, the flux was measured according to the following procedure. The simulator lamp was ignited and allowed to stabilize for at least 10 minutes. Using a grayscale CMOS camera mounted above the simulator (FIG. 11A) a sequence of three grayscale images was acquired. First, a thermopile detector (Newport 1918-C) was placed at the focal plane (FIG. 11B), and a grayscale image was acquired (FIG. 11C) while recording the flux reading from the power meter (Newport 818P-040-55) connected to the thermopile. A correction factor of 0.95 was applied to the power meter reading to account for the difference in thermopile absorptance at the calibration point 1064 nm vs. the solar weighted absorptance. Second, a diffusely reflecting target (Lambertian target) was placed at the focal plane (FIG. 11D), and a grayscale image (FIG. 11E) was acquired. The reflected radiance from the Lambertian target is linearly proportional to the incident flux, such that FIG. 11E represents a relative irradiance map (flux map) at the focal plane. Finally, the solar vapor generator and balance were installed at the focal plane (FIG. 11F), and a grayscale image (FIG. 11G) of the absorber aperture was acquired.

Figure 11G:
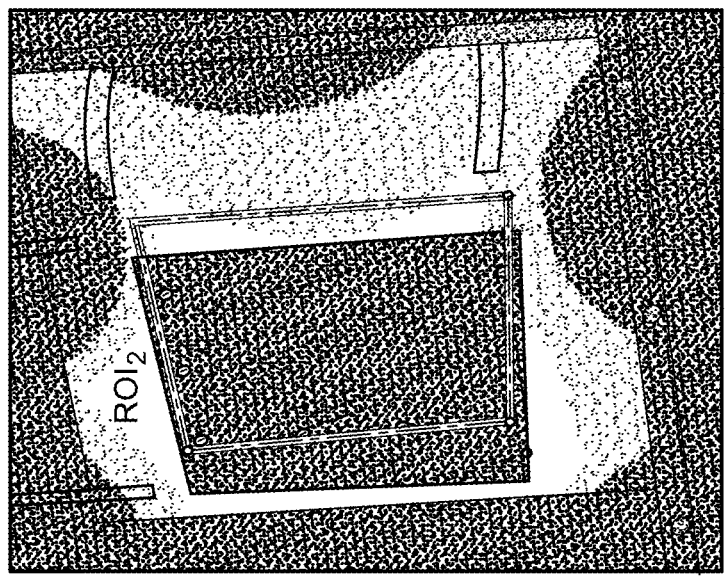
FIG. 11G is a grayscale image of the absorber of the solar vapor generator of FIG. 11F.
Figure 11F:
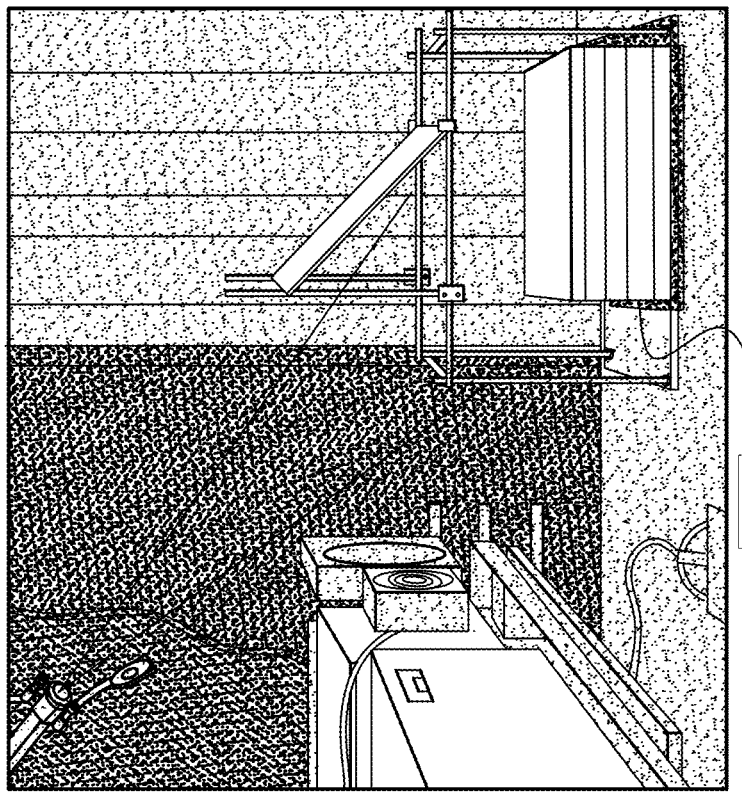
FIG. 11F is a photograph of the metrology system of FIG. 11A with the solar vapor generator installed.
Figure 11H:
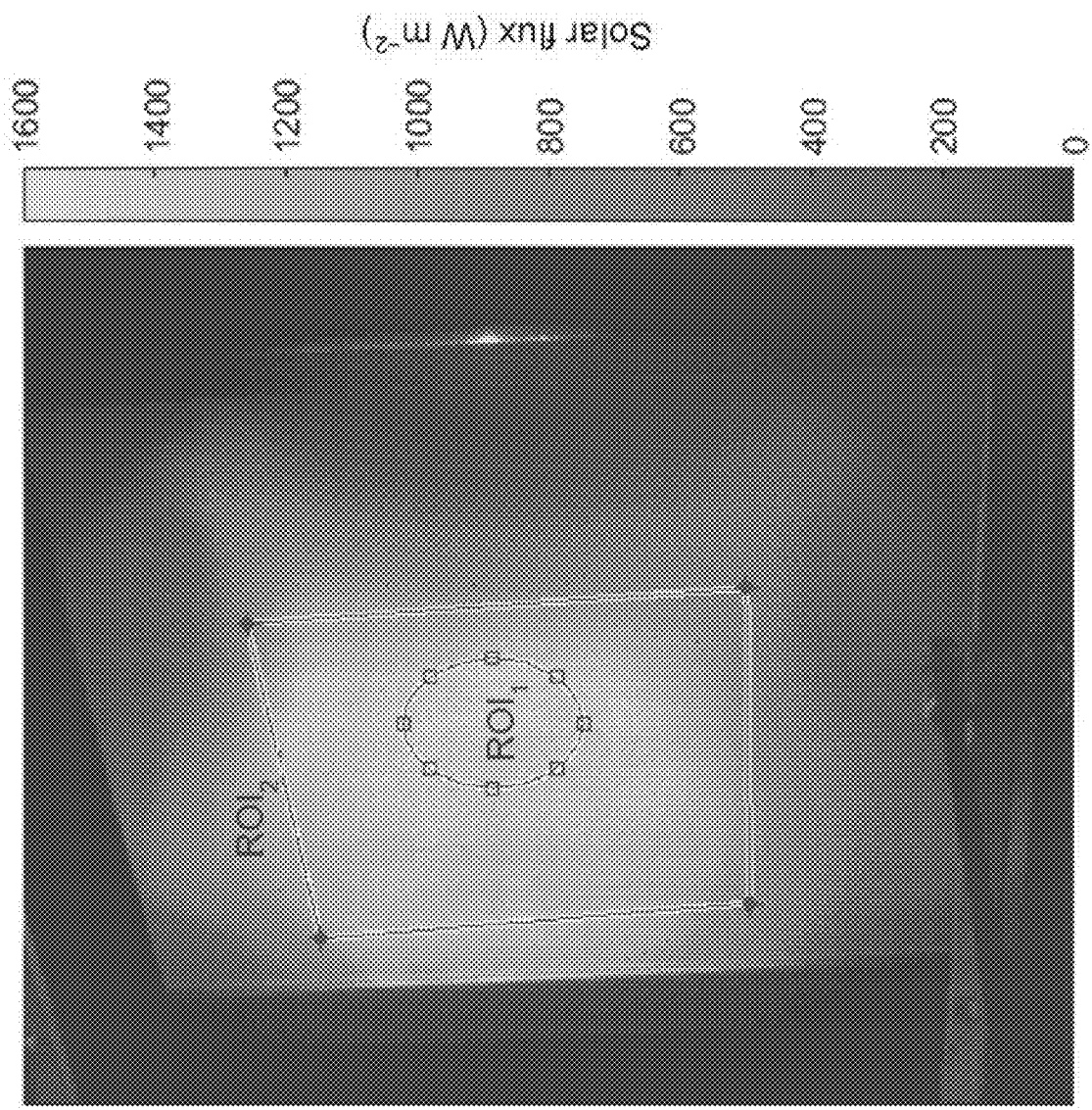
FIG. 11H is a flux map of FIG. 11E, where multiple regions of interest (ROI) are annotated representing the thermopile detector of FIG. 11C ($ROI_1$) and the absorber ($ROI_2$).

Using the reading from the power meter, the relative flux map (FIG. 11H) can be scaled to obtain an absolute flux map. A region-of-interest (ROI) is first traced around the thermopile detector area, as shown in FIG. 11C. This same ROI is then superimposed onto FIG. 11H. A scaling factor sf is then computed according to, $$sf = \frac{\dot{q}_{thermopile}}{\langle GV \rangle_{ROI_1}} \quad (3)$$

where $\dot{q}_{thermopile}$ is the average flux over the thermopile as measured by the power meter, and $\langle GV \rangle_{ROI_1}$ is the average pixel grayscale value over the thermopile ROI. The scaling factor can then be applied over the whole relative flux map to obtain an absolute flux map (FIG. 11H) according to, $$\dot{q}_{solar}(x,y) = sf \cdot GV(x,y) \quad (4)$$

where $\dot{q}_{solar}(x,y)$ and $GV(x,y)$ are the absolute flux and grayscale value at pixel coordinate (x,y) respectively. Using the absolute flux map, the average flux over the solar vapor generator aperture can be determined. $ROI_2$ is traced around the absorber area (FIG. 11G). This same ROI is then superimposed onto the absolute flux map (FIG. 11H), from which the total solar input power and average flux can be determined according to, $$\dot{q}_{solar} = \frac{\int_{ROI_2} \dot{q}_{solar}(x, y) dxdy}{\int_{ROI_2} dxdy} = sf \langle GV \rangle_{ROI_2} \quad (5)$$

Image processing was performed in Matlab® R2017b.

In the last step of the flux measurement, the solar vapor generator is placed under the solar simulator, marking the start of the experiment. The temperatures and mass were continuously monitored over the course of the experiment. The mass was measured using a balance with a 0.1 mg resolution (A&D EJ3000) connected to the computer. The temperatures were measured using precision fine-gauge K-type thermocouples (Omega 5TC-TT-K-36/40-36/72) connected to the computer through a data acquisition system (Omega DAQPRO-5300). The location of the thermocouples is shown in FIG. 6A. Due to difficulties in measuring gas temperatures in radiating environments, a custom-built radiation-shielded thermocouple was constructed.

After approximately 1 hour, depending on the flux level, the experiment reached a quasi-steady-state characterized by a constant water reservoir temperature of 100° C., constant device temperatures, and a near constant evaporation rate. The experiment was run for at least another 2 hours at quasi-steady-state. At the end of the steady-state test period, the lamp was turned off. After turning off the lamp, the device exhibited an initial rapid cooling phase, followed by a slow cooling down to room temperature. In all experiments, it was observed that the evaporation rate stopped within a few minutes of turning off the lamp, supporting our hypothesis that the evaporation is heat transfer limited. After cooling, the mass of the water remaining in the basin was measured.

Figure 11I:
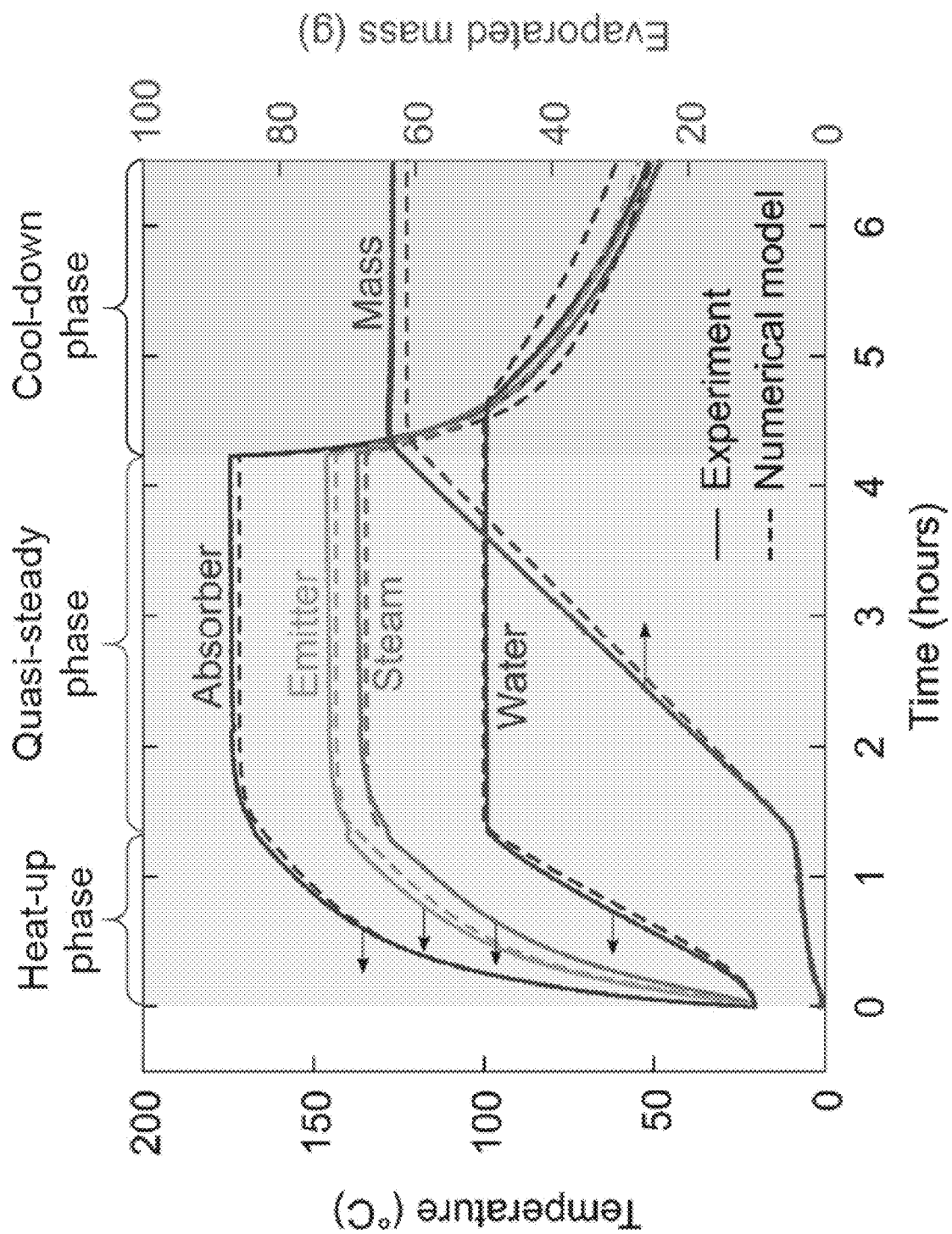
FIG. 11I shows the experimentally measured (solid lines) and modelled (dashed lines) temperature of various components in the solar vapor generator of FIG. 11A and the evaporated mass as a function of time when operating under 1.5 sun illumination.

FIG. 11I shows empirical temperature and mass measurements recorded during one exemplary experiment under solar irradiation of about 1.5 suns. The empirical data is in solid lines and a theoretical fit is in dashed lines. As shown in FIG. 11I, the experiment exhibits three distinct phases: an initial heat-up phase (illuminated), a quasi-steady-state phase (illuminated), and a cool-down phase (dark). During the heat-up phase, sunlight incident on the solar vapor generator 3000 is absorbed by the absorber, which heats up at a rate of around 2 K/min. Convective losses to the environment are reduced by a novel three-layer transparent polymer glazing system based on FIG. 7B. The glazing, in this instance, achieves an effective heat transfer coefficient of 1.66 W m$^{-2}$ K$^{-1}$, while maintaining a high solar transmittance $\tau_{solar}$ of 0.86. Radiation heat losses to the environment are reduced by a spectrally selective absorber material, which has a high solar absorptance $\alpha_{solar}$ of 0.92 and a low thermal emittance $\epsilon_{thermal}$ of 0.08. Heat is conducted from the absorber to the emitter. As the emitter heats up, it radiates directly to the water reservoir below. This thermal radiation is absorbed in a thin layer (~30 μm) at the top of the water surface causing it to heat up at a rate of ~1 K/min. For comparison, conventional heat localizing structures have demonstrated heating rates of 10 K/min under 1 sun. The reason for the comparatively lower heating rate in the solar vapor generator is primarily due to the comparatively high thermal mass of the water reservoir in the solar vapor generator. Faster heat up rates could be achieved, as described above, by reducing the overall lower thermal mass of the solar vapor generator and/or by reducing the initial thickness of the water layer in the reservoir at the start of the experiment. Heat transfer from the emitter to the water surface occurs predominantly by radiation. Contributions from thermal conduction through the air and the sidewalls of the basin were estimated to be relatively small. Additionally, the volume and the depth of water stored in the solar vapor generator 3000 such that the water is approximately isothermal.

In the laboratory-scale solar vapor generator, heat transfer from the emitter to the water surface occurs predominantly by radiation, with small contributions from thermal conduction through the gas gap and the basin sidewalls. Under representative conditions, the detailed model predicts 82% via radiation, 12% via gas gap thermal conduction, and 6% via sidewall conduction. Due to the low Biot number, the water reservoir is heated uniformly, and can be treated as approximately isothermal through the course of the experiment, even though the radiation is absorbed in a thin layer below the surface.

Once the water reaches a temperature of 100° C. (i.e., the boiling point), the temperature of the water plateaus, indicating the experiment has transitioned to the quasi-steady-state phase. During this phase, each additional unit of absorbed energy goes towards evaporation at the water/vapor interface indicated by a rise in the evaporated mass curve in FIG. 11I. The evaporation rate is heat transfer controlled and the mass flux j (evaporation mass flow rate per unit absorber area) during the quasi-steady phase can be directly determined from the heat flux according to, $$j = \frac{\dot{q}_{gain}}{h_{fg}} \quad (6)$$

where and $h_{fg}$=2257 kJ/kg is the latent heat of vaporization of water at 100° C. Vapor generated during this process leaves the water surface as saturated steam at the boiling point temperature and rises towards the emitter. The saturated steam enters the interior cavity of the housing through the vapor holes in the emitter surface and then flows laterally through the interior cavity towards the central outlet. The RVC foam disposed in the interior cavity superheats the steam with a peak temperature of 135° C. observed in FIG. 11I. The superheated steam is forced through a single outlet tube and is vented directly to the atmosphere. At the end of the steady-state phase, the solar simulator is turned off and the device begins to cool to the ambient temperature.

The overall performance of a solar evaporation structure is quantified by its overall solar to thermal conversion efficiency, defined as, $$\eta = \frac{j \cdot h_{fg}}{\dot{q}_{solar}} \quad (7)$$

where $\dot{q}_{solar}$ is the incident solar flux. This definition does not include the sensible heat of superheating in the numerator, to allow direct comparison with previous investigations. For moderate superheating, the efficiency including sensible heat is a few percent higher than that given by Eq. (7).

For the experiments, the steady-state efficiency of Eq. (7) was determined using the following definition of efficiency, $$\eta = \frac{j \cdot h_{fg}}{\dot{q}_{solar}} = \frac{\Delta m_{ss}}{\dot{q}_{solar} A \Delta t_{ss}} \quad (8)$$

where $\Delta m_{ss}$ is the evaporated mass during the steady state region and $\Delta t_{ss}$ is the duration of the steady state region. The evaporated mass was determined by measuring the mass of the water in the basin before and after the experiment $\Delta m_{basin}$ and subtracting the mass of water that was evaporated from the basin during the heat-up phase $\Delta m_{basin,heat-up}$, $$\Delta m_{ss} = \Delta m_{basin} - \Delta m_{basin,heat-up} \quad (9)$$

This approach is more reliable than an approach based on the instantaneous mass reading from the balance due to balance drift, vapor desorption from porous insulation materials, and leaks, which can affect the instantaneous reading but do not affect the overall mass change of the water in the basin. The evaporated mass during heat-up was determined from the balance measurement, e.g. from the mass curve shown in FIG. 11I. The total mass loss during the heat-up phase is attributed to both evaporation of water in the basin, and also evaporation of residual water and moisture in the system. It was assumed that the mass loss during the heat-up phase is 50% due to evaporation of water in the basin, and 50% due to residual moisture. The error bars in FIG. 11J are based on 0% residual mass loss and 100% residual mass loss respectively, and thus represent a rigorous bound on the efficiency.

Figure 11J:
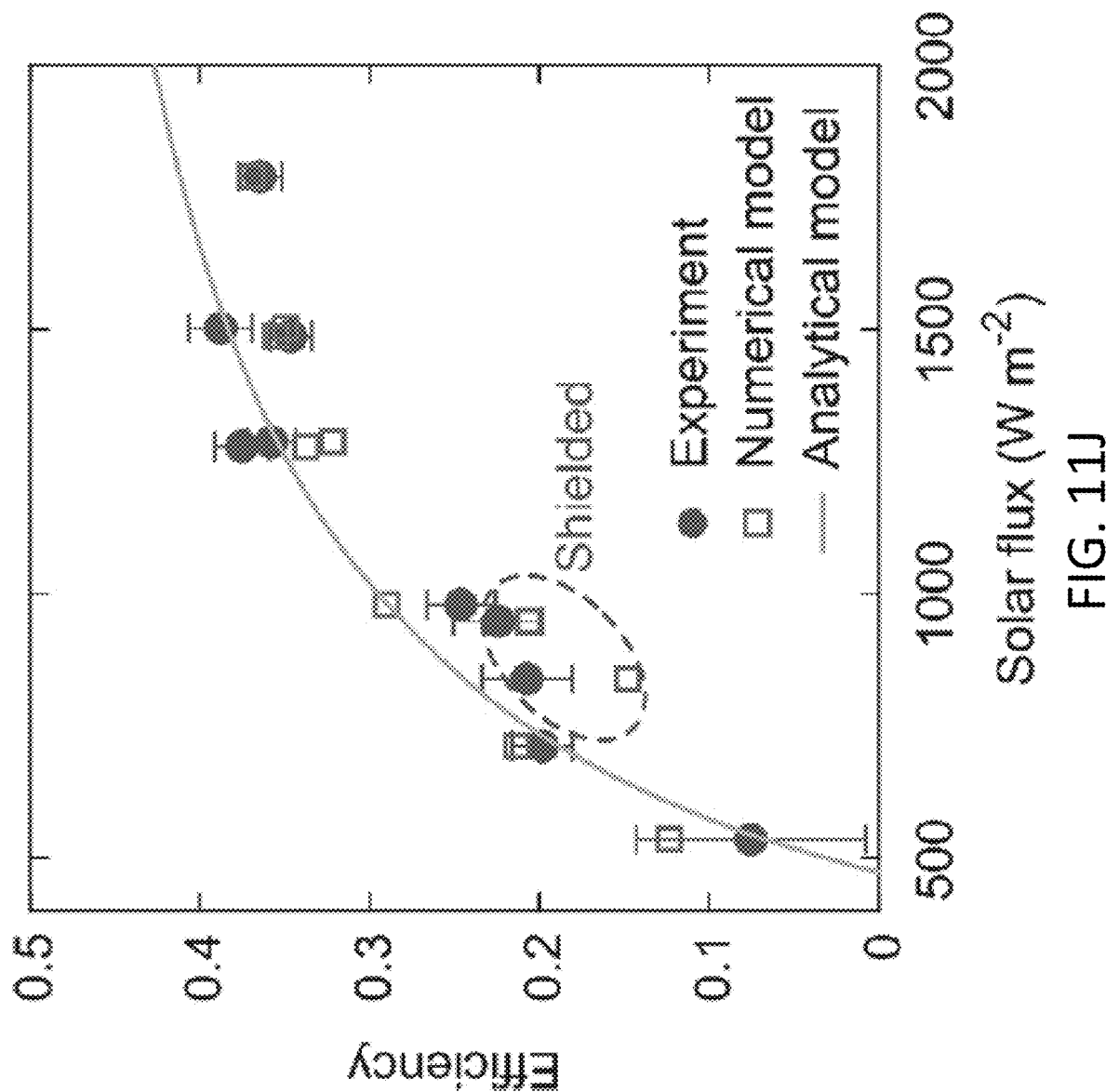
FIG. 11J shows the experimentally measured (solid lines) and modelled (dashed lines) steady-state efficiency as a function of the incident solar flux when operating the solar vapor generator of FIG. 11A during the quasi-steady phase of FIG. 11I.

FIG. 11J shows the measured efficiency during the steady-state region as a function of the solar flux. The lab-scale solar vapor generator achieved an efficiency of 24.6% at one sun conditions, which increased up to 38.8% at 1.5 suns. The solar vapor generator operates at lower efficiencies than conventional contact-based evaporation methods and traditional solar stills, which is a consequence of the higher absorber and steam temperatures. However, an additional advantage of the solar vapor generator design is the built-in vapor collection, where the superheated steam is delivered to a single outlet tube. Conventional solar vapor generators typically generate vapor distributed over a wide area, which is then collected by a semi-transparent condensing cover. When losses due to the condensing cover are taken into account, the solar vapor generator efficiency is comparable to lower-temperature evaporation systems, which achieve efficiencies in the range 21-24% with collection.

The analytical model gives a simple expression for the efficiency, $$\eta = \frac{U_{gain}}{U_{loss} + U_{gain}} \left( \eta_{opt} - U_{loss} \frac{T_w - T_\infty}{\dot{q}_{solar}} \right) \quad (10)$$

$U_{gain}$ and $U_{loss}$ can either be predicted from the detailed heat transfer analysis of the device, or can be fit to experimental data. Superimposed in FIG. 11J are the predictions of Eq. (10) for best-fit parameters $U_{loss}$=4.6 W m$^{-2}$K$^{-1}$, $U_{gain}$=12.8 W m$^{-2}$K$^{-1}$, and $\eta_{opt}$=75.8%. Also superimposed are the predictions of the detailed numerical model, with both models showing good agreement with the experimental results.

Figure 11K:
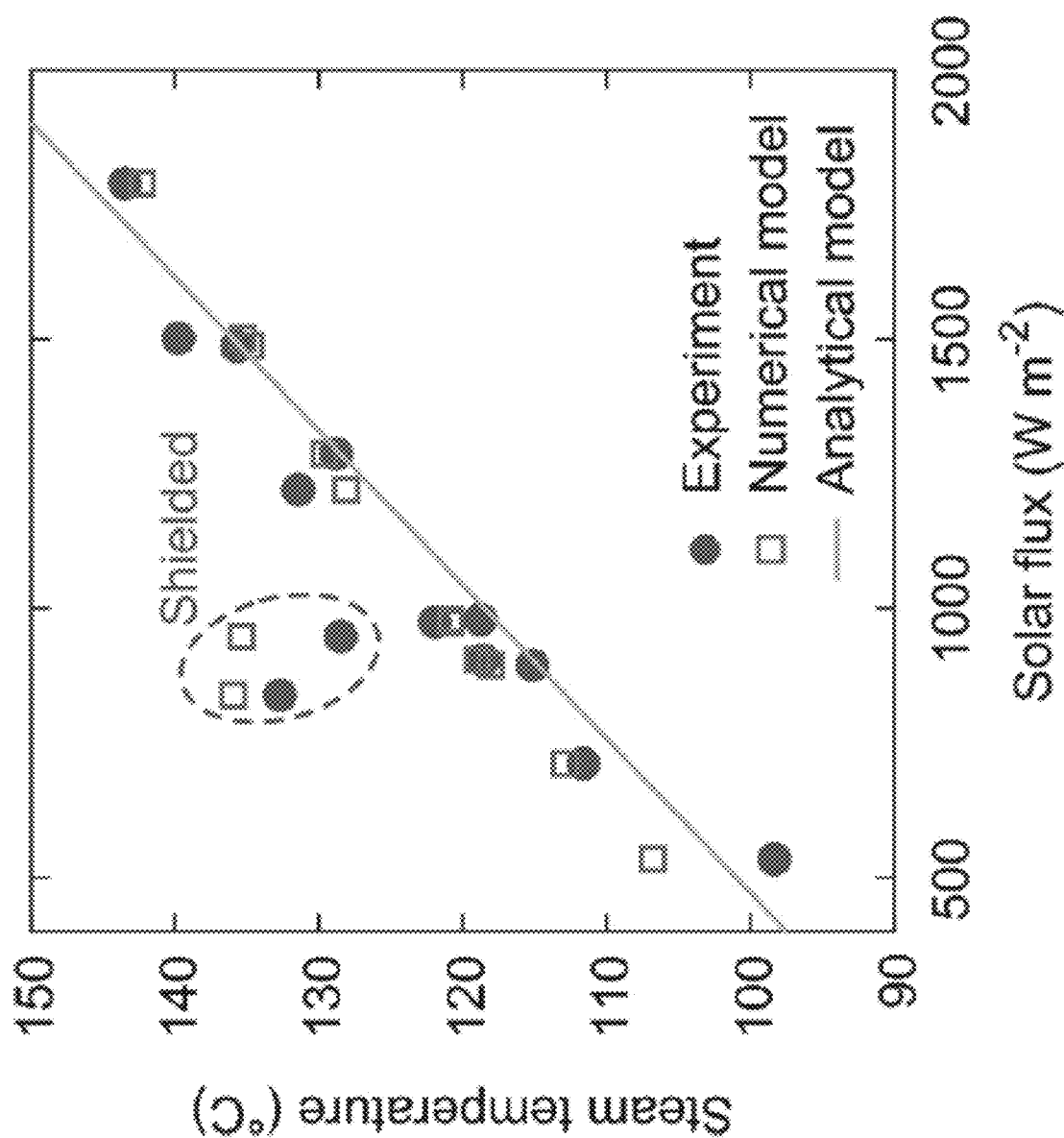
FIG. 11K shows the experimentally measured and modelled temperature of the superheated steam as a function of the incident solar flux when operating the solar vapor generator of FIG. 11A during the quasi-steady phase of FIG. 11I.

FIG. 11K shows the measured steam temperature as a function of the solar flux based on multiple experiments. The steam temperature was measured up to 144° C. at 1.79 suns.

At one sun illumination, a steam temperature of 122° C. was measured, which indicates the steam may be superheated under 1 sun illumination without a concentrator. This is further evidenced by the steam temperature being measured at above 111° C. at a solar flux of about 0.71 suns.

In the limiting case, the superheater effectiveness would be unity, such that the vapor is heated to the emitter temperature. In practice, the superheater (also referred to herein as the interior cavity of the housing) is not a perfect heat exchanger such that there always exists a finite temperature difference between the emitter and the exiting vapor. In the laboratory experiments, this temperature difference increased nearly linearly as a function of the solar flux, ranging between 5° C. at 0.7 suns and 9° C. at 1.5 suns. The analytical model predicts the superheated steam temperature $T_s$ according to, $$T_s = T_w f_{superheater}(T_e - T_w) \quad (11)$$

where $f_{superheater}$ is the superheater effectiveness and $T_e$ is given by Eq. (2). A value of $f_{superheater} = 0.8$ was found to give the best overall fit to the experimental data in FIG. 11K.

Case 2: Controlling Superheating with a Radiation Shield

In many applications, for example sterilization, it is desirable to deliver the steam at a constant temperature. FIG. 11K shows that the steam temperature as a function of the incident solar flux $\dot{q}_{solar}$, with the functional form of this dependence given by Eqs. (11) and (2). The connection of steam temperature to incident solar flux imposes a design challenge considering the intermittency and variability of solar radiation. In active solar thermal collectors, the outlet temperature can be controlled by changing the mass flow rate through the collector. In passive solar evaporators, the mass flow rate is fixed by Eq. (6), and such control is not possible. However, Eqs. (11) and (2) also reveal that the steam temperature is a function of the gain heat transfer coefficient. Inspection of Eq. (2) reveals that the emitter temperature can be increased by decreasing the gain heat transfer coefficient. This implies that the degree of superheating may be controlled by altering the gain heat transfer coefficient.

One approach to control $U_{gain}$ is through use of radiative shielding, as described above. Assume that the radiation shield is made of a reflective material such that the net radiation heat flux to the shield is small compared to the conduction/convection from the surrounding steam. In this case, the shield temperature will be approximately equal to the water (steam) temperature, simplifying the analysis significantly. In this case, the radiative exchange can be approximated by Eq. (35) by replacing $\in_w$ by the area-averaged emittance of the water and shield material.

$$\in_{w,eff} = (1-F)\in_w + C\in_{sh} \quad (12)$$

where $C=1-A_h/A$ is the area coverage ratio.

For demonstration, control of the degree of superheating via radiative shielding was tested in the laboratory experiment by placing aluminium foil radiation shields with different central hole sizes in between the emitter and water. The results of the "Shielded" experiments are highlighted in FIG. 11K, which shows a steam temperature of 133° C. even at a solar flux of 0.84 suns. Note that the increase in steam temperature achieved through radiative shielding is accompanied by a reduction of the system efficiency, as observed in FIG. 11J. This can be understood by examining the effect of reducing $U_{gain}$ on the system efficiency in Eq. (10).

The ability to easily control energy transfer is a unique feature of the contactless configuration of the solar vapor generator described in the disclosure, which leverages the radiative mode of heat transfer. In a conventional solar evaporation structure, where heat is transferred to the liquid by thermal conduction, control of the gain heat transfer coefficient would entail changing the thermal conduction length, cross-sectional area or thermal conductivity, a much more technically challenging proposition.

Case 3: Outdoor Testing with Solar Concentration

Outdoor testing of the lab-scale solar vapor generator 3000 was also conducted to demonstrate the operation of the solar vapor generator 3000 under natural sunlight conditions. In these experiments, the lab-scale solar vapor generator 3000 contained 150 g of water. A first set of experiments were performed in October, 2017 on a rooftop site of a building located in Cambridge, Mass. The temperatures of the various components of the solar vapor generator 3000 and the superheated steam were measured in a similar manner to the laboratory experiments. The mass of the steam was not measured due to wind, which affected the accuracy of the balance.

Figure 12A:
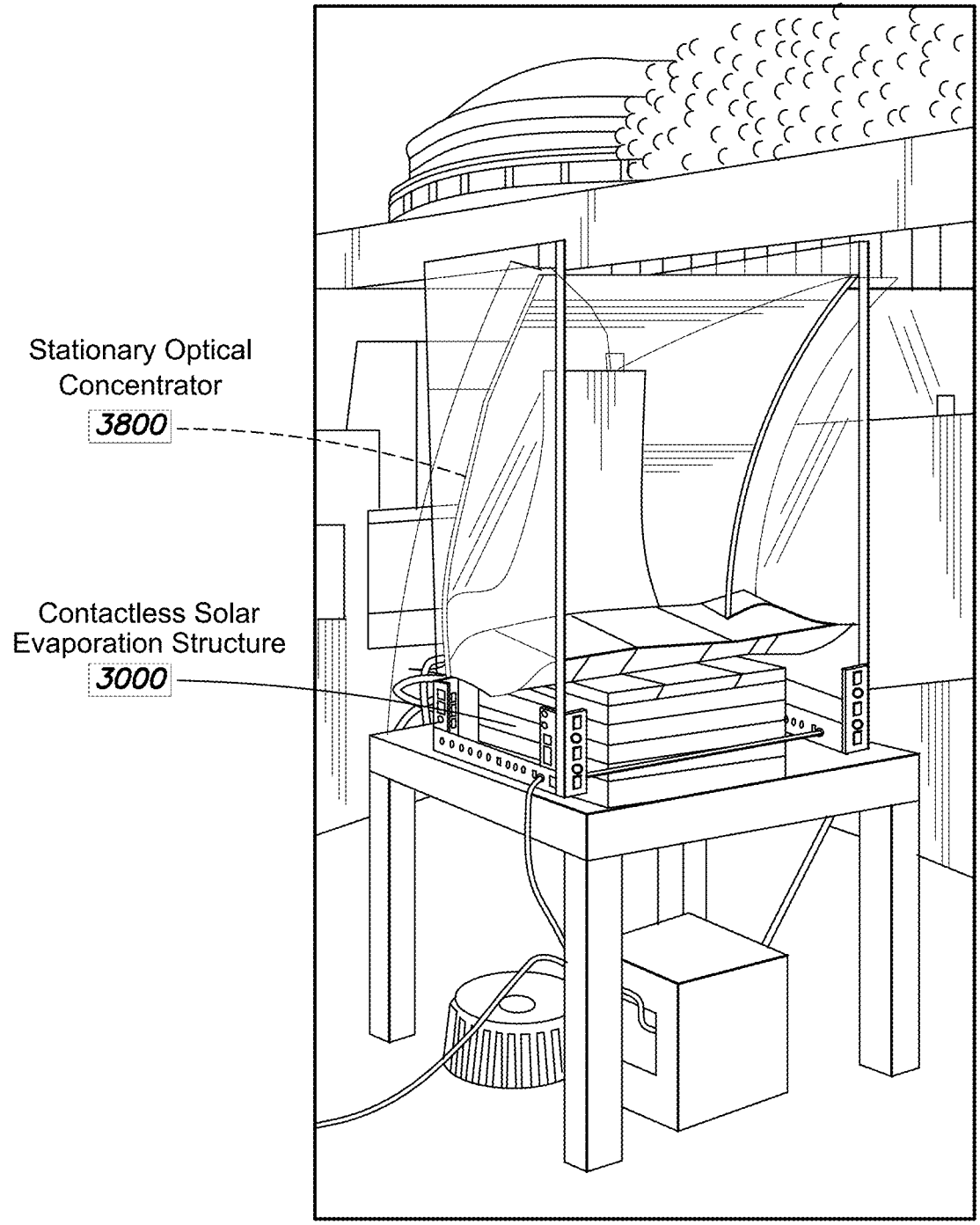
FIG. 12A is a photograph of the solar vapor generator of FIG. 11A deployed in an outdoor environment and coupled to a stationary (non-tracking) solar concentrator.

In lieu of the Fall season and the correspondingly lower solar flux levels, experiments were performed where a low-cost stationary solar concentrator 3800 was used to augment the solar flux to levels that are more relevant to the operation of the solar vapor generator 3000. FIG. 12A shows a photograph of the laboratory-scale solar vapor generator 3000 coupled to a solar concentrator 3800 and deployed on the rooftop site for testing. In this instance, the solar concentrator 3800 is a type of Asymmetric Compound Parabolic Concentrator (ACPC), which features a sufficiently large acceptance angle such that solar tracking (e.g., diurnal tracking) of the sun may be avoided. The ACPC was fabricated from a laser-cut thin PMMA sheet, onto which a mirror film was affixed.

Figure 12B:
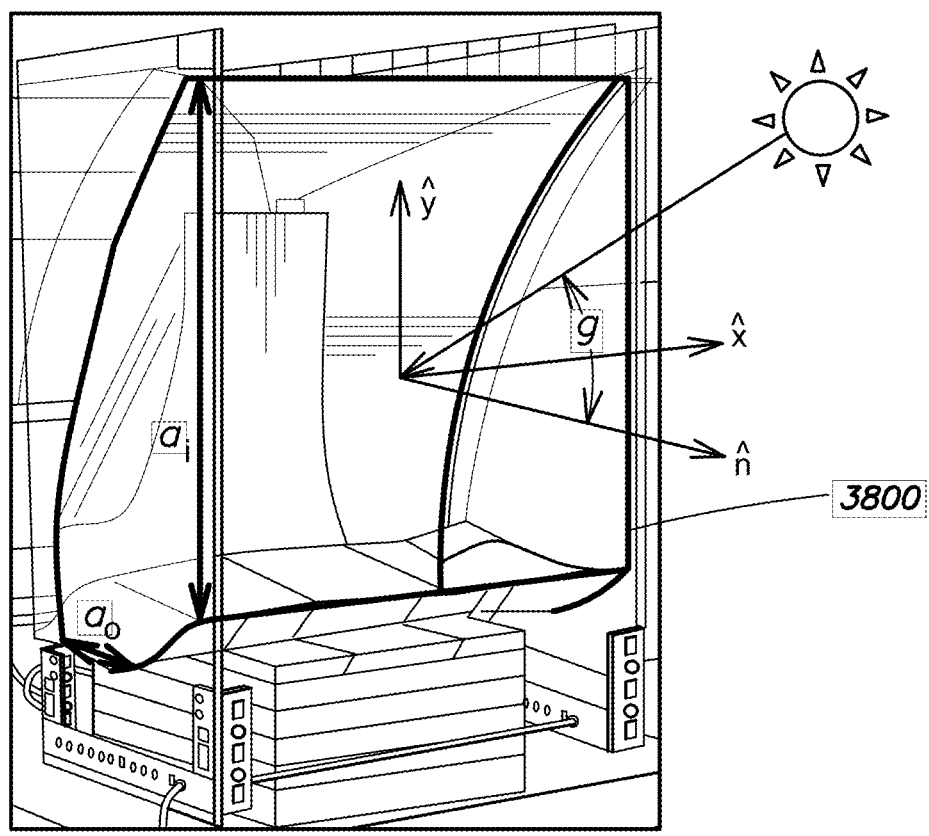
FIG. 12B is a photograph of the solar concentrator of FIG. 12A.

The geometric concentration ratio of the ACPC is defined as, $$C_g = \frac{a_i}{a_o} \quad (13)$$

where $a_i$ is the inlet aperture width and $a_o$ is the outlet aperture width, where the CSES device is placed. The theoretical maximum concentration ratio is $1/\sin \theta_i$ where $\theta_i$ is the acceptance angle. To reduce the overall size of the optic, the ACPC was asymmetrically truncated, at the expense of a slight reduction in the concentration ratio. The actual flux at the exit of the concentrator may be determined from $$\dot{q}_c \approx DNI \cdot \rho_{mirror} \cdot C_g \cdot \cos \theta + dHI \quad (14)$$

where DNI is the direct normal solar irradiance, $\rho_{mirror}$ is the solar weighted reflectance of the mirror material (0.80), and $\theta$ is the angle of incidence defined in FIG. 12B, and dHI is the diffuse horizontal solar irradiance. Global horizontal solar irradiance (GHI) and outdoor temperature data was available from a HOBO U30 Weather Station beside the experimental setup on the roof. The DNI and DHI values were estimated from the GHI using a modified version of the correlation of Orgill and Hollands. The angle of incidence was computed using the sun position calculated from the NREL Solar Position Algorithm (SPA).

Based on these calculations, the ACPC shown in FIG. 12A may provide concentrations up to about 3.1 suns. Additionally, the ACPC may only be periodically adjusted (e.g., during different seasons of the year) to accommodate variations in solar illumination. Thus, the ACPC may provide solar concentration at substantially lower costs and complexity compared to higher concentration solar concentrators, which typically require diurnal tracking.

Figure 12C:
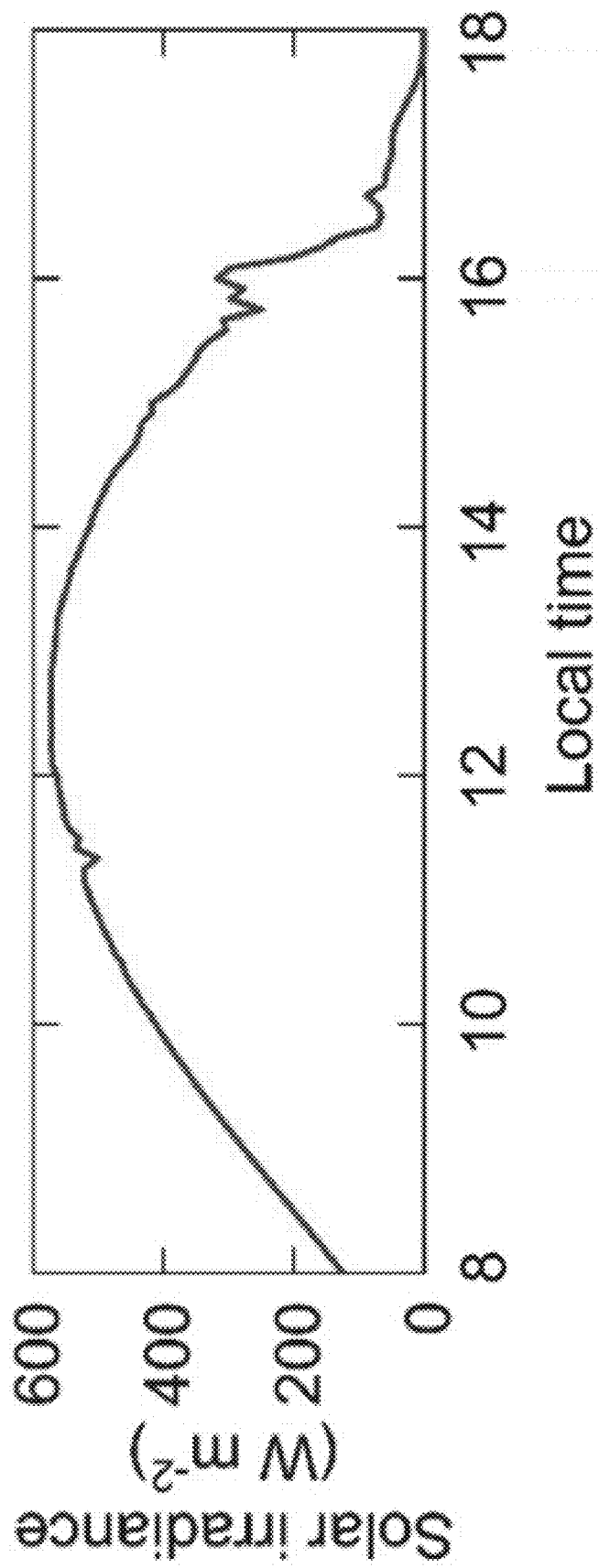
FIG. 12C shows the experimentally measured global horizontal solar irradiance as a function of time using the solar vapor generator and stationary solar concentrator of FIG. 12A.
Figure 12D:
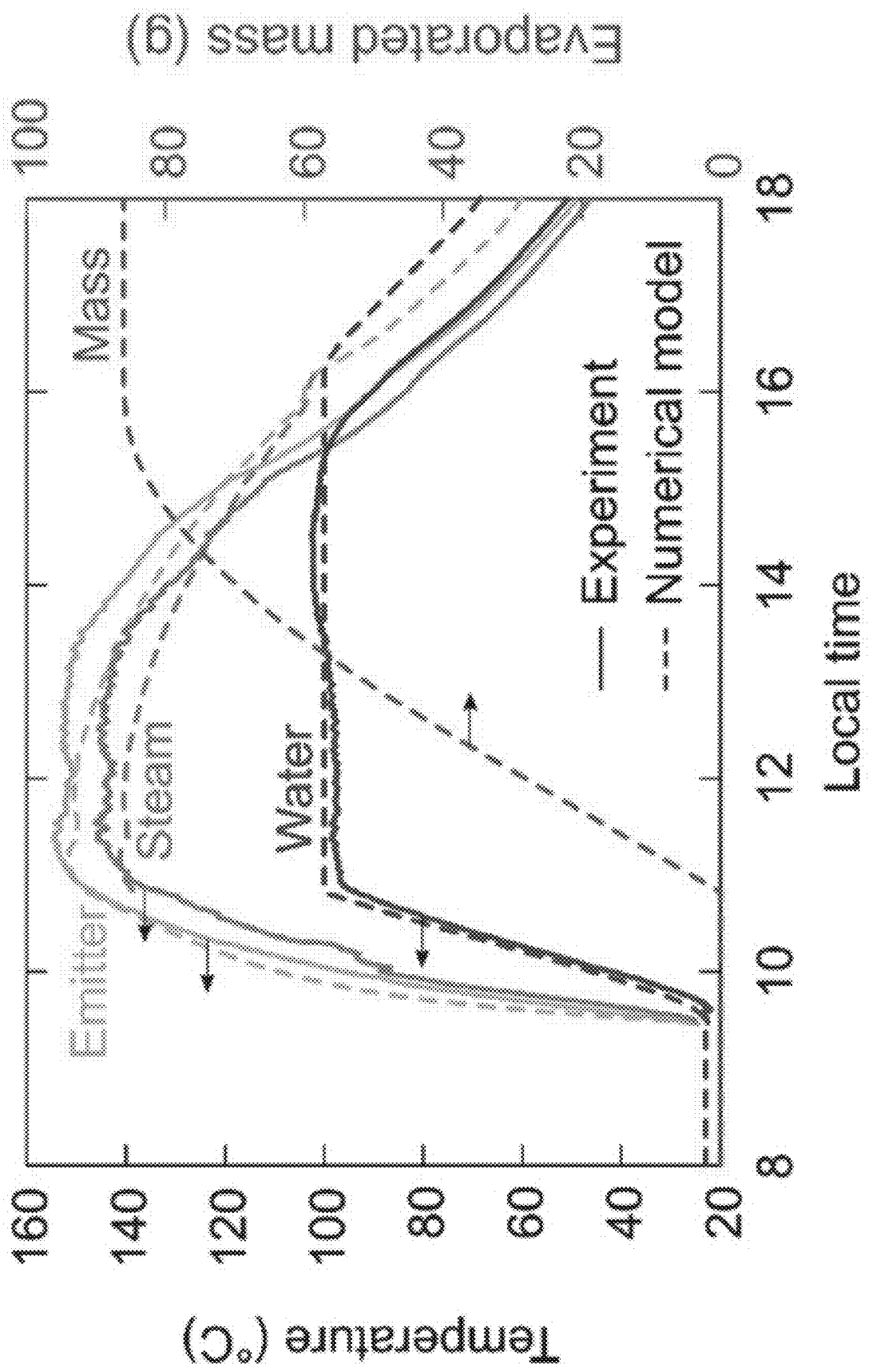
FIG. 12D shows the experimentally measured (solid lines) and modelled (dashed lines) temperature of various components in the solar vapor generator as a function of time using the solar vapor generator and stationary solar concentrator of FIG. 12A.

FIG. 12C shows the variation of the solar irradiance on a clear day as a function of time. On a clear day, the peak global horizontal irradiance was measured to be approximately 590 $Wm^{-2}$ at solar noon. With subsequent concentration, the incident solar flux on the solar vapor generator 3000 was measured to be 1731 $Wm^{-2}$. Under these conditions, the temperatures of various components in the solar vapor generator 3000 were measured as a function of time as shown in FIG. 12D. The empirical data is in solid lines and theoretical fits are in dashed lines. As shown, the water reached a temperature of 100° C. in 1.5 hours, despite an average solar flux of approximately 400 W $m^{-2}$ during the heat-up phase. Following the heat-up phase, superheated steam was generated over a period lasting about 3.5 hours. As shown, the temperature of the steam was measured to be in excess of 146° C. These results indicate that the solar vapor generator 3000 may be used to generate superheated steam during periods of the year with low solar elevation and moderate solar fluxes.

Case 4: Outdoor Testing without Solar Concentration

Figure 12E:
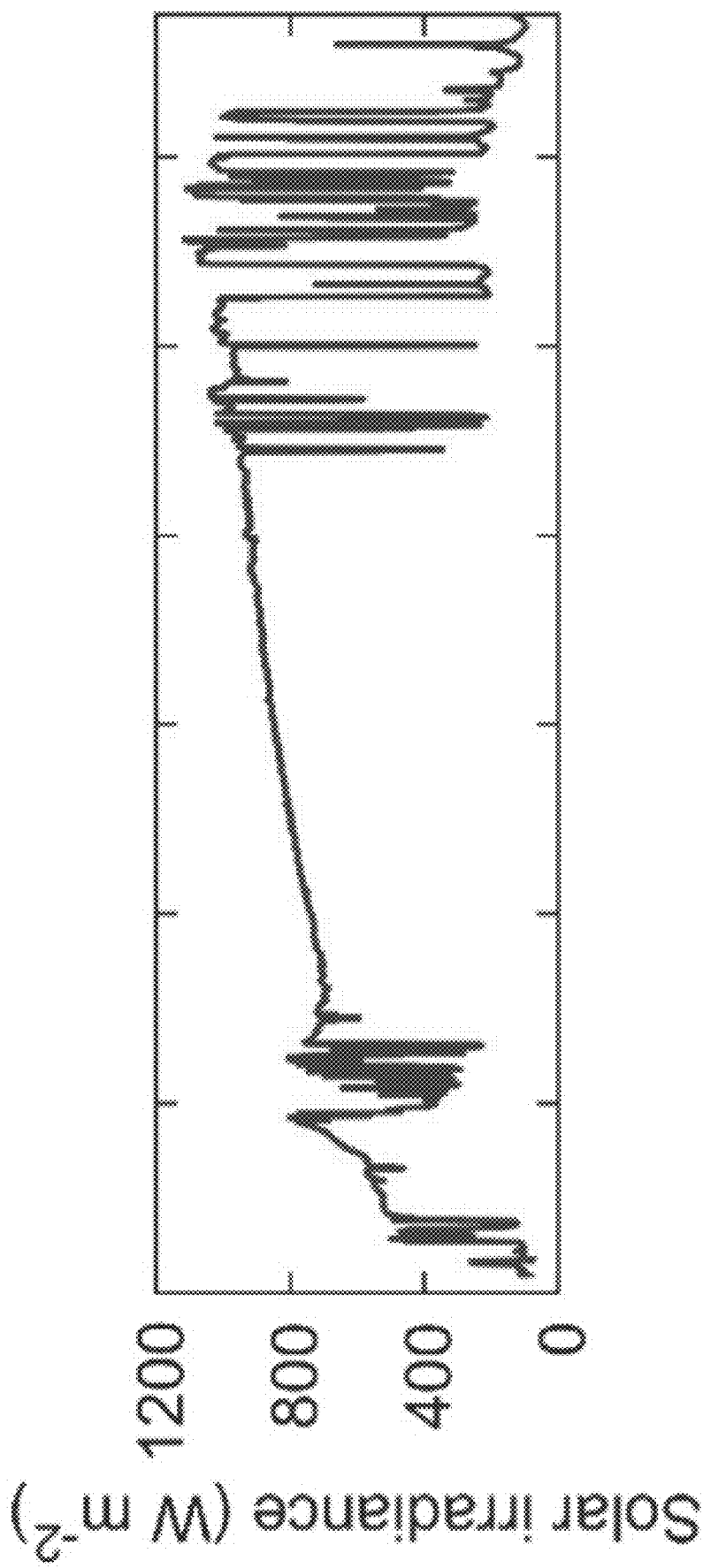
FIG. 12E shows the experimentally measured global horizontal solar irradiance as a function of time using the solar vapor generator of FIG. 12A without the stationary solar concentrator.

A second set of experiments were performed during June and July of 2018 at the same rooftop site located in Cambridge, Mass. FIG. 12E shows the variation of the solar irradiance on a clear day as a function of time. As shown, the global horizontal solar irradiance was measured to be as high 1115 $W/m^2$, which is sufficient to operate the solar vapor generator 3000 without the solar concentrator 3800 described above. The solar flux, in this case, was measured using a Hukseflux LP-02 pyranometer. In these experiments, the superheated steam was collected in a flask where the steam then condensed into a distilled liquid. Specifically, a long FEP tube was connected to the vapor outlet and directed into a volumetric flask. The flask was placed into an ice bath to promote condensation of the superheated vapor onto the flask wall. In this manner, the amount of vapor generated by the solar vapor generator 3000 may be measured.

Figure 12F:
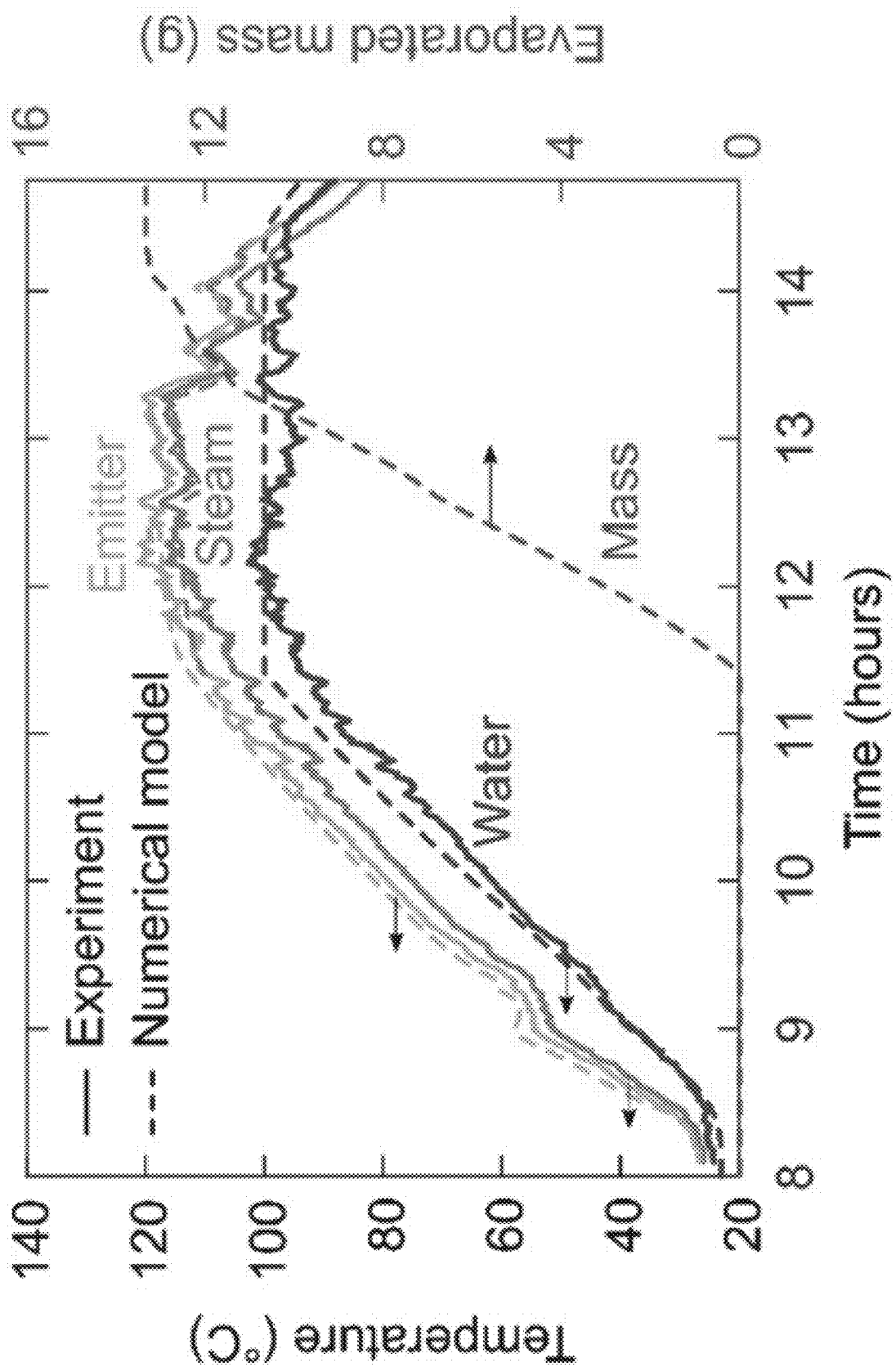
FIG. 12F shows the experimentally measured (solid lines) and modelled (dashed lines) temperature of various components in the solar vapor generator and the evaporated mass as a function of time using the solar vapor generator of FIG. 12A without the stationary solar concentrator.

FIG. 12F shows the temperatures of various components in the solar vapor generator 3000 measured as a function of time. The empirical data is in solid lines and theoretical fits are in dashed lines. For this particular experiment, 8.9 g of distilled water were condensed and collected, which agrees reasonably well with the measured mass loss of the water in the basin of to 12.8 g. The difference is partially accounted for by 1.6 g of residual water that were condensed on the emitter and in the outlet tubing and thus did not make it to the flask, with the remaining 2.3 g of vapor attributed to a small leak. A similar repeat experiment revealed 9.8 g collected water, 13.2 g evaporated from the basin, and 1.6 g residual water. As shown in FIG. 12F, the steam temperature was measured to be as high as 117° C. These results show that the solar vapor generator 3000 can produce superheated vapor, which may then be collected as distilled water, without use of a solar concentrator 3800.

Case 5: Fouling Tests of the Solar Vapor Generator

Figure 13A:
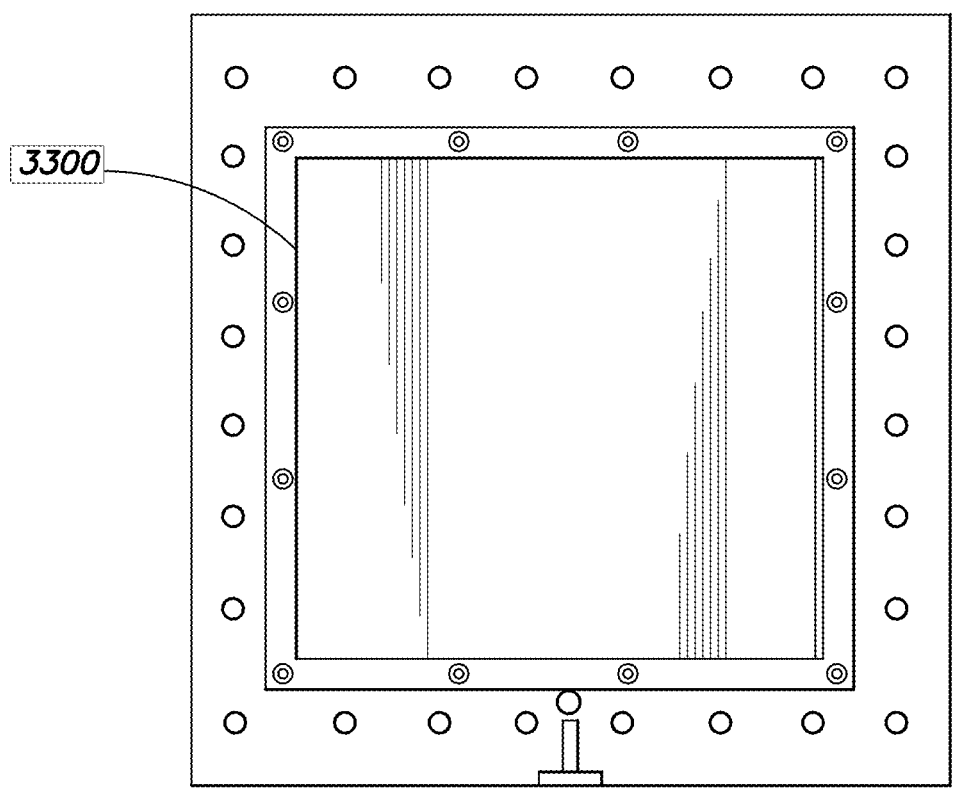
FIG. 13A is a photograph of the emitter in the solar vapor generator of FIG. 11A after experimentation with synthetic seawater.
Figure 13B:
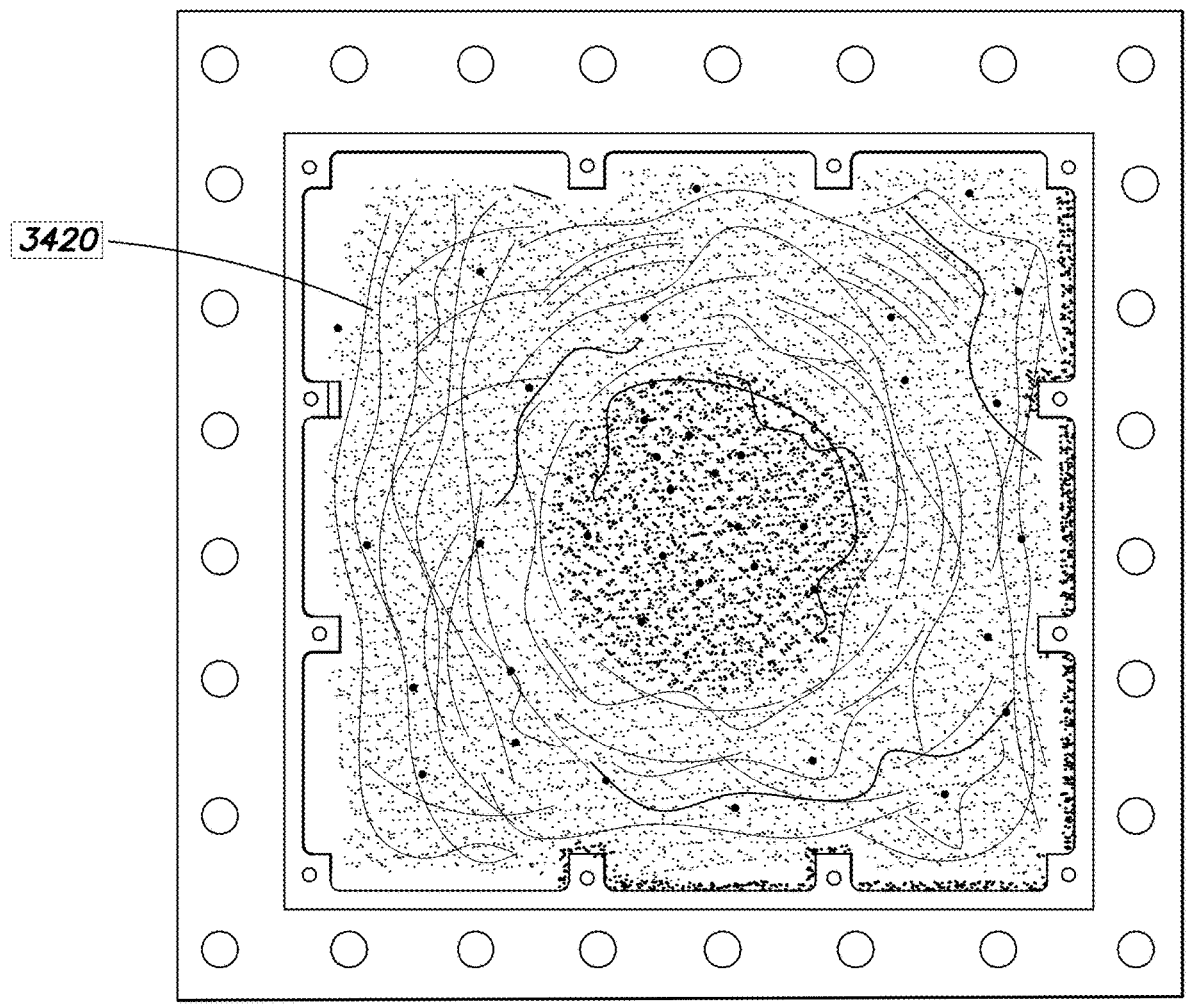
FIG. 13B is a photograph of the basin in the solar vapor generator of FIG. 11A after experimentation with synthetic seawater.

Additional laboratory experiments were conducted to evaluate the fouling resistance of the laboratory-scale solar vapor generator 3000 by using 100 g of synthetic seawater (3.5 wt % NaCl in water). The solar vapor generator 3000 was exposed to a simulated solar flux of one sun for a period of 8 hours, which was a sufficiently long period of time to substantially evaporate the synthetic seawater stored in the solar vapor generator 3000. FIG. 13A shows a photograph of the emitter 3300 after the experiment, with no clear visual indication of salt fouling, e.g. salt crystal formation, on the emitter 3300 surface. Additionally, no fouling was observed in the RVC foam, absorber, or steam outlet, indicating that the salt contained in the synthetic seawater was substantially contained in the basin 3420. FIG. 13B shows a photograph of the basin 3420 after the experiment, where crystals formed by salt precipitated out of the synthetic seawater are evident. However, there was no visual evidence of salt creeping upward along the basin 3420 sidewall above the height of the initial meniscus of the synthetic seawater was observed.

These experimental results indicate that by physically separating the emitter 3300, the housing, and the absorber from the liquid, fouling may be substantially reduced. It should be appreciated that the reduction in fouling arises based on the design of the solar vapor generator 3000 rather than the use of particular anti-fouling materials. Therefore, the reduction in fouling is not specific to a particular salt. By physically separating the liquid from other components of the solar vapor generator 3000, the reduction in fouling is also less likely to degrade over time, especially in harsher environments compared to conventional anti-fouling materials. Instead, contamination or salt built-up in the basin 3420 may be easily removed by flushing with the liquid (e.g., seawater).

Furthermore, the solar vapor generator 3000 is less sensitive to any residual fouling of the basin 3420 because the liquid may be used as its own absorber of thermal radiation emitted from the emitter 3300. The basin 3420's primary function is to store the liquid. During experimentation, no substantial changes in evaporation rate, steam temperature, or efficiency were observed when operating the lab-scale solar vapor generator 3000 with seawater compared to pure water. This may be attributed, at least in part, to the similar latent heat of vaporization, $h_{fg}$, for pure water and brine (e.g., seawater), at least until the point at which salt begins to precipitate, which yields a similar mass flow rate according to Eq. (11). After more than 30 iterations of experiments were performed for the same lab-scale solar vapor generator 3000, no clear visual evidence of biofouling and corrosion induced fouling was observed due, in part, to the high operating temperatures and the materials used in the lab-scale solar vapor generator 3000.

Design Improvements

Figure 14A:
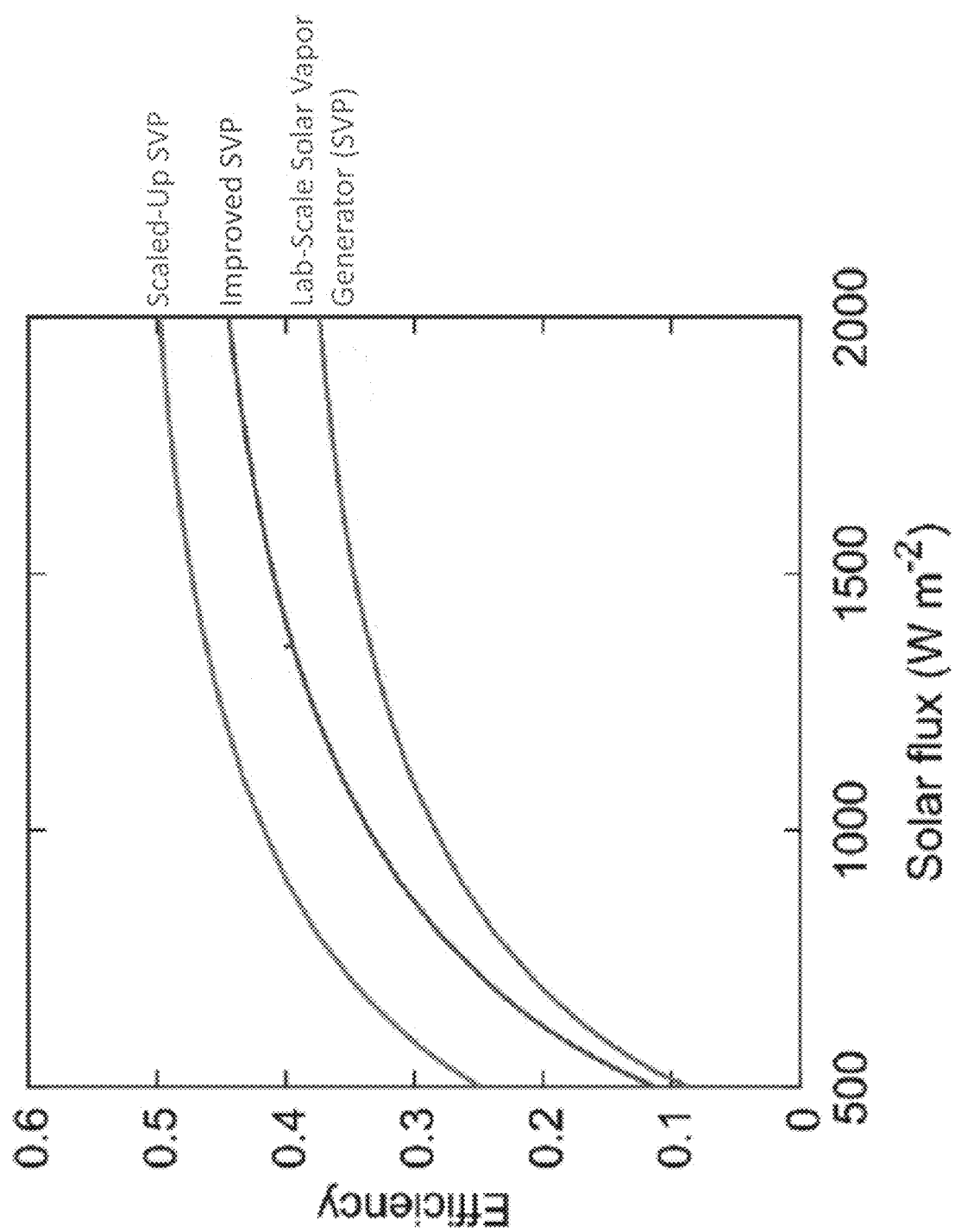
FIG. 14A shows the efficiency as a function of the incident solar flux for various implementations of a solar vapor generator differentiated by the use of different materials and the size of the device.
Figure 14B:
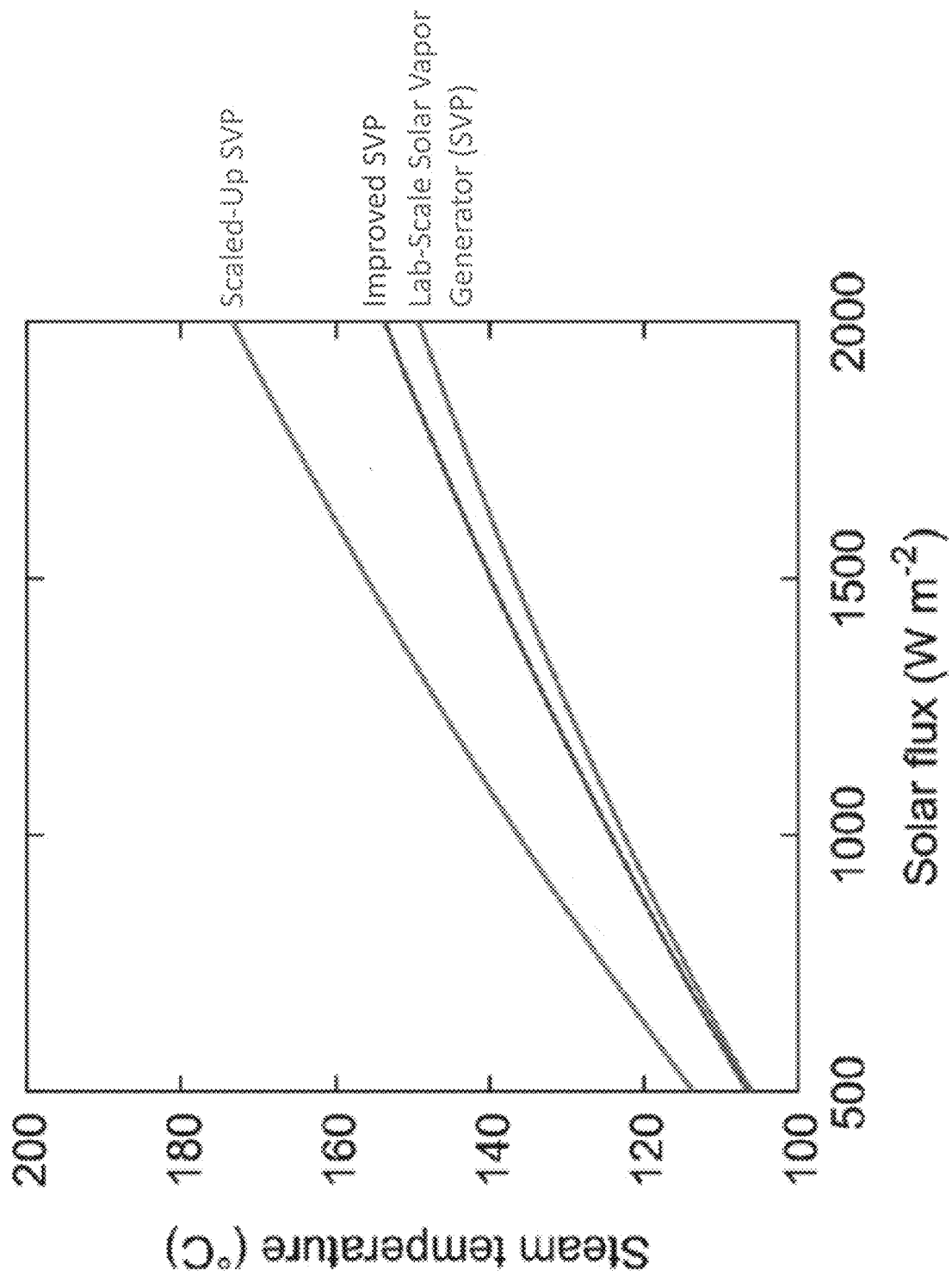
FIG. 14B shows the temperature of superheated steam as a function of the incident solar flux for the various implementations of the solar vapor generator shown in FIG. 14A.
Figure 14C:
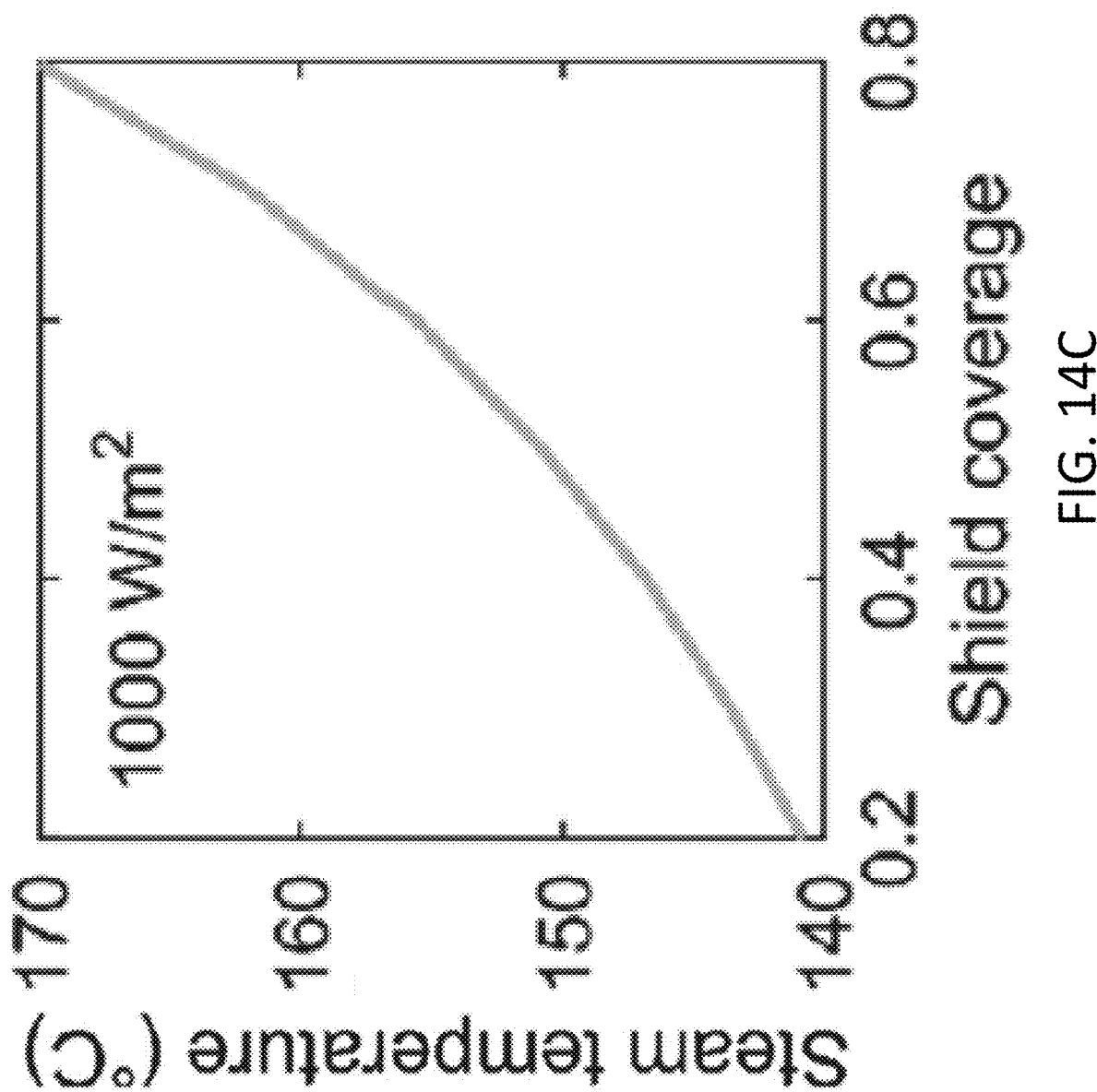
FIG. 14C shows the temperature of superheated steam as a function of the shield coverage of a radiation shield disposed between the emitter and water for the solar vapor generator of FIG. 11A.

The analytical model can be used as a starting point to drive design improvements. Eqs. (10) and (11) show that both efficiency and steam temperature can be increased by reducing $U_{loss}$. In the lab-scale solar vapor generator design, a main contributor to the losses was the temperature drop between the absorber and emitter, as shown in FIG. 11I. Insight gained from the numerical heat transfer model revealed that the main cause of this temperature drop is the low effective thermal conductivity of the RVC foam (0.05 W $m^{-2}K^{-1}$) due to the low solid conductivity of vitreous carbon. This indicates that changing to a graphitic or metallic foam with higher effective thermal conductivity could significant increase the efficiency and superheated steam temperature. To test this hypothesis, the validated numerical model was used to estimate the performance (e.g., efficiency, superheat temperature) of an "improved solar vapor generator" where the RVC foam is replaced by a copper foam having an effective thermal conductivity of 10.1 W $m^{-2}K^{-1}$. FIGS. 14A and 14B show the efficiency and steam temperature for the improved design in comparison to the as-tested lab-scale solar vapor generator. Also shown is the predicted performance for a "scaled-up solar vapor generator," which includes the copper metal foam and additionally assumes a solar vapor generator that is sufficiently large enough in size such that side-losses may be neglected such that the superheater effectiveness may approach unity. For the improved and scaled-up solar vapor generator designs operating at one sun, the model predicts efficiencies of over 33% and 41%, and steam temperatures of 124° C. and 136° C., respectively. Moreover, even higher steam temperatures could be achieved by the radiative shielding method shown in the lab-scale demonstrations, as shown in FIG. 14C.

Water Optical and Radiative Properties

For the case of the solar vapor generator 3000, the relevant optical properties for liquid water including penetration depth, internal transmittance, and emittance will be discussed below to provide context for one exemplary application where the solar vapor generator 3000 is used to evaporate water.

The attenuation of a narrow monochromatic beam of radiation as it propagates through a medium is given by the Beer-Lambert law, $$I_\lambda(L) = I_{\lambda,0} e^{-\beta_\lambda L} \quad (15)$$

where $I_\lambda(L)$ is the spectral intensity a distance L into the medium, $I_{\lambda,0}$ is the spectral intensity at L=0, and $\beta_\lambda$ is the spectral extinction coefficient. In the absence of scattering, the extinction coefficient is equal to the absorption coefficient $\kappa_\lambda$, which can be found from the imaginary part k of the complex refractive index $\tilde{n}=n-ik$, $$\kappa_\lambda = \frac{4\pi k(\lambda)}{\lambda} \quad (16)$$

The reciprocal of the absorption coefficient $1/\kappa_\lambda$ can be interpreted as the absorption mean free path (MFP) for a photon of wavelength $\lambda$. When considering broadband radiation, e.g. solar or blackbody radiation, it is necessary to spectrally average the absorption coefficient. There are numerous ways to represent the spectrally-averaged absorption coefficient or pathlength, the most common being the Planck-mean and Rosseland-mean absorption coefficients. For quantifying the absorbing capability of a material, it is most useful to consider the transmittance at a given depth. For a narrow beam of radiation, the internal transmittance at a given depth into the medium is found from, $$\tau'_{int}(L) = \frac{I(L)}{I_0} = \frac{\int_0^\infty I_\lambda(L) d\lambda}{\int_0^\infty I_{\lambda,0} d\lambda} = \frac{\int_0^\infty I_{\lambda,0} e^{-\kappa_\lambda L}}{I_0} \quad (17)$$

Alternatively, Eq. (17) can be solved for the depth L at which a certain fraction of the incident beam has been absorbed. For example, the 90% absorption depth $L_{90}$ is the solution of Eq. (17) for which the transmittance equals 1−0.9=0.1. Eq. (17) is for a narrow beam parallel to L.

For a diffuse beam, $$\tau_{int}(L) = \frac{\int_0^\infty \int_{hemi} I_{0,\lambda} \cos\theta \exp(-\kappa_\lambda L \sec\theta) d\omega d\lambda}{\pi I_0} \quad (18)$$

where $d\omega$ is a differential element of solid angle and hemi denotes integration over the hemisphere. Due to the diffuse nature of thermal radiation vs. the collimated nature of solar radiation, the required absorption depths for a thermal source tend to be even lower than those given in FIG. 3B.

Water is a good internal absorber of thermal radiation. However, the absorptance can never reach 100% due to Fresnel reflection at the air/water interface. Assuming the water depth is large enough to make the transmittance sufficiently close to zero at the wavelength of interest, the spectral directional emittance $\in'_\lambda$, of an optically thick (i.e. $\tau'_{int} \to 0$) layer of water may be determined from, $$\in'_\lambda = \alpha'_\lambda = 1 - \rho'_\lambda = 1 - \frac{1}{2}(\rho'_{\lambda,para} + \rho'_{\lambda,perp}) \quad (19)$$

where $\alpha'_\lambda$ is the spectral directional absorptance, $\rho'_\lambda$ is the spectral directional-hemispherical reflectance, and the para and perp subscripts indicate parallel and perpendicular polarizations respectively. The first equality in Eq. (19) follows from Kirchhoff's law, the second equality results from an energy balance considering $\tau'_\lambda \to 0$, and the final equality results from the assumption of equal proportions of parallel and perpendicular polarizations for a thermal source. The polarized spectral directional-hemispherical reflectance can be found from the Fresnel reflectance formulae, $$\rho'_{\lambda,para} = \left| \frac{\tilde{n}^2 \cos\theta_i - \sqrt{\tilde{n}^2 - \sin^2\theta}}{\tilde{n}^2 \cos\theta_i - \sqrt{\tilde{n}^2 - \sin^2\theta}} \right|^2 \quad (20)$$

$$\rho'_{\lambda,perp} = \left| \frac{-\cos\theta_i + \sqrt{\tilde{n}^2 - \sin^2\theta}}{\cos\theta_i + \sqrt{\tilde{n}^2 - \sin^2\theta}} \right|^2 \quad (21)$$

where $\tilde{n}$ is the wavelength-dependent complex refractive index and $\theta$ is the incidence angle. The spectral hemispherical emittance can be determined by directionally averaging Eq. (19) assuming diffuse (Lambertian) directional distribution, $$\epsilon_\lambda = \frac{\int_{\varphi=0}^{2\pi} \int_{\theta_i=0}^{\frac{\pi}{2}} \varepsilon'_\lambda(\lambda,\theta) \cos\theta \sin\theta d\theta d\varphi}{\int_{\varphi=0}^{2\pi} \int_{\theta_i=0}^{\frac{\pi}{2}} \cos\theta \sin\theta d\theta d\varphi} = 2\int_{\theta_i=0}^{\frac{\pi}{2}} \epsilon'_\lambda(\lambda,\theta) \cos\theta \sin\theta d\theta \quad (22)$$

Figure 15A:
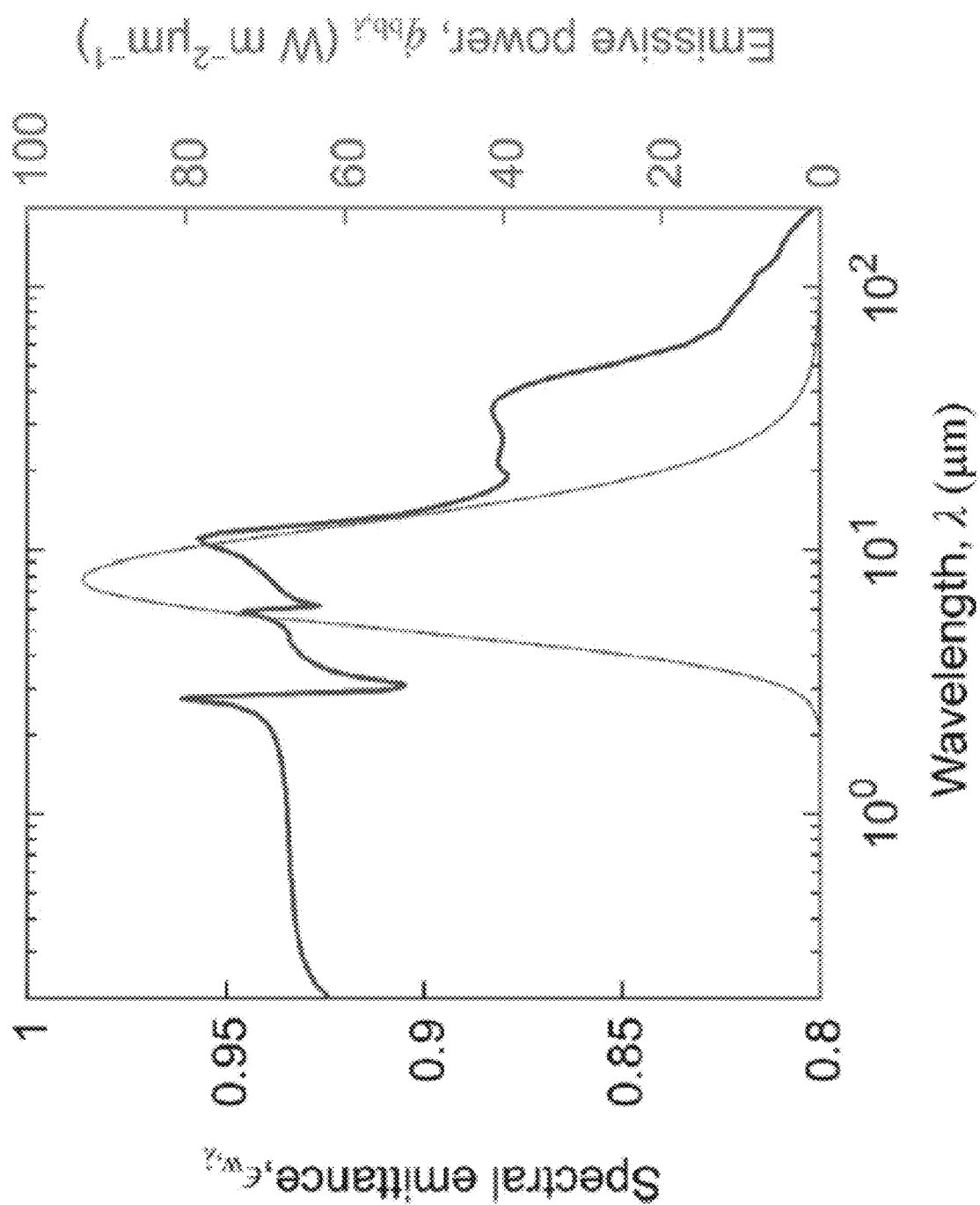
FIG. 15A shows the spectral emittance for an optically thick layer of water and the spectral emissive power of a blackbody source at a temperature of 100° C. as a function of the wavelength.

The resulting spectral hemispherical emittance of water is given in FIG. 15A. Also shown is the spectral hemispherical emissive power for a blackbody at 100° C.

Figure 15B:
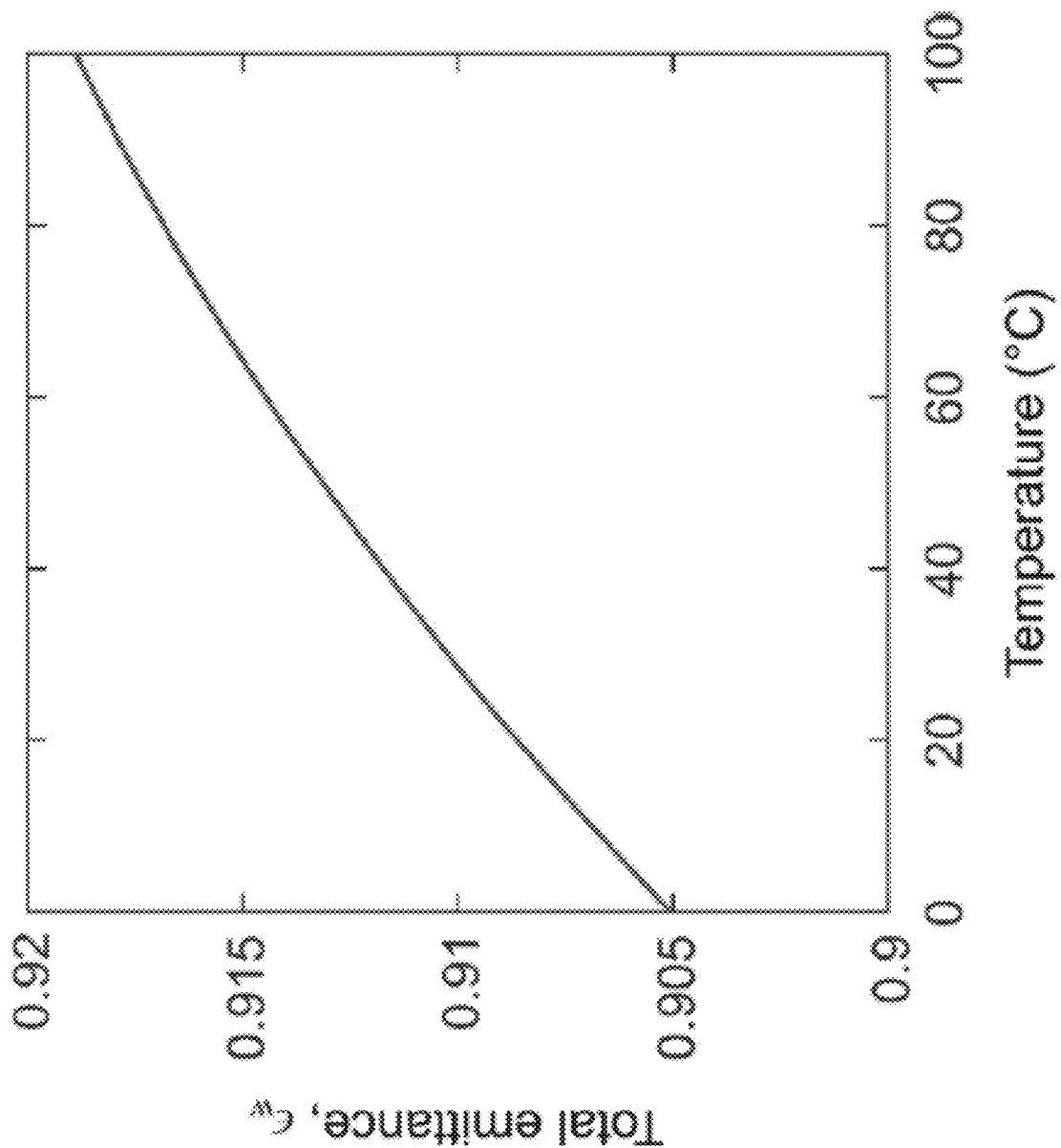
FIG. 15B shows the total emittance for an optically thick layer of water as a function of temperature.

The total hemispherical emittance can be calculated by spectrally weighting by the blackbody spectrum, $$\epsilon(T_{bb}) = \frac{1}{\sigma T_{bb}^4} \int_0^\infty \epsilon_\lambda \dot{q}_{bb,\lambda}(T_{bb}) d\lambda \quad (23)$$

where is the spectral hemispherical emissive power for a blackbody at temperature $T_{bb}$, which follows the Planck distribution. FIG. 15B shows the resulting total hemispherical emittance for water in the temperature range 0 to 100° C.

Analysis of the Evaporation Mechanism for the Lab-Scale Solar Vapor Generator

The following discusses the evaporation mechanism in the solar vapor generator 3000, specifically addressing the relative importance of mass diffusion resistance, flow resistance, and interface limitations in the evaporation process in the solar vapor generator 3000. It is demonstrated that evaporation is heat transfer limited and occurs by induced pressure driven flow activated when the water temperature reaches its normal boiling point.

Traditional solar stills rely on mass transfer driven by a water vapor concentration gradient, which may be augmented by bulk fluid motion. For comparison, an estimation of the role of mass transfer in the solar vapor generator 3000 will now be shown. During a typical laboratory experiment, the solar vapor generator 3000 is assembled after filling the basin with approximately 5 mm water. At the start of the experiment, the remaining volume of the basin (e.g., the gas gap that is approximately 15 mm in height), is assumed to be filled with laboratory air. During the start of the transient phase, as the water is heated by the emitter, the gas gap is expected to become saturated with water vapor. Once the gas gap becomes saturated with water vapor, the main mass transfer resistance is diffusion through the RVC foam and through the column of vapor in the outlet tube. To determine an upper limit on the mass transfer rate due to diffusion, the resistance of the RVC foam is not included and only the mass transfer resistance of the outlet tube is considered. In this simplifying case, the mass flow rate due to mass diffusion through the outlet tube is given by, $$\dot{m} = \frac{C_{v,inside} - C_{v,\infty}}{R_{mass\ transfer}} = A_{tube} M_w D_{v-air} \frac{C_{v,inside} - C_{v,\infty}}{L_{tube}} \quad (24)$$

where $M_w$ is the molar mass of water, $D_{v-air}$ is the binary diffusion coefficient of air and water vapor, and $C_v$ is the molar concentration of water vapor. An upper limit on the vapor concentration inside during the steady-state region is, $$C_{v,inside} = \frac{p_{inside}}{R_u T_v} = \frac{101\ 325\ Pa}{8.314\ J \cdot mol^{-1} K^{-1} \cdot 373.15\ K} = 32.7\ mol/m^3 \quad (25)$$

A representative value for the vapor concentration outside is, $$C_{v,\infty} = \frac{\phi p_{sat}}{R_u T} = \frac{0.3 \cdot 3.169\ Pa}{8.314\ J \cdot mol^{-1} K^{-1} \cdot 298\ K} = 3.84 \times 10^{-4}\ mol/m^3 \quad (26)$$

where φ is the relative humidity of air in the lab, taken as 0.3. The binary diffusion coefficient is given by the empirical correlation, $$D_{v-air} = 1.87 \times 10^{-10} \frac{(T/K)^{2.072}}{(p/atm)} \quad (27)$$

which equates to $4.61 \times 10^{-5}$ m$^2$/s at a representative temperature of 400 K. Taking the length of the tube as 0.1 m and an inner diameter of 0.56 cm, the mass flow rate due to diffusion becomes, $$\dot{m} = \frac{\pi \cdot (0.56 \times 10^{-2}\ m)^2}{4} 18\ g/mol \cdot \quad (28)$$

$$4.61 \times 10^{-5}\ m^2/s \cdot \frac{30.5\ mol/m^3}{0.1\ m} = 0.02\ g/hr$$

which is more than two orders of magnitude smaller than the flow rates exhibited in the solar vapor generator 3000 during the quasi-steady phase. For the solar vapor generator 3000, it can be concluded that mass diffusion is not an important vapor generation mechanism.

Figure 16:
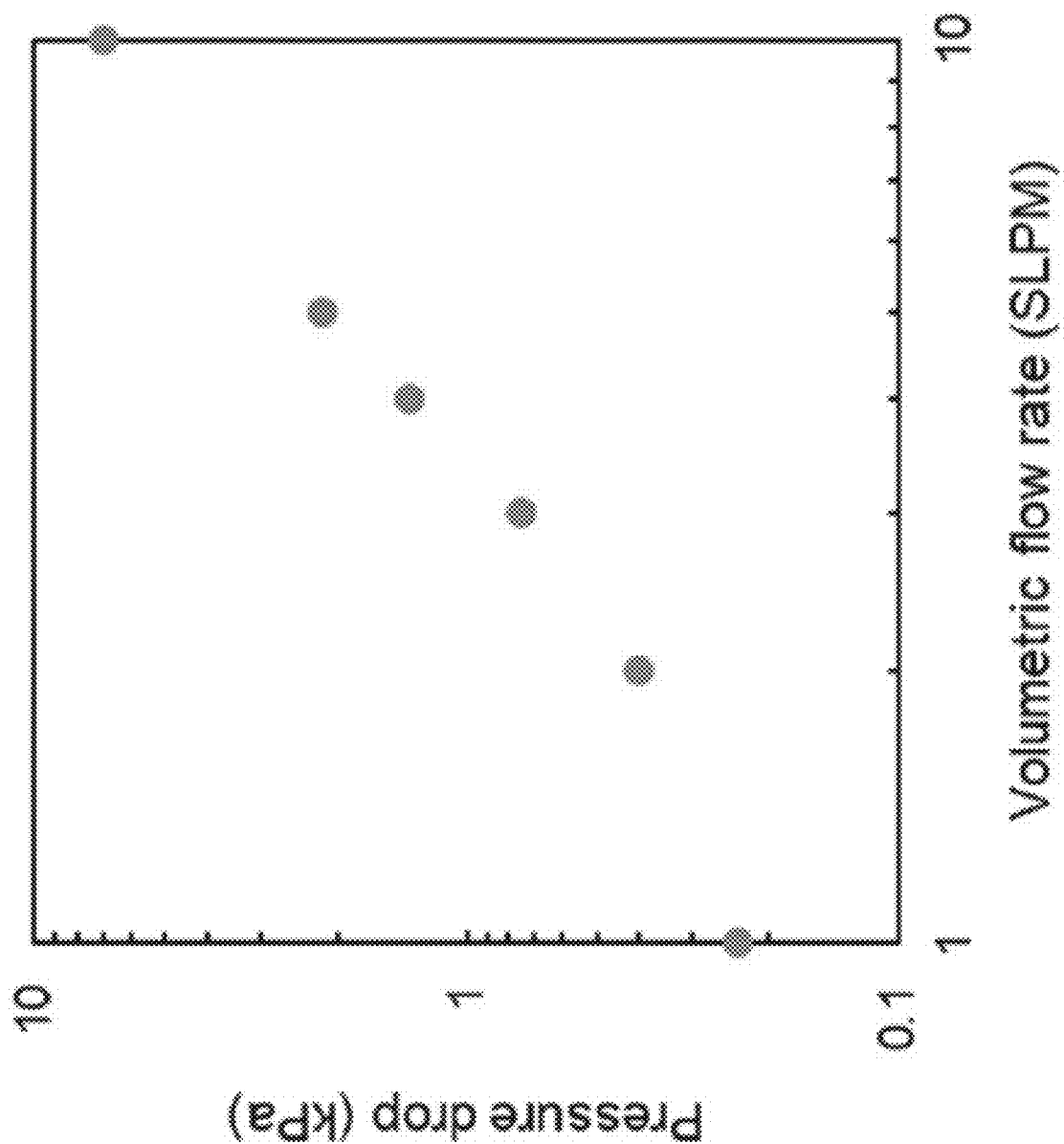
FIG. 16 the pressure drop through the solar vapor generator of FIG. 11A as a function of the volumetric flow rate.

Instead of mass diffusion-dominated vapor generation, it is believed a pressure-driven flow dominates the vapor generation mechanism in the solar vapor generator 3000, which originates from a slight superheating (<<1 K) at the water-vapor interface, as described above. The flow resistance in the solar vapor generator 3000 was measured by flowing air with a known flow rate through the outlet tube and measuring the pressure drop from the outlet tube to the basin, which was vented to ambient. FIG. 16 shows the resulting pressure drop through the system as a function of the volumetric flow rate.

Under nominal conditions, the volumetric flow rate is, $$\dot{V} = \frac{\dot{m}}{\rho} = \frac{0.186\ g\ min^{-1}}{0.52326\ g/L} = 0.36\ L\ min^{-1} \quad (29)$$

From FIG. 16 the pressure drop under nominal conditions may be concluded to be below 200 Pa. The change in saturation temperature due to this increase in pressure is given by the Clapeyron equation, $$\frac{\Delta T_{sat}}{\Delta p_{sat}} = \quad (30)$$

$$\frac{RT^2}{M_w p_{sat} h_{fg}} = \frac{8.314\ kJ\ kmol^{-1} K^{-1} \cdot (373\ K)^2}{18\ kg/kmol \cdot 101\ 325\ Pa \cdot 2257\ kJ/kg} = 0.28\ K/kPa$$

For a 200 Pa pressure rise inside the reservoir, the change in the boiling point is 0.06 K. This indicates that the flow resistance is very small, and the water temperature is essentially pinned at 100° C. This can also be understood by again examining Eq. (31). When the temperature of the water $T_w$ is raised by a small amount, $p_{sat}$ grows exponentially, opening up the pressure driven flow pathway.

It can therefore be concluded that the interface and flow resistances in the solar vapor generator 3000 are small and the mass diffusion resistance is very large. This indicates that evaporation in the solar vapor generator 3000 is driven by exponential growth of $p_{sat}$ when the water temperature is raised above its normal boiling point, which leads to a pressure driven flow through the right channel of FIG. 16 enabled by the small flow resistance.

A comparison of the mass diffusion and flow resistances indicated that the dominant mechanism is pressure driven flow. The interface resistance is given implicitly by the Hertz-Knudsen equation, $$\dot{m} = AM_w \sqrt{\frac{M_w}{2\pi R_u}} \left( \sigma_e \frac{p_{sat}(T_w)}{\sqrt{T_w}} - \sigma_c \frac{p_v}{\sqrt{T_v}} \right) \quad (31)$$

where $T_w$ and $T_v$ are the temperatures of the water and vapor just below and above the interface, respectively, $p_{sat}(T_w)$ is the saturation pressure at $T_w$, and $p_v$ is the vapor partial pressure just above the interface, and $\sigma_e$ and $\sigma_c$ are the evaporation and coefficients. For simplicity, it is assumed $\sigma_e=\sigma_c=1$ and $T_w=T_v$ in which case Eq. (31) simplifies to, $$\dot{m} = AM_w \sqrt{\frac{M_w}{2\pi R_u T_w}} \Delta p \qquad (32)$$

where $\Delta p$ is the pressure difference across the interface which drives evaporation. From Eq. (32) the required $\Delta p$ can be calculated for the nominal mass flow rate in the solar vapor generator 3000 given by Eq. (57), which amounts to 8 Pa. It can therefore be concluded that the interface resistance is small, again pointing to a heat-transfer limited evaporation mechanism.

Steady-State Analytical Modelling

A steady-state analytical model for the solar vapor generator was derived to illustrate the operating principle of the solar vapor generator 3000 and the effect of the most important parameters on performance (e.g., steady-state efficiency, superheat temperature, and vapor yield). Eqs. (40) and (48) along with the parameters in FIG. 17A give the main results of the model which is capable of predicting the efficiency and steam temperature.

Figure 17B:
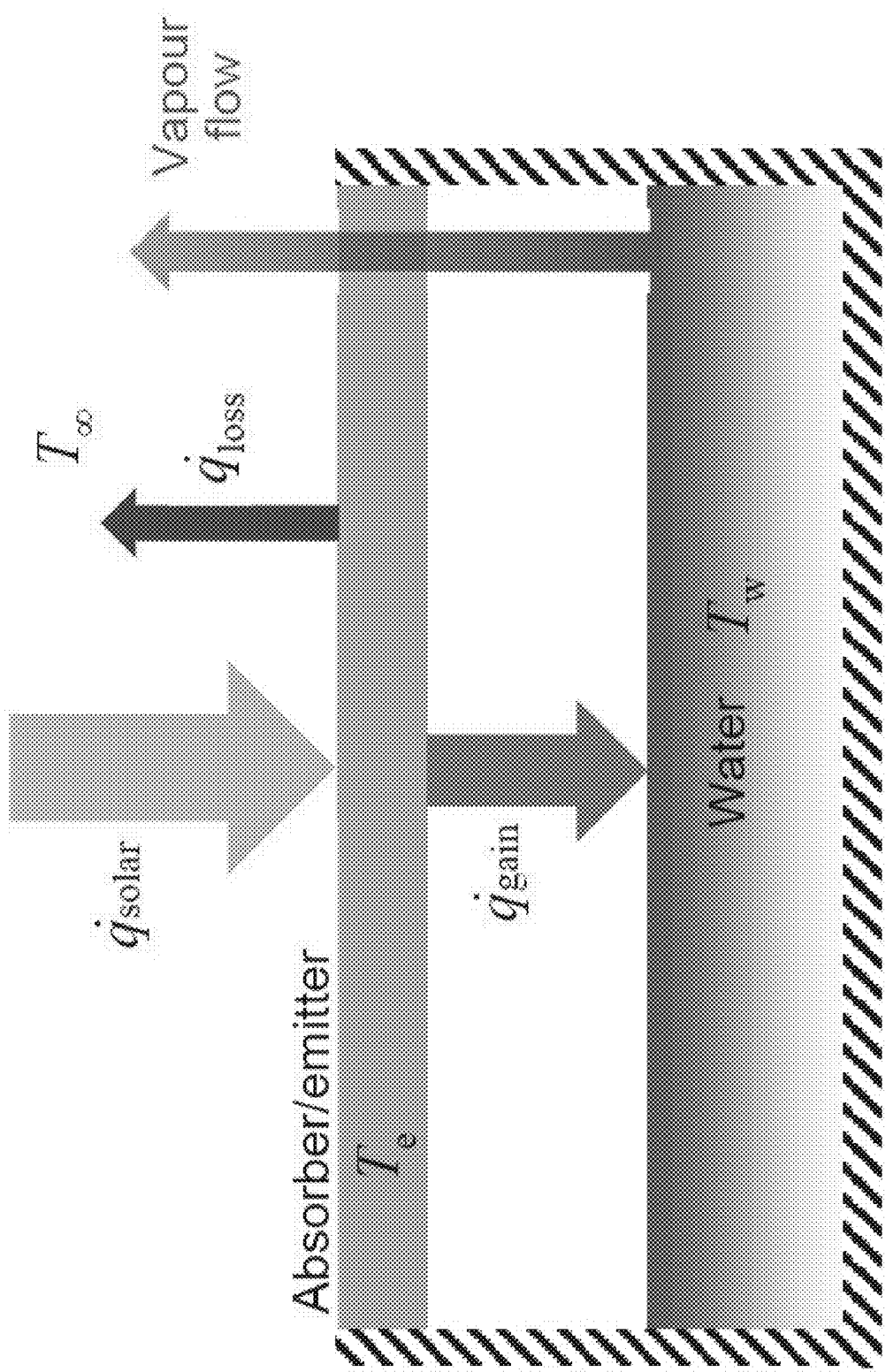
FIG. 17B shows a solar vapor generator, according to some implementations of the disclosure.

Consider a generic device, shown schematically in FIG. 17B, comprising a solar absorber that transfers heat to a body of water causing it to evaporate. Assume that the device is perfectly insulated on the bottom and sides and that the length and width are large compared to the thickness such that all heat transfer processes are one-dimensional in the vertical direction.

A per-unit-area energy balance on the absorber/emitter yields, $$\dot{q}_{abs} = \eta_{opt}\dot{q}_{solar} = \dot{q}_{loss} + \dot{q}_{gain} + \dot{q}_{superheat} \qquad (33)$$

where $\dot{q}_{abs}$ is the absorbed solar flux, $\eta_{opt}$ is the optical efficiency, $\dot{q}_{solar}$ is the incident solar flux, $\dot{q}_{loss}$ is the rate of heat loss to the environment per unit absorber area, $\dot{q}_{gain}$ is the rate of heat transferred to the water per unit absorber area, and $\dot{q}_{superheat}$ is the rate of heat per unit absorber area associated with superheating of the generated steam. For the moment $\dot{q}_{superheat}$ is neglected, as it is small compared to the other terms. Defining the effective overall heat transfer coefficient, $U \equiv \dot{q}/\Delta T$, Eq. (33) becomes (using the shorthand e=emitter, w=water, and later s=steam), $$\eta_{opt}\dot{q}_{solar} = U_{loss}(T_e - T_\infty) + U_{gain}(T_e - T_w) \qquad (34)$$

In this simple analytical model, it assumed that U is a constant such that Eq. (34) remains linear. Nonlinear effects are considered in the transient numerical model described below. For radiation, this requires linearizing the heat transfer coefficient according to, $$U_{gain,rad} = \frac{\sigma}{\frac{1}{\epsilon_e} + \frac{1}{\epsilon_w} - 1}(T_e^2 + T_w^2)(T_e + T_w) = \frac{\sigma}{\frac{1}{\epsilon_e} + \frac{1}{\epsilon_s} - 1} 4T_m^3 \qquad (35)$$

where $\epsilon_e$ and $\epsilon_w$ are the emitter and water emittances respectively, and $T_e$ and $T_w$ are representative emitter and water temperature, or alternatively $T_m$ is a representative intermediate temperature.

Assuming $\eta_{opt}$, $\dot{q}_{solar}$, $U_{loss}$, $U_{gain}$ and $T_\infty$ are known, Eq. (34) contains two unknowns $T_e$ and $T_w$ in one equation. However, if the heat flux is sufficiently high (higher than the break-even flux defined later), then the water will reach its boiling point, $T_w = T_b = 100°$ C. At this point the water temperature will be pinned at $T_b$, and any additional energy delivered to the water will go towards phase change (evaporation) rather than further raising the temperature of the water. The minimum input flux for this to occur is that for which $\dot{q}_{gain}=0$, i.e. the absorbed flux just balances the losses. At this break-even point, the heat transfer to the water is zero, which implies $T_e = T_w$. The break-even flux can be found from, $$\dot{q}_{solar,0} = \frac{U_{loss}(T_w - T_\infty)}{\eta_{opt}} \qquad (36)$$

At any flux level $\dot{q}_{solar} > \dot{q}_{solar,0}$, the water will be pinned at is boiling point and any additional heat absorbed by the water will go towards evaporation at the liquid/vapor interface. Therefore, the evaporation process is heat transfer limited, and the evaporation is a function of the heat flux to the water alone, $$j = \frac{\dot{m}}{A} = \frac{\dot{q}_{gain}}{h_{fg}} \qquad (37)$$

where j is the steam mass flux (mass flow rate m per unit absorber area A) and $h_{fg}$ is the latent heat of vaporization. The solar vapor generator 3000 should operate at flux levels $\dot{q}_{solar} > \dot{q}_{solar,0}$, such that the evaporation rate is nonzero, and will therefore assume $T_w = T_b = 100°$ C. for the remainder of the analysis. With $T_w$ known, Eq. (34) can be solved for the emitter temperature, $$T_e = \frac{\eta_{opt}\dot{q}_{solar} + U_{loss}T_\infty + U_{gain}T_w}{U_{loss} + U_{gain}} \qquad (38)$$

The efficiency of the device (ignoring steam superheat to allow comparison with previous work) is defined as, $$\eta = \frac{j \cdot h_{fg}}{\dot{q}_{solar}} = \frac{\dot{q}_{gain}}{\dot{q}_{solar}} = 1 - \frac{\dot{q}_{loss}}{\dot{q}_{solar}} \qquad (39)$$

Substituting in Eq. (38), the efficiency can be solved as a function of $\dot{q}_{solar}$, $$\eta = \frac{U_{gain}(T_e - T_w)}{\dot{q}_{solar}} = \frac{U_{gain}}{U_{loss} + U_{gain}}\left(\eta_{opt} - U_{loss}\frac{T_w - T_\infty}{\dot{q}_{solar}}\right) \qquad (40)$$

Figure 17C:
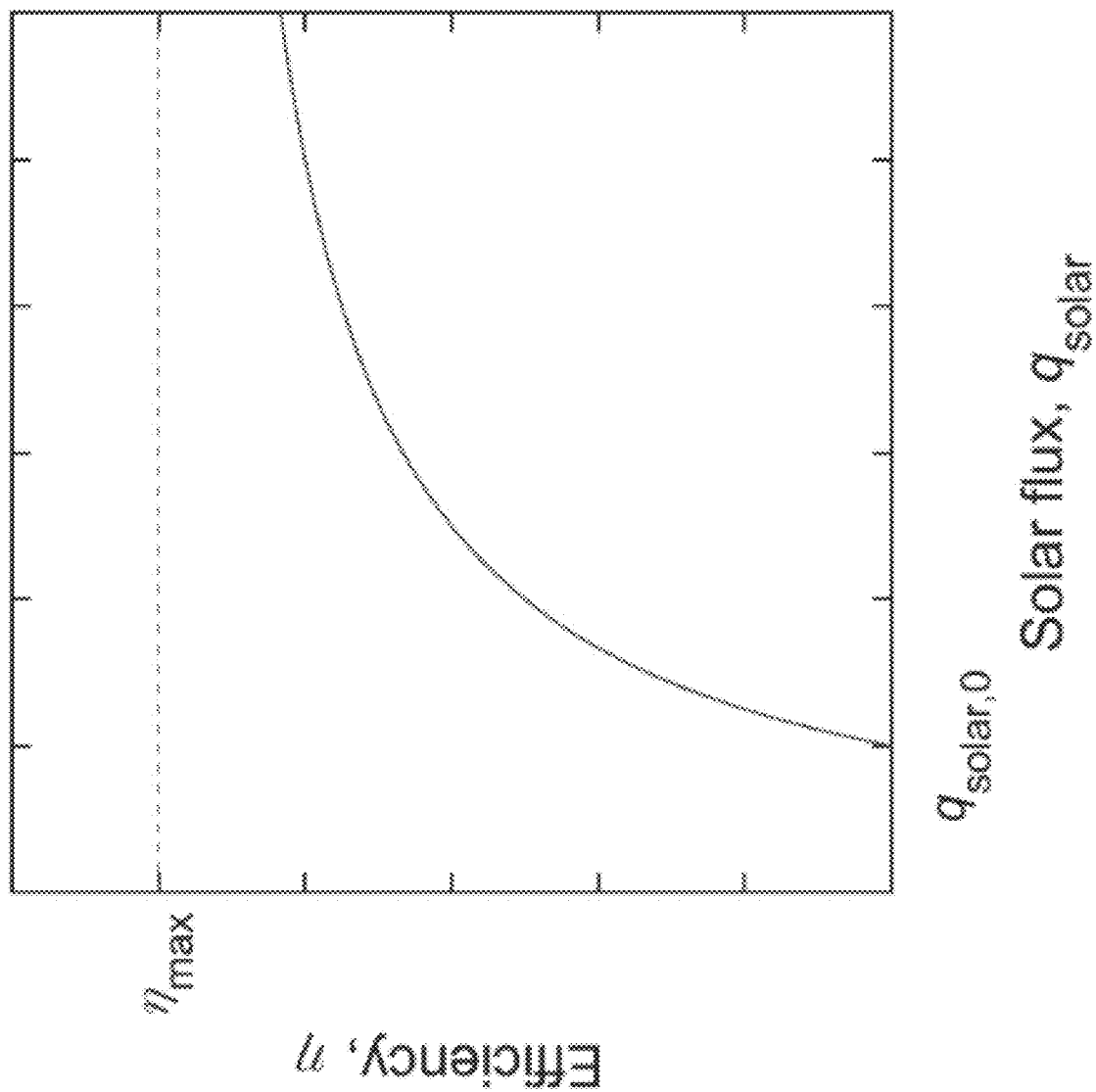
FIG. 17C shows the trend in efficiency as a function of the incident solar flux for the generic passive solar vapor generator of FIG. 17B.

This very general expression for thermal efficiency holds for any passive solar evaporator driven by an input flux $\dot{q}_{solar}$ which delivers heat at $T_w$. The generic efficiency curve is plotted in FIG. 17C and is bound by two characteristic points: the maximum thermal efficiency, $$\eta_{max} = \frac{U_{gain}}{U_{loss} + U_{gain}}\eta_{opt} \qquad (41)$$

and the break-even flux given by Eq. (36). The efficiency curve can be written in terms of the maximum efficiency and the break-even flux, $$\eta = \eta_{max}\left(1 - \frac{\dot{q}_{solar,0}}{\dot{q}_{solar}}\right) \quad (42)$$

The efficiency can also be broken down into the optical and thermal efficiencies, $$\eta = \eta_{opt}\eta_{th} = \eta_{opt}\underbrace{\frac{U_{gain}}{U_{loss}+U_{gain}}\left(1 - \frac{U_{loss}(T_w - T_\infty)}{\dot{q}_{abs}}\right)}_{\eta_{th}} \quad (43)$$

Importantly, this analysis shows that the thermal efficiency cannot be increased to unity by increasing the solar flux, since as $\dot{q}_{solar} \to \infty$, $\eta_{th} \to U_{gain}/(U_{gain}+U_{loss})$. This is a characteristic of the passive nature of the device, resulting from the fact that as $\dot{q}_{solar}$ is increased, the absorber temperature, and thus the losses are increased according to Eq. (38). This is in contrast to an active system, where the temperature can be controlled by increasing the mass flow rate.

The steady-state model presented thus far can predict the steady-state emitter temperature and evaporation efficiency. In the present analysis, the achievable superheat of the steam is also of interest. From the second law of thermodynamics, the absorber is the hottest part of the system, and therefore the steam can, in theory, be heated up to the absorber (emitter) temperature.

Steam superheating is achieved by forcing the generated steam to pass through the absorber, enabling solid-vapor heat transfer which drives the superheating. To be strict, the sensible heat transferred to the steam should be included in the energy balance in Eq. (33). However, it can be shown that for moderate superheats, the sensible heat is relatively small compared to the latent heat of vaporization. As a representative case, consider a case where the steam is superheated to $T_s=160°$ C. The sensible heat is, $$h_{sensible} \, h_g(160°\text{ C.})-h_g(100°\text{ C.})=2796.2 \text{ kJ/kg}-2676.2 \text{ kJ/kg}=120.0 \text{ kJ/kg} \quad (44)$$

where $h_g$ is the specific enthalpy of the vapor at a given temperature which can be found from standard steam tables. The latent heat is, $$h_{fg}(100°\text{ C.})=2257.0 \text{ kJ/kg} \quad (45)$$

The sensible heat amounts to just over 5% of the magnitude of the latent heat. Therefore, it is reasonable to use Eq. (38) to calculate the emitter temperature even for the case when the emitter is used to superheat the steam. Eq. (38) therefore gives an upper limit to the superheated steam temperature for the solar vapor generator 3000 under these assumptions. The amount of heat that can be transferred to the steam is therefore, $$\dot{q}_{s,max}=j\cdot c_{p,s}(T_e-T_w) \quad (46)$$

In reality, less heat will be transferred to the steam and the steam will not completely reach $T_e$. Following heat exchanger analysis methods, a superheater effectiveness $f_{superheater}$ may be defined as the ratio of the actual amount of heat transferred to the steam to the maximum given by Eq. (46) such that, $$\dot{q}_s=f_{superheater}\cdot j\cdot c_{p,s}(T_e-T_w) \quad (47)$$

The resulting superheated steam temperature is, $$T_s = T_w + \frac{\dot{q}_s}{j\cdot c_{p,s}}(T_e - T_w) = T_w + f_{superheater}(T_e - T_w) \quad (48)$$

$$= T_w + f_{superheater}\left(\frac{\eta_{opt}\dot{q}_{solar} + U_{loss}T_\infty + U_{gain}T_w}{U_{loss} + U_{gain}} - T_w\right)$$

Equation (48) and the efficiency definition in Eq. (39) both neglect the sensible heat of the steam above the saturation temperature. The efficiency could be modified to include the sensible heat, $$\eta=j[h_g(T_s)-h_f(T_{ref})]/\dot{q}_{solar} \quad (49)$$

where $h_f$ is the specific enthalpy of the liquid and $T_{ref}$ is a suitable reference temperature. Taking $T_{ref}=100°$ C. accounts for the latent heat of vaporization and the sensible heat from 100° C. to $T_s$. For the range of superheat temperatures achieved in this study, the efficiencies based on Eq. (49) are about 4% higher than those based on Eq. (4).

Eqs. (40) and (48) are the equations of the steady-state model, which can determine the efficiency and steam temperature as a function of the solar flux. FIG. 17A gives a summary of the steady-state model parameters for the laboratory scale solar vapor generator 3000, determined from a best-fit to the experimental data.

Transient Numerical Modeling

A transient numerical model of the solar vapor generator 3000 was derived to expand upon the steady-state model described above to include transient, nonlinear, and multi-dimensional effects, providing greater insight into the operation of the solar vapor generator 3000 in the context of the experimental results shown above. In particular, a transient model is necessary to simulate the performance of the solar vapor generator 3000 in outdoor conditions where the solar input is not constant.

Figure 18A:
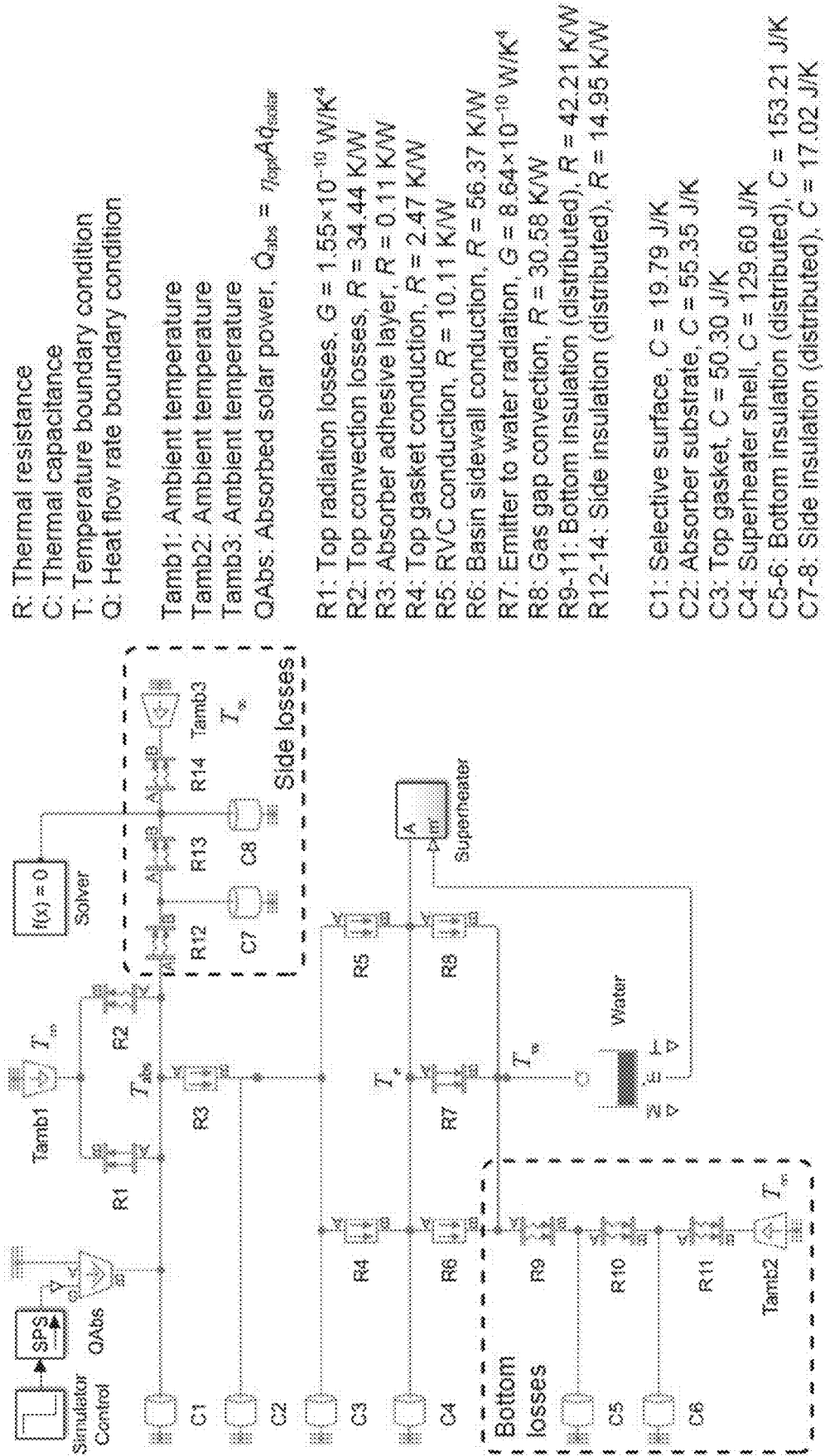
FIG. 18A is an illustration of a thermal circuit used for the transient analysis of the solar vapor generator of FIG. 11A.

The transient numerical model is a quasi-one-dimensional coupled heat and mass transfer model developed using the Simscape package in Matlab Simulink. FIG. 18A gives the equivalent thermal circuit diagram for the model, with R representing thermal resistances and C representing thermal capacitances ($C=mc_p$) of the main components of the device. The "Simulator Control", "SPS" and "Solver" blocks are under-the-hood controls and can be ignored. The portions of the circuit pertaining to the side and bottom losses are outlined, with the remainder of the circuit describing the main path of heat flow from the absorber to the water reservoir. Multidimensional effects are accounted for through a distributed resistance arrangement, e.g. in the bottom loss and side loss sections. The "Water" and "Superheater" blocks are custom-made blocks described in detail below.

The governing equations for the model are as follows. For conduction and convection resistors, $$\frac{dQ}{dt} = \frac{T_A(t) - T_B(t)}{R} \quad (50)$$

where R=1/(UA) for convection and R=L/(kA) for convection. For radiation resistors, $$\frac{dQ}{dt} = G(T_A^4(t) - T_B^4(t)) \quad (51)$$

where $G = \epsilon_{eff} \sigma A$. For capacitances, $$\frac{dQ}{dt} = mc_p \frac{dT}{dt} \quad (52)$$

To handle evaporation a custom-built "Water" block was programmed in the Simscape language in Matlab®. The "Water" component is described by the following governing equation, $$\begin{cases} \frac{dQ}{dt} = -h_{fg}\frac{dm_w}{dt}, \frac{dT_w}{dt} = 0 & \text{for } T_w = T_b \text{ or } m_w > 0 \\ \frac{dQ}{dt} = (m_w c_{p,w} + \\ m_{basin} c_{p,basin})\frac{dT_w}{dt}, \frac{dm_w}{dt} = 0 & \text{otherwise} \\ \dot{m} = \frac{dm_w}{dt} \end{cases} \quad (53)$$

where $m_w$ is the mass of liquid water in the basin, $m_{basin}$ is the mass of the basis itself, and $c_p$ is the specific heat capacity, $T_b$ is the boiling point of water, and m is the steam mass flow rate. The model neglects mass diffusion and therefore predicts a zero evaporation rate for $T<T_b$. Therefore, the small initial mass loss $\Delta m_{heat-up}$ during the heat-up phase (see FIG. 11I) is not predicted by the transient model. Instead the experimental value of $\Delta m_{heat-up}$ is used as an input to the transient model with the modelled curve shifted up by this value when $T_w = 100°$ C. be predicted by the Similarly a "Superheater" block was implemented following the governing equation, $$\frac{dQ}{dt} = f_{superheater} \dot{m} c_{p,s}(T_A - T_b) \quad (54)$$

where $f_{superheater}$ is the superheater effectiveness, $\dot{m} = dm_w/dt$ is the steam mass flow rate, and $c_{p,s}$ is the specific heat capacity of steam. The components are coupled by the conversation of energy at the nodes, $$\sum \frac{dQ}{dt} = 0 \quad (55)$$

The boundary conditions are the ambient temperature and the absorbed solar power input $\dot{Q}_{abs} = \eta_{opt} \dot{q}_{solar} A$. The initial condition comprises the initial temperature of all thermal capacitances (set equal to the ambient temperature) and the initial mass of water in the reservoir. The resulting set of ordinary differential equations (ODEs) was solved numerically using the Runge-Kutta technique with trapezoidal integration, as implemented by the ode23t solver in Simulink®. The simulation time for a single run is approximately 0.5 s.

The model parameters were chosen according to known material properties and geometries, and an informant multidimensional model. The model agrees well with experimental data, as shown in FIGS. 12D and 12 E without additionally fitting indicates the validity of the physical description of the heat transfer and evaporation process. The model parameters which need to be specified are the $R_s$, $G_s$, $C_s$ for the various components, and the effectiveness $\epsilon$ for the superheater. The results for a standard laboratory run are given in FIG. 18A. The following discusses the parameters that affect the transient behaviour most substantially in the solar vapor generator 3000.

It is useful for the subsequent analysis to establish a nominal flow condition for the solar vapor generator 3000. Taking an efficiency of 30% and a solar flux of 1000 W m$^{-2}$, the nominal mass flux can be determined from, $$j = \frac{\eta \dot{q}_{solar}}{h_{fg}} = \frac{0.3 \cdot 1000 \text{ W m}^{-2}}{2257 \text{ J g}^{-1}\text{K}^{-1}} = 0.133 \text{ g s}^{-1}\text{m}^{-2} \quad (56)$$

The corresponding nominal mass flow rate is, $$\dot{m} = jA = 0.133 \text{ g s}^{-1} \text{ m}^{-2} \cdot (0.1524 \text{ m})^2 = 3.1 \text{ mg s}^{-1} = 0.186 \text{ g min}^{-1} = 11.12 \text{ g hr}^{-1} \quad (57)$$

Next, the radiative exchange between the emitter and the water is analysed. It is assumed that the emitter, basin side walls, and water form a three-surface enclosure whose radiative exchange can be determined using the circuit analogy shown in FIG. 18B, where J is the radiosity, and e=emitter, and w=water. Assuming that the sidewalls are perfectly insulated, the net radiative exchange between the emitter and the water may be determined from, $$\dot{Q}_{rad} = G(T_e^4 - T_w^4) = \frac{\sigma T_e^4 - T_w^4}{R_{rad,tot}} \quad (58)$$

Figure 18B:
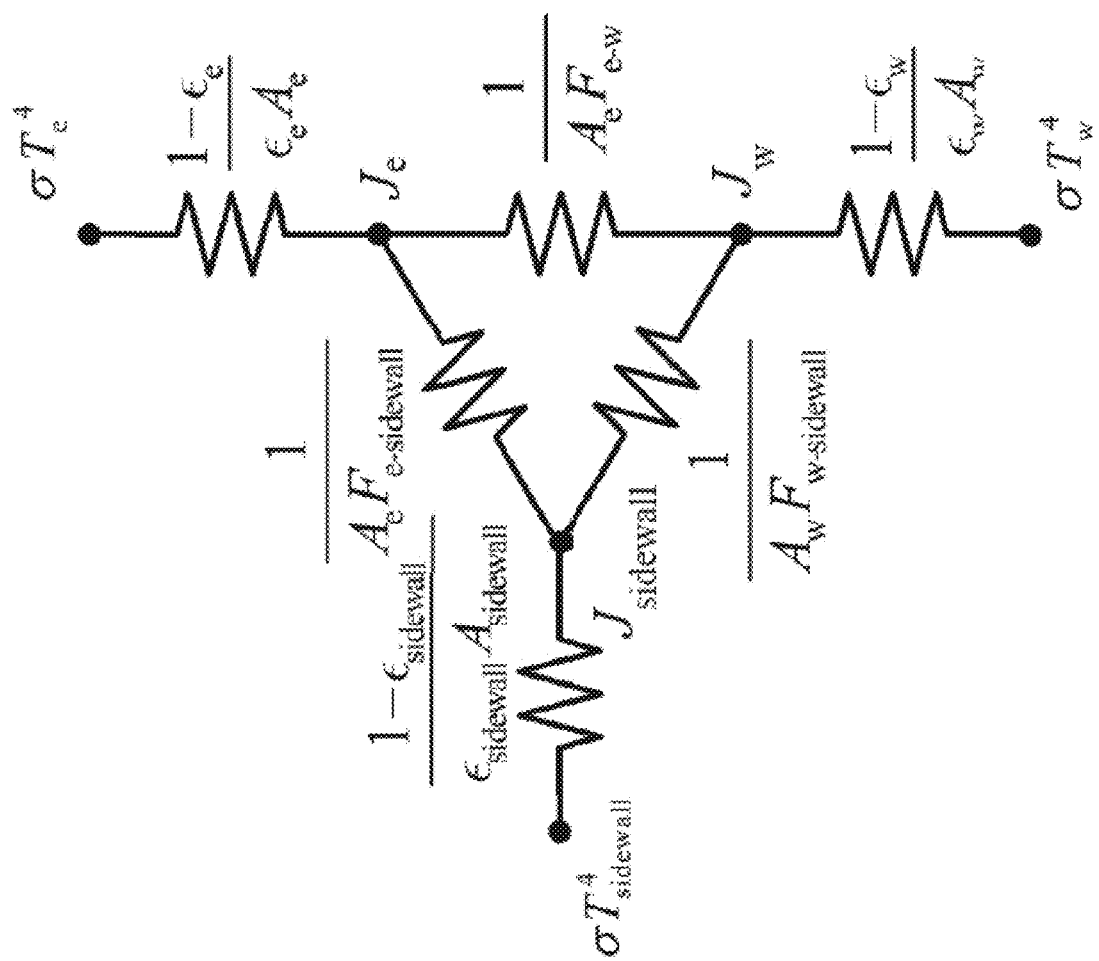
FIG. 18B is an illustration of a circuit representing the radiative exchange between various components of the solar vapor generator of FIG. 11A.

From FIG. 18B, $$R_{rad,tot} = \quad (59)$$
$$\frac{1-\epsilon_e}{A_e \epsilon_e} + \frac{1-\epsilon_w}{A_w \epsilon_w} + \left[\left(\frac{1}{A_e F_{e\text{-sidewall}}} + \frac{1}{A_w F_{w\text{-sidewall}}}\right)^{-1} + A_e F_{e\text{-}w}\right]^{-1}$$

Applying the enclosure and reciprocity relations for the view factors, Eq. (59) simplifies to, $$R_{rad,tot} = \frac{1-\epsilon_e}{A_e \epsilon_e} + \frac{1-\epsilon_w}{A_w \epsilon_w} + \frac{A_e + A_w - 2A_e F_{e\text{-}w}}{A_e A_w - A_e^2 F_{e\text{-}w}^2} \quad (60)$$

Treating the emitter and water surfaces as identical directly opposed squares, the view factor from the emitter to the water can be found from, $$F_{e\text{-}w} = \frac{2}{\pi X^2}\left[\ln\left(\sqrt{\frac{(1+X^2)^2}{1+2X^2}}\right) + 2X\sqrt{1+X^2}\arctan\left(\frac{X}{\sqrt{1+X^2}}\right) - 2X\arctan X\right] \quad (61)$$

where X is the ratio of the side length of the square to separation between the squares. Taking X=14.9 cm/1.5 cm as representative considering the average water height through the experiment, the emitter to water view factor is found to be $F_{e\text{-}w}=0.813$. Taking this and values of $\epsilon_e=0.941$, $\epsilon_w=0.910$, $A_e=0.0223$ m$^2$, $A_w=0.0218$ m$^2$ and plugging in to Eq. (60) gives $G/\sigma=0.0176$ m$^2$. By inspection of Eq. (58), the value $G/(\sigma A_e)$ can be interpreted as the effective emissivity of the system, which amounts to $\in_{\mathit{eff}}$=0.790. For modelling the experiments conducted with the radiation shield, the same methodology was used, except that $\in_w$ was replaced with the effective emissivity from Eq. (12).

Heat transfer through the gas gap is primarily by radiation, but conduction and convection are still present to some degree. A rectangular cavity with heated top surface is inherently stable against buoyancy driven flows, i.e. natural convection, therefore natural convection currents above the water reservoir inside the basin are unlikely. However, there will be a flow caused by the heat-transfer driven evaporation. This upward flow from the water basin through the superheater will affect the temperature distribution in the gas gap, and thusly the conduction through the gas gap. In this analysis, the effect of this upward evaporative flow on the conduction from the superheater to the water through the gas gap is determined.

Figure 18C:
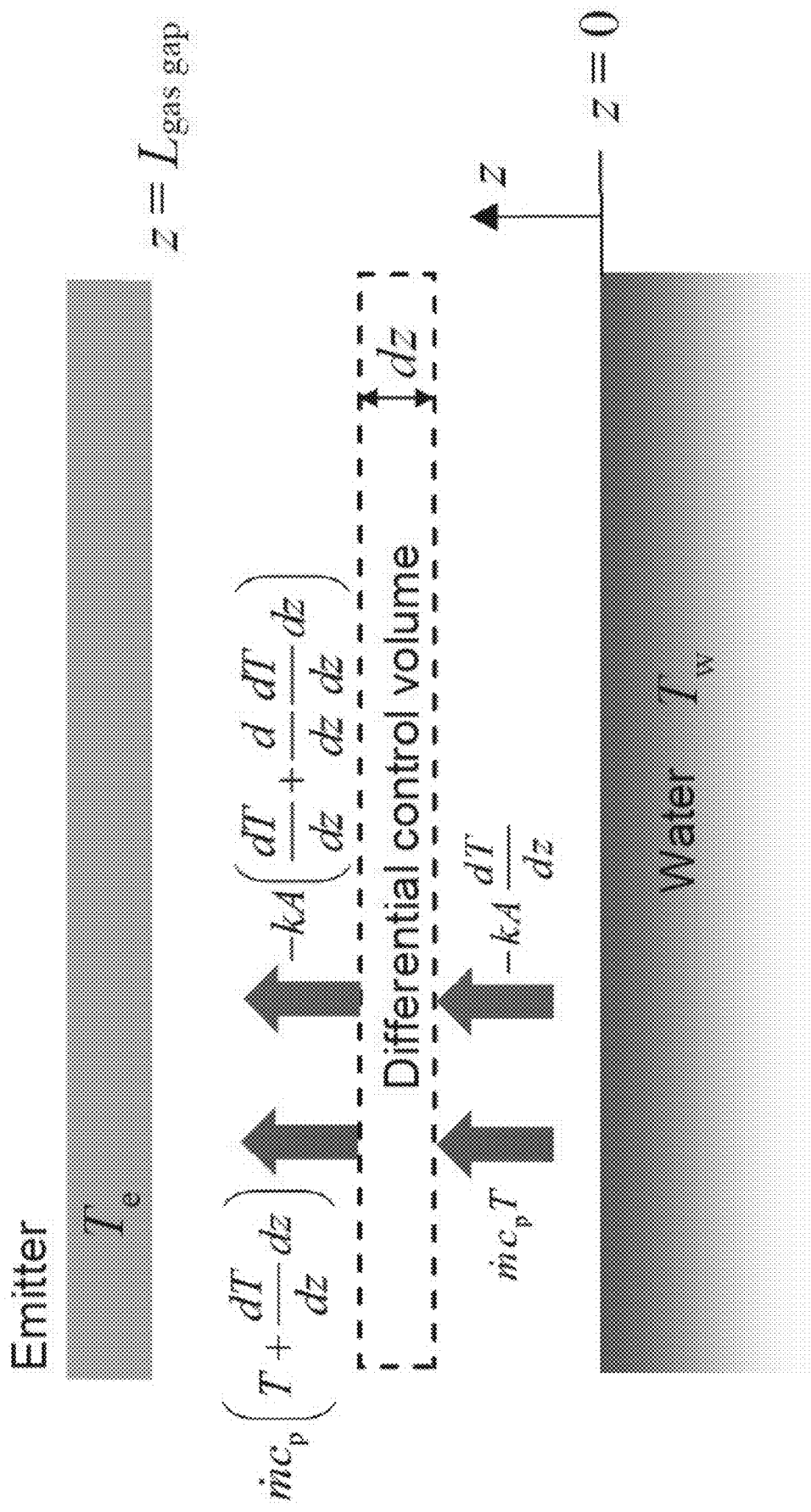
FIG. 18C is an illustration of the energy balance on a differential control volume in a region of a solar vapor generator between an emitter and water.

Consider a generic control volume Adz in the gas gap as shown schematically in FIG. 18C. Assume that evaporation generates a one-dimensional vapor flow rate upward through the gas gap.

An energy balance on the control volume gives, $$-\dot{m}c_{p,s}\frac{dT}{dz} + k_s A \frac{d^2T}{dz^2} = 0 \tag{62}$$

This can be nondimensionalized using the Péclet number, $$Pe = \frac{u}{\alpha_s} L_{gas\,gap} = \frac{\dot{m}/(\rho_s A)}{k_s/(\rho_s c_{p,s})} L_{gas\,gap} = \frac{j c_{p,s} L_{gas\,gap}}{k_s} \tag{63}$$

where u is the steam velocity, $\alpha_s$ is the steam thermal diffusivity, $\rho_s$ is the steam density, $k_s$ is the thermal conductivity of steam, $c_{p,s}$ is the constant pressure specific heat of steam, $\dot{m}$ is the steam mass flow rate, j is the mass flux (per unit area), A is the area, and $L_{gas\,gap}$ is the gas gap size. A Péclet number larger than unity indicates heat transfer dominated by bulk fluid motion, a Péclet number smaller than one indicates heat transfer dominated by stationary conduction, and a Péclet number near one indicates both mechanisms are important. Subbing in to Eq. (62) gives, $$-\frac{Pe}{L_{gas\,gap}} \frac{dT}{dz} + \frac{d^2T}{dz^2} = 0 \tag{64}$$

Twice integrating and solving for T gives, $$T = C_1 + C_2 \exp\left(Pe\frac{z}{L_{gas\,gap}}\right) \tag{65}$$

The boundary conditions are as follows. Let z=0 be the top surface of the water, then $T(z=0)=T_w$. For the upper boundary condition at $z=L_{gas\,gap}$, assume that the steam is at the emitter temperature $T_e$. In the end the heat transfer to the water is of interest, which is related to the local derivative at z=0. Therefore the results are not sensitive to the choice of $T(z=L_{gas\,gap})$. Inserting these boundary conditions gives, $$T(z) = T_w + \frac{\exp\left(Pe\frac{z}{L_{gas\,gap}}\right) - 1}{\exp(Pe) - 1}(T_e - T_w) \tag{66}$$

With the temperature profile known, the heat transfer to the water can be determined from, $$\dot{q}_w = k_s \frac{dT}{dz}\bigg|_{z=0} = k_s \frac{T_e - T_w}{L_{gas\,gap}} \frac{Pe}{\exp(Pe) - 1} \tag{67}$$

For Pe→0, the coefficient Pe/(exp(Pe)−1)→1, and Eq. (67) simplifies to pure conduction, and for Pe→∞, Pe/(exp(Pe)−1)→0 such that there is no nonradiative heat transfer to the water through the gas gap.

Under representative conditions (nominal mass flow rate and steam properties at 373 K), the Péclet number is, $$Pe = \frac{0.133 \text{ g s}^{-1} \text{ m}^{-2} \cdot 2.079 \text{ J g}^{-1}\text{K}^{-1} \cdot 0.015 \text{ m}}{0.025 \text{ W m}^{-1}\text{K}^{-1}} = 0.166 \tag{68}$$

The coefficient is, $$\frac{Pe}{\exp(Pe) - 1} = 0.92 \tag{69}$$

Therefore, the gas gap conduction is slightly less than the pure conduction case that would take place if the gas gap was stationary. For representative conditions, the gas gap heat transfer coefficient is, $$U_{conv,\,gas\,gap} = \tag{70}$$

$$\frac{Pe}{\exp(Pe) - 1} \frac{k_s}{L_{gas\,gap}} = 0.92 \frac{0.025 \text{ W m}^{-1}\text{K}^{-1}}{0.015 \text{ m}} = 1.5 \text{ W m}^{-2}\text{K}^{-1}$$

and the thermal resistance is 30.58 K/W.

In a large-scale system, thermal conduction from the emitter to the water through the sidewall of the basin is substantially small due to the large area-to-perimeter ratio. In the smaller lab-scale device, the sidewall conduction is small, but non-negligible. The conduction thermal resistance is, $$R_{cond} = \frac{L_{sidewall}}{k_{PEI} A_{sidewall}} \tag{71}$$

where $L_{sidewall}$ is the distance between the emitter and the water layer (1.5 cm), $k_{PEI}$ is the thermal conductivity of the basin material (PEI) taken as 0.22 W m$^{-1}$ K$^{-1}$, and $A_{sidewall}$ is the effective conduction area of the sidewall. Due to the complex sidewall geometry (including the assembly screws), the thermal resistance was calculated using a 3D Finite Element Model similar to that described later in this section. The computed thermal resistance was 56.37 K/W.

The Biot number for the water layer is a parameter used to evaluate whether the water can be assumed isothermal. The maximum water depth, $d_w$, under normal conditions is 5 mm. The corresponding Biot number is, $$Bi = \frac{U_{gain}}{k_w/d_w} = \frac{12.8 \text{ W m}^{-2}\text{K}^{-1}}{0.672 \text{ W m}^{-1}\text{K}^{-1}/0.005 \text{ m}} = 0.095 \quad (72)$$

Typically Bi<0.1 signifies that internal temperature gradients are small compared to the external gradient, i.e. that the water layer can effectively be treated as isothermal.

The function of the superheater is to transfer heat from the hot absorber/emitter to the saturated water vapor. To achieve good solid-to-gas heat transfer, a porous reticulated vitreous carbon (RVC) foam was selected (ERG Duocell® 100 PPI). The foam features a high specific surface area (SSA) of 6562 $m^2/m^3$ providing a large area for solid-gas heat exchange.

The superheater can be modeled as a gas-solid heat exchanger following the effectiveness vs. number of transfer units (f-NTU) methodology (the symbol f is used in place of the more common effectiveness symbol ε to avoid being confused with emissivity). Elaborating upon the formulation defined in the steady state model, the effectiveness of a heat exchanger is defined as, $$f \equiv \frac{\dot{Q}}{\dot{Q}_{max}} = \frac{\dot{Q}}{\dot{m}c_p(T_{C,in} - T_{H,in})} \quad (73)$$

where $\dot{Q}$ is the actual total rate of heat transfer in the heat exchanger, and $\dot{Q}_{max}$ is the maximum possible rate of heat transfer which follows from thermodynamic considerations. In the general case $\dot{m}c_p$ is evaluated for the fluid having the lowest heat capacitance rate, $\dot{C}_{min}=\min(\dot{m}c_p)$, $T_{C,in}$ is the coldest part of the heat exchanger (typically the inlet temperature of the colder fluid), and $T_{H,in}$ is the hottest part of the heat exchanger (typically the inlet temperature of the hotter fluid). In this system there is only a single fluid, and $T_{C,in}$ may be taken as the temperature of the vapor at the inlet (saturation temperature) and $T_{H,in}$ as the emitter temperature. Once the effectiveness of the heat exchanger is known, the actual rate of heat transfer to the steam can be determined from Eq. (73).

To determine the effectiveness, the number of transfer units, NTU, a dimensionless quantity representing the available heat exchange area, is required. It is defined as, $$NTU = \frac{UA}{\dot{m}c_p} \quad (74)$$

where U is the overall heat transfer coefficient from the absorber/emitter to the steam, A is the gas-solid heat exchange area, $\dot{m}$ is the steam mass flow rate, and $c_p$ is the constant-pressure specific heat capacity of the steam.

Assuming a minimum Nusselt number of 2 for internal flow, and a nominal pore diameter of 254 μm (based on the nominal linear porosity of 100 pores per inch, approximately 4 pores per mm, with a very narrow pore size distribution) the minimum solid-gas heat transfer coefficient is estimated to be, $$U_{solid\text{-}vapour,RVC} = \frac{Nu \cdot k_s}{d_{pore}} = \frac{2 \cdot 0.025 \text{ W} \cdot \text{m}^{-1}\text{K}^{-1}}{254 \times 10^{-6} \text{ m}} = 197 \text{ W} \cdot \text{m}^{-2}\text{K}^{-1} \quad (75)$$

For the overall heat transfer coefficient, the heat conduction resistance through the RVC foam should also be considered, which is determined using the effective thermal conductivity of the RVC foam reported by the manufacturer, and assuming that, on average, heat conducts through half the thickness of the RVC foam. The resulting resistance is, $$R_{cond,RVC} = \frac{L_{cond,RVC}}{k_{eff,RVC}A_{cond,RVC}} = \frac{3.175 \text{ mm}}{0.05 \text{ W} \cdot \text{m}^{-1}\text{K}^{-1} \cdot 16895 \text{ mm}^2} = 3.76 \text{ K/W} \quad (76)$$

The overall heat transfer coefficient area product is therefore, $$UA_{RVC} = \left(R_{cond,RVC} + \frac{1}{U_{solid\text{-}vapour,RVC} \cdot A_{solid\text{-}vapour,RVC}}\right)^{-1} \quad (77)$$

Where, $$A_{solid\text{-}vapour,RVC} = V_{RVC} \cdot SSA_{RVC} = 107.28 \text{ cm}^3 \cdot 6562 \text{ m}^{-1} = 0.704 \text{ m}^2 \quad (78)$$

which yields, $$UA_{RVC} = (3.76 \text{ K/W} + 0.007 \text{ K/W})^{-1} = 0.265 \text{ W/K} \quad (79)$$

The major contributor to the overall thermal resistance is the conduction through the foam which implies that the design could be improved by using a superheater heat exchange material with improved bulk thermal conductivity such as a graphitic or metallic foam.

Based on nominal mass flow rate, see Eq. (57), of 0.0031 g/s the number of transfer units is, $$NTU = \frac{UA_{RVC}}{\dot{m}_s c_{p,s}} = \frac{0.265 \text{ W/K}}{0.0031 \text{ g/s} \cdot 2.029 \text{ J} \cdot \text{g}^{-1}\text{K}^{-1}} = 42.1 \quad (80)$$

With NTU known, then effectiveness can be determined from standard correlations based on the heat exchanger geometry. Most heat exchanger correlations are developed for fluid-fluid heat exchangers, where both fluids undergo temperature changes as they flow through the heat exchanger. In our case, only the steam is being heated. The sensible heat is a small fraction of the latent heat. Therefore, the emitter energy balance is dominated by heat transfer to the liquid water, i.e. that associated with evaporation, and heat transfer to the steam has only a small effect on the emitter temperature. Therefore, for the purposes of the heat exchanger analysis, the emitter temperature may be assumed to remain constant regardless of the amount of heat delivered to superheat the steam. This implies that the emitter effectively has a heat capacitance rate $\dot{C}max \to \infty$, i.e. its temperature does not change as a result of transferring heat to the steam. This greatly simplifies the heat exchanger analysis because the performance of all heat exchangers with $\dot{C}_{min}/\dot{C}_{max} \to 0$ may be described by a single universal ε-NTU correlation, $$f=1-\exp(-NTU) \tag{81}$$

Substituting the value from Eq. (80) into Eq. (81), the effectiveness of the superheater is approximately 100%, which is not surprising considering the very large heat exchange area of the RVC foam. However, the performance of the superheater in the real system is lower due to several practical considerations: 1) backwards flow and flow mixing which tends to reduce the local temperature difference and heat transfer rates; 2) non-uniform emitter temperature; and 3) vapour cooling in the outlet tube. Experimental observations indicate that these effects reduce the superheater effectiveness to a value of f=0.8, which was subsequently used for all calculations.

As seen in Eq. (40) and (38), achieving high efficiency and emitter (steam) temperature requires reducing $U_{loss}$. This may be achieved through use of a spectrally selective surface to reduce radiation losses, and a glazing system to reduce convection losses.

The layer spacing was chosen to increase thermal resistance. Thermal resistance increases linearly with layer spacing up to the critical spacing for the onset of natural convection, beyond which point the thermal resistance remains relatively constant with increased spacing. The critical spacing occurs when the Rayleigh number reaches its critical value, $$Ra = GrPr = \frac{g\beta Pr}{\nu^2}\Delta T \cdot L^3_{glazing\ gap} = 1708 \tag{82}$$

The Rayleigh number is generally larger at lower mean temperatures, primarily due to β being large at low temperatures. Taking a three-layer stack with spacing 6.2 mm, assuming a 50 K temperature differential across the layer and conservatively evaluating the air properties at 300 K gives, $$Ra=400<1708 \tag{83}$$

Therefore, natural convection is unlikely to occur in the multilayer glazing. This analysis is supported by no observation of fluttering of the thin films during operation, which would be a sign of natural convection currents. For the three-layer polymer glazing used in the final design, the heat transfer coefficient is, $$U_{conv,glazing} = \frac{k_{air}}{3L_{glazing\ gap}} = \frac{0.03\ W\ m^{-1}K^{-1}}{3 \cdot 6.2\ mm} = 1.61\ W\ m^{-2}K^{-1} \tag{84}$$

Radiation losses were reduced by using a spectrally selective absorber. The optical properties of the absorber were measure, as discussed above. Based on representative conditions an emittance of 0.081 was taken for the selective surface. The radiation losses are somewhat higher due to the fact that 4% of the absorber area is covered by polymer screws, which are assumed to have an emittance of 1. The effective emittance is therefore taken as, $$\epsilon_{eff,top}=0.081 \cdot 0.96+1 \cdot 0.04=0.118 \tag{85}$$

Figure 19A:
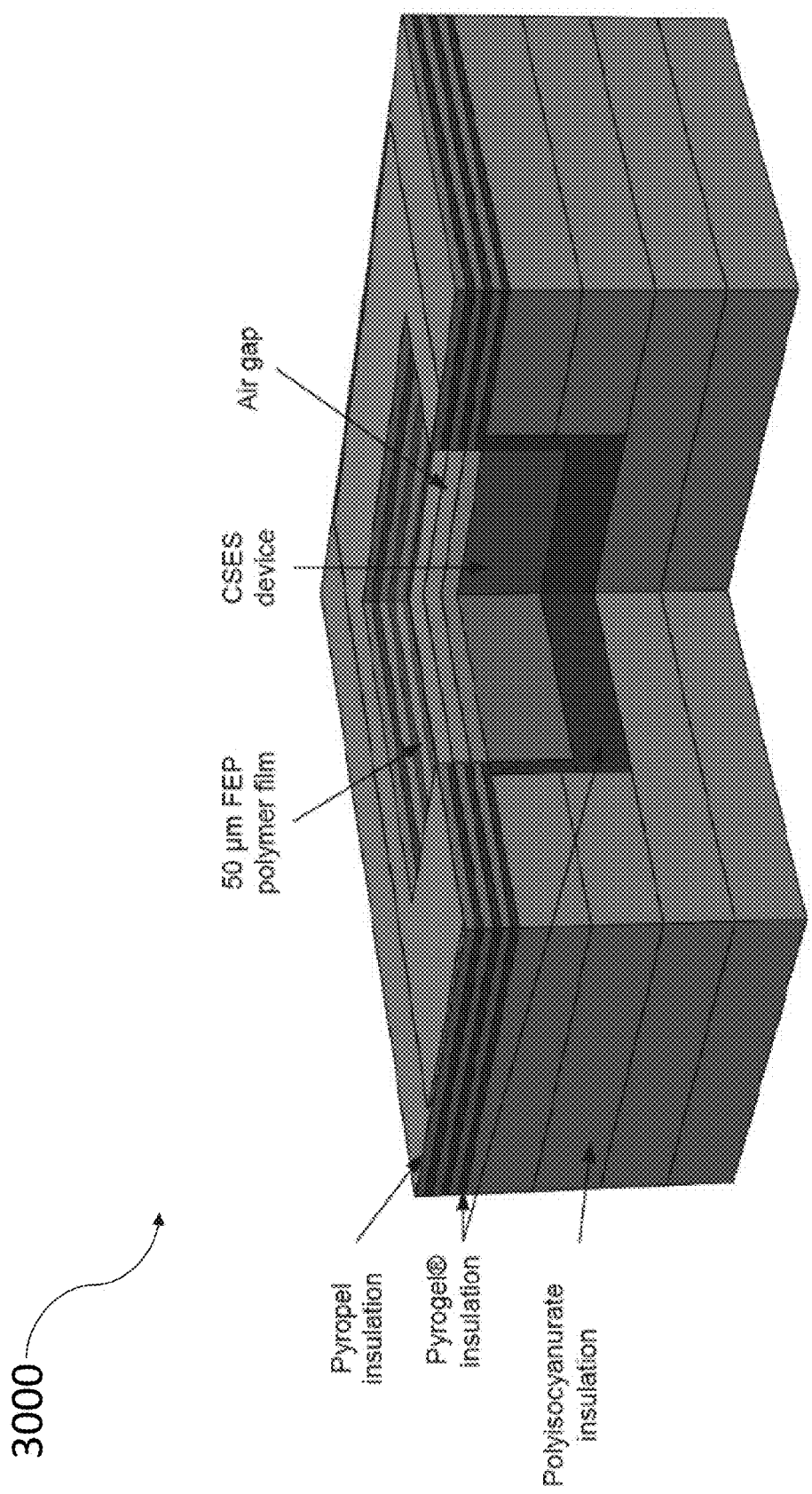
FIG. 19A is a representation of the solar vapor generator of FIG. 11A used to analyze heat losses through the thermally insulating enclosure and the thermally insulating cover.

Due to the aspect ratio (height to width ratio) of the laboratory device, conduction through the insulation may not be properly treated as one-dimensional. Therefore, to inform the transient heat transfer model, a steady-state 3D heat conduction model was developed using the Finite Element Method (FEM) as implemented in the Solidworks Simulation code. FIG. 19A shows a schematic of the model. The solar vapor generator 3000 is represented by a block with a prescribed linear temperature gradient (150° C. on the top and 100° C.) on the bottom to mimic conditions under real operation. The top is insulated by the triple-layer transparent polymer glazing system described above. The space between the FEP layers was treated as stagnant air. Each surface exposed to the environment was assigned a convective boundary condition with $U_{conv}=5\ Wm^{-2}K^{-1}$ and $T_\infty=20°$ C. As the purpose of this model was to determine the multidimensional conduction effects, radiation was not included, and is treated separately in the transient model. Temperature dependent thermal conductivity for all materials was taken from manufacturers' data.

Figure 19B:
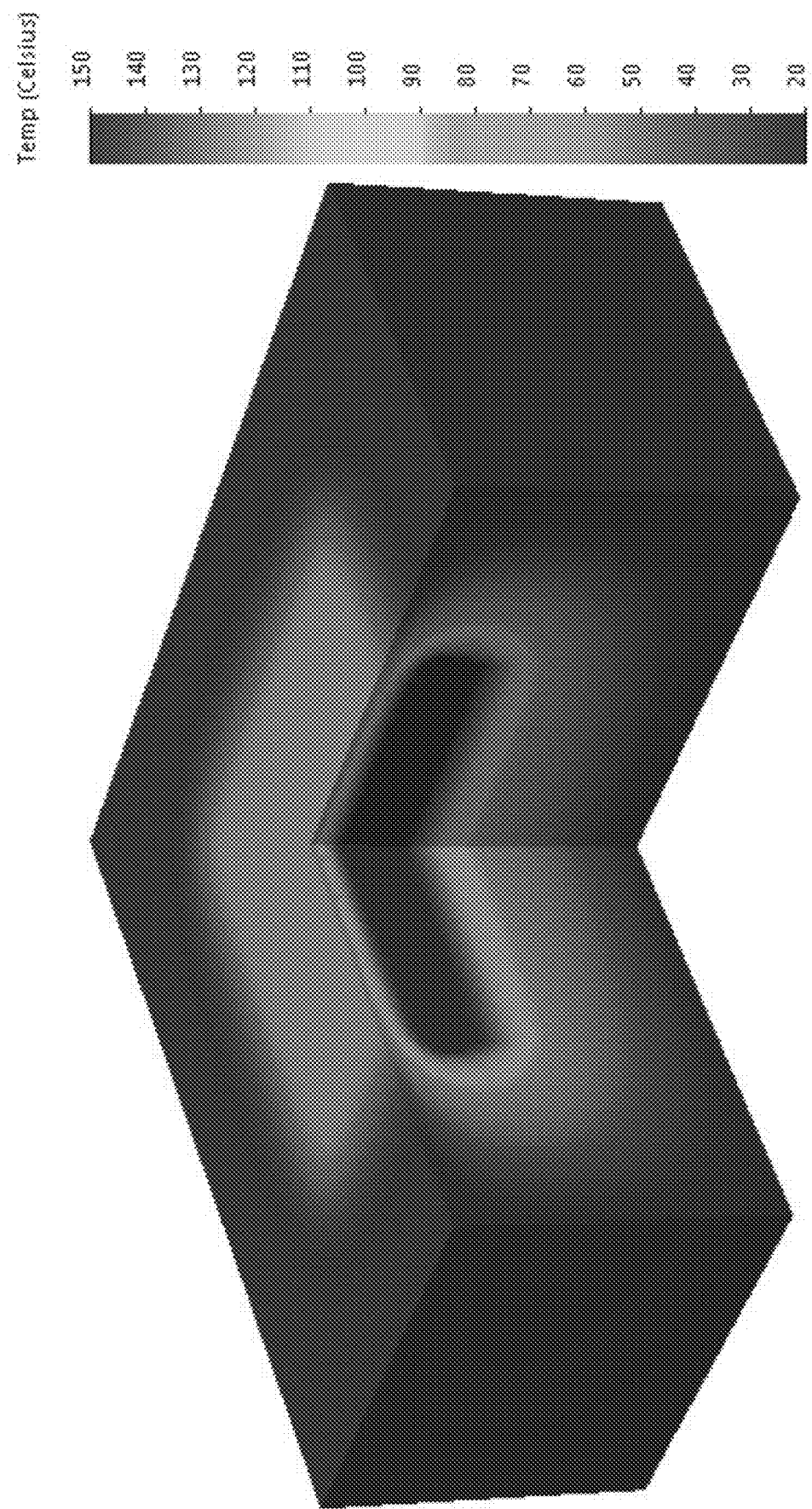
FIG. 19B is a steady-state temperature distribution of the representation of the solar vapor generator shown in FIG. 19A for the case where the absorber temperature is 150° C. and the water and basin temperature are 100° C.

FIG. 19B shows the resulting steady-state temperature distribution through the insulation box. Using the results of the 3D model, the side losses were separated from the top and bottom results using the following methodology. A separate simulation was run where the side insulation was replaced by an adiabatic boundary condition thus forcing one-dimensional conduction in the vertical direction. The heat flux through the top and bottom boundary were then determined from the model. The top and bottom loss heat transfer coefficients were then calculated as, $$U_{top} = \frac{\dot{Q}_{top}}{A\Delta T_{top}} = 1.66\ W\ m^{-2}K^{-1} \tag{86}$$

$$U_{bot} = \frac{\dot{Q}_{bot}}{A\Delta T_{bot}} = 0.87\ W\ m^{-2}K^{-1} \tag{87}$$

The resulting heat transfer coefficients were found to be in close agreement with those calculated analytically according to the one-dimensional heat conduction equation accounting for the thermal resistance of each layer in the top and bottom. The side losses were then determined as the difference in the total losses between the 3D and 1D FEA models difference in heat flow rate, $$\dot{Q}_{side}=\dot{Q}_{3D}-\dot{Q}_{1D} \tag{88}$$

and the side loss heat transfer coefficient was then determined as, $$U_{side} = \frac{\dot{Q}_{side}}{A\Delta T_{top}} = 0.96\ W\ m^{-2}K^{-1} \tag{89}$$

Note that there is some arbitrariness in the definition of the side heat loss coefficient, in terms of which temperature difference to normalize to. The best agreement in terms of the overall heat losses was achieved when normalizing by the absorber-ambient temperature difference $\Delta T_{top}$. Additionally, the side loss heat transfer coefficient was normalized to the absorber area (15.24 cm×15.24 cm). The total conduction/convection heat losses are then calculated according to, $$\dot{Q}_{tot}=U_{top}A\Delta T_{top}+U_{bot}A\Delta T_{bot}+U_{side}A\Delta T_{top} \tag{90}$$

Figure 19C:
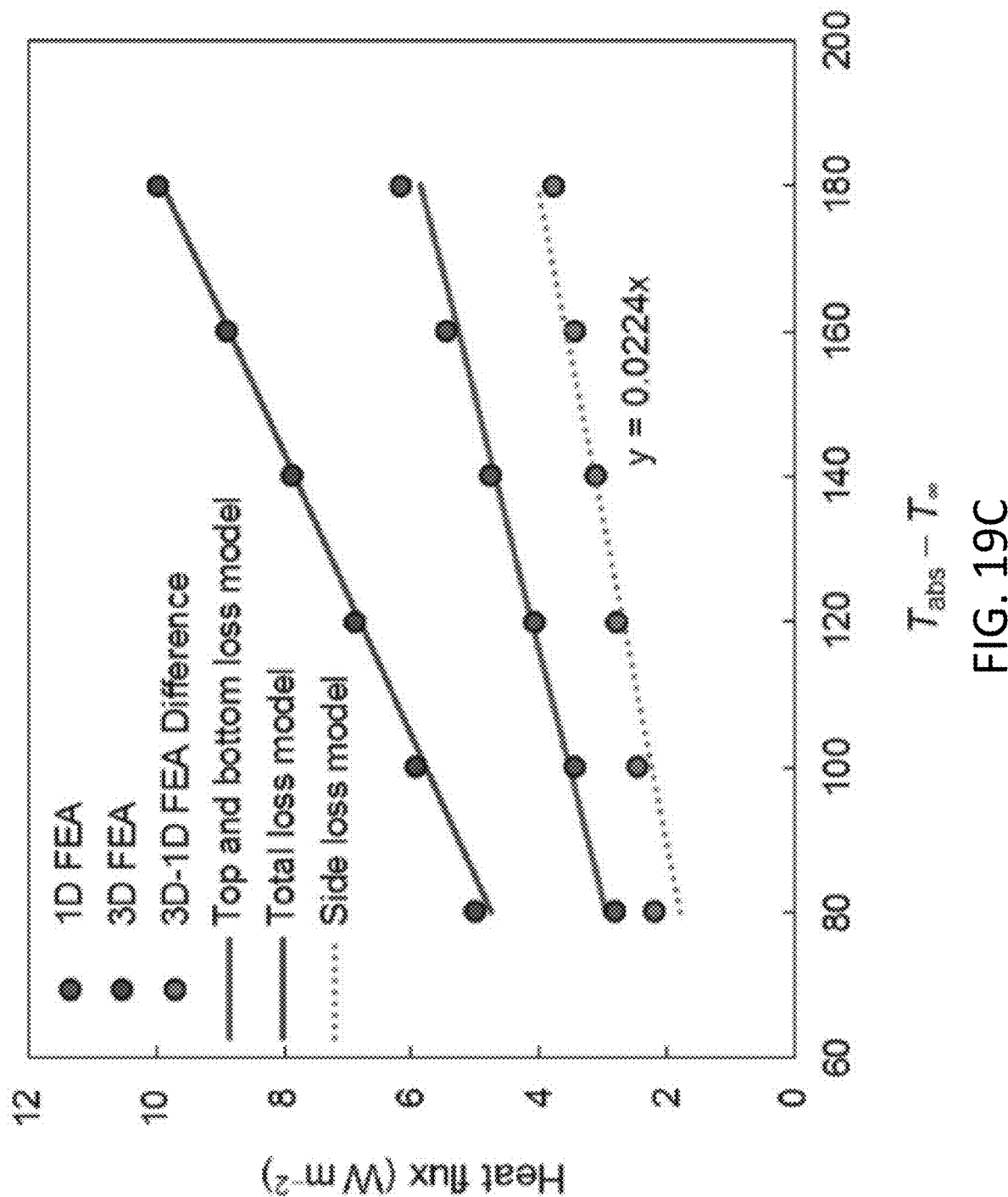
FIG. 19C shows a comparison of simulation results of heat losses and analytical results of heat losses for the solar vapor generator of FIG. 11A.

FIG. 19C gives a comparison between the component loss model described above and the FEA model, showing good agreement over a wide range of absorber temperatures. The main advantage of splitting the total losses into its components is that the effect of side losses can be explored explicitly. As the system is scaled-up, its aspect ratio can be made large enough such that side losses become negligible and heat flow is essentially one-dimensional.

The parasitic losses account for additional sources of loss, primarily due to heat leakage to the environment via conduction through the outlet tube.

Analysis of the Radiation-Shielded Thermocouple

As described above, thermocouple measurements of gas temperatures in radiating environments should be performed with caution. For the solar vapor generator 3000, a custom-built radiation-shielded thermocouple was constructed based on the design shown in FIG. 6B. The following is an analysis of the radiation-shielded thermocouple used in the solar vapor generator 3000.

A net heat flux balance on the thermocouple tip gives, $$0 = \dot{q}_{conv} + \dot{q}_{cond} + \dot{q}_{rad} \\
= U_{conv,TC}(T_s - T_{TC}) + U_{cond,TC}(T_e - T_{TC}) + U_{rad,TC}(T_e - T_{TC}) \quad (91)$$

Assuming the linearized form of the radiation heat transfer coefficient, Eq. (91) may be solved for the thermocouple junction temperature, $$T_{TC} = \frac{U_{conv,TC}}{U_{conv,TC} + U_{cond,TC} + U_{rad,TC}} T_s + \frac{U_{cond,TC} + U_{rad,TC}}{U_{conv,TC} + U_{cond,TC} + U_{rad,TC}} T_e \quad (92)$$

The error may be reduced by reducing $U_{cond,TC}$ and $U_{rad,TC}$, while increasing $U_{conv,TC}$. To determine the convection heat transfer coefficient, the Reynolds number of the steam flow over the thermocouple junction is used. Based on the nominal mass flow rate, the velocity of the steam passing over the thermocouple is, $$u = \frac{4\dot{m}}{\rho_s \pi D_{TC}^2} = \frac{4 \cdot 0.0031 \times 10^{-3} \text{ kg s}^{-1}}{0.55 \text{ kg m}^{-3} \cdot \pi \cdot (3.25 \times 10^{-3} \text{ m})^2} = 0.68 \text{ m s}^{-1} \quad (93)$$

Note that this is the average velocity across D. The velocity in the center of the tube where the thermocouple is located is likely higher. The Reynolds number over the thermocouple tip is, $$Re = \frac{\rho_s u d_{TC}}{\mu_s} = \frac{0.55 \text{ kg m}^{-3} \cdot 0.68 \text{ m s}^{-1} \cdot 0.2 \times 10^{-3} \text{ m}}{1.34 \times 10^{-5} \text{ Pa s}} = 5.6 \quad (94)$$

Using the following Nusselt correlation and taking Pr=1, $$Nu = 2 + (0.4 Re^{1/2} + 0.06 Re^{2/3}) = 2 + (0.4 \cdot 5.6^{1/2} + 0.06 \cdot 5.6^{2/3}) = 3.14 \quad (95)$$

The convective heat transfer coefficient is thus, $$U_{conv,TC} = \frac{Nu \cdot k_s}{d_{TC}} = \frac{3.14 \cdot 0.025 \text{ W m}^{-1}\text{K}^{-1}}{0.2 \times 10^{-3} \text{ m}} = 392 \text{ W m}^{-2}\text{K}^{-1} \quad (96)$$

The conduction heat transfer term accounts for conduction heat transfer from the surroundings to the thermocouple tip through the solid material. The main resistance to conduction is through the length LTC of thermocouple wire. The resistance is, $$R_{cond,TC} = \frac{L_{TC}}{k_{TC} \cdot A_{wire\ cross-section}} = \\
\frac{5 \times 10^{-3} \text{ m}}{30 \text{ W m}^{-1}\text{K}^{-1} \cdot 2 \cdot 0.005 \text{ mm}^2} = 3.33 \times 10^6 \text{ K W}^{-1} \quad (97)$$

To determine the effective heat transfer coefficient, the heat transfer area of the thermocouple tip should be normalized, $$\dot{q}_{cond} = \frac{\dot{Q}_{cond}}{A_{TC}} = \frac{\Delta T}{R_{cond,TC} A_{TC}} = h_{cond} \Delta T \quad (98)$$

$$U_{cond,TC} = \frac{1}{R_{cond,TC} A_{TC}} = \frac{1}{R_{cond} \cdot \pi d^2} \\
= \frac{1}{3.33 \times 10^6 \text{ K W}^{-1} \cdot \pi (0.2 \times 10^{-3} \text{ m})^2} = 2.39 \text{ W m}^{-2}\text{K}^{-1}$$

In the worst case for radiation, the surroundings may be modelled as a blackbody. In this case, a conservative (high) estimate of the radiation heat transfer coefficient is, $$U_{rad,TC} = 4 \in_{TC} \sigma T_m^3 = 4 \cdot 0.1 \cdot \sigma (423 \text{ K})^3 = 1.71 \text{ W m}^{-2}\text{K}^{-1} \quad (99)$$

where $\in_{TC}$ is the emissivity of the thermocouple tip (chromel-alumel) taken as 0.1. Plugging in representative values, a worst-case estimate for the thermocouple tip temperature is, $$T_{TC} = 0.99 T_s + 0.01 T_e \quad (100)$$

In reality, the shield will be at a temperature in between $T_s$ and $T_e$, further reducing the radiation error. Therefore, the radiation error is estimated to be below 1%.

Optical Properties Measurement

The following describes the measurement procedure used to evaluate the optical properties of the materials used in the solar vapor generator 3000, particularly with emphasis on materials in the absorber and the emitter.

The optical properties of relevant materials were measured over a broad wavelength range 250 nm to 25 μm by Ultraviolet-Visible-Near-infrared (UV-Vis-NIR) and Fourier Transform Infrared (FTIR) spectroscopy, using an Agilent Cary 5000 spectrophotometer, and Thermo Fisher Nicolet 6700 Fourier transform infrared spectrometer, respectively. FIG. 20 shows a summary of the most important optical properties for the materials used in the device. All measurements were performed at room temperature. Values reported at elevated temperatures were obtained by averaging the spectral properties by the Planck spectrum at the given temperature.

Fluorinated ethylene propylene (FEP, trade name Toyoflon™) films (thickness 50 μm) were obtained from Toray Advanced Film Co., Ltd. The direct (normal incidence) transmission spectra of the film is given in FIG. 7A.

The solar transmittance may be computed from, $$\tau_{solar} = \frac{\int_{0.25 \, \mu m}^{4 \, \mu m} \tau_\lambda \dot{q}_{solar,\lambda} d\lambda}{\dot{q}_{solar}} \quad (101)$$

where $\dot{q}_{solar,\lambda}$ is the spectral solar irradiance following the global air mass 1.5 (AM1.5G) distribution11, and $\dot{q}_{solar}$ is the total AM1.5G solar irradiance, which integrates to 1000.4 Wm$^{-2}$. Similarly, the infrared transmittance can be determined from, $$\tau_{IR}(T_{bb}) = \frac{\int_{0.25 \, \mu m}^{100 \, \mu m} \tau_\lambda \dot{q}_{bb,\lambda}(T_{bb}) d\lambda}{\sigma T_{bb}^4} \quad (102)$$

where $\dot{q}_{bb,\lambda}(T_{bb})$ is the hemispherical spectral emissive power for a blackbody source at temperature $T_{bb}$ obtained from the Planck distribution. The resulting solar and infrared transmittance are given in FIG. 20.

Solar absorptance was determined from standard 8°/hemispherical reflectance measurements performed using a UV-Vis-NIR integrating sphere coupled to the UV-Vis-NIR spectrometer. The reflectance factor was measured relative to a calibrated Spectralon® diffuse reference standard (Labsphere SRS-99-020) using the substitution method, and the absolute reflectance was subsequently determined. Thermal emissivity was determined from standard 8°/hemispherical reflectance measurements using a diffuse gold integrating sphere coupled to the FTIR spectrometer.

The solar-weighted absorptance αsolar was determined using the averaging procedure of Eq. (101) but replacing $\tau_\lambda$ by $\alpha_\lambda = (1-\rho_\lambda)$ in the integral. Similarly the thermal emissivity $\in(T)$ was determined using the averaging procedure of Eq. (102) but again replacing $\tau_k$ by $\in_{80} = (1-\rho_\lambda)$ in the integral.

The emitter was coated with Zynolyte® Hi-Temp aerosol spray paint in five even layers. The paint was dried at room temperature for 30 minutes and then cured by twice cycling from room temperature to 250° C. on a hot plate, resulting in a uniform diffuse black coating. The emittance was determined by measuring the infrared hemispherical reflectance spectrum via FTIR. The spectral emittance was relatively constant with a measured lower and upper limit value of 90% and 97% over the range 2.5 μm to 20 μm. As a result, the total emittance of the emitter is nearly invariant with temperature, with a value of $\in_e = 0.941 \pm 1\%$ over the range 0° C. to 400° C.

Optical Efficiency of the Absorber

The optical efficiency for the solar vapor generator 3000 used in the experimental studies described above is determined, in part, by the optical properties of the materials characterized, as shown above. The optical efficiency is comprised of three main components, $$\eta_{opt} = \tau_N \cdot \alpha_{solar} \cdot AAF = 0.864 \cdot 0.924 \cdot 0.95 = 75.8\% \quad (103)$$

where $\tau_N$ is the total solar transmittance of the three-layer glazing system, $\alpha_{solar}$ is the solar absorptance of the selective surface, and AAF is the active area fraction, which accounts for portions of the 15.24×15.24 cm absorber area blocked by screws and screw gaskets. The active area fraction amounts to f=95%.

For the total solar transmittance of the FEP glazing system, the internal transmittance the FEP layer may be assumed to be 100%, i.e. losses are only by Fresnel reflection at the interfaces. In this case, the overall transmittance (neglecting the interaction of the glazing system and the absorber) for a system of N layers is, $$\tau_N = \frac{1 - \frac{1-\tau}{1+\tau}}{1 + (2N+1)\frac{1-\tau}{1+\tau}} \quad (104)$$

where τ is the reflectance of a single layer (roughly equal to $\tau_{solar}$ for a single FEP film). For N=3 and τ=0.951 the total transmittance is 86.4%. Note that for high values of τ, the approximate equation holds with good accuracy, $$\tau_N \approx \tau^N \quad (105)$$

Additionally, the error imposed by applying Eq. (104) directly to the solar weighted τ, rather than first applying it to $\tau_\lambda$ and then determining the solar weighted τ is small.

The solar weighted absorptance of the selective surface was determined to be 92.4%. This value will change slightly due to spectral chances imposed by the FEP stack. However, since the FEP transmittance is relatively spectrally flat, the error introduced by this approximation is small. Upon combining the contributions in Eq. (103), the overall optical efficiency to be 75.8%.

CONCLUSION

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A solar vapor generator, comprising:
    an absorber to absorb sunlight and convert the absorbed sunlight to heat;
    a housing, thermally coupled to the absorber, to transfer the heat away from the absorber;
    an emitter, thermally coupled the housing, to receive at least a portion of the heat transported by the housing and to emit the portion of the heat as thermal radiation;
    a basin, mechanically coupled to the housing, to position the emitter such that the emitter is physically separated from a liquid that, when present, absorbs at least some of the thermal radiation and thereby undergoes vaporization to generate a vapor,
    wherein:
    the housing comprises:
        an interior cavity;
        an opening to admit the generated vapor into the interior cavity of the housing such that the vapor, when present, receives a portion of the heat from the housing as the vapor flows through the interior cavity; and
        an outlet for the vapor to flow out of the solar vapor generator; and
    the basin is substantially sealed such that vaporization increases an internal pressure within the basin thereby causing the vapor to flow into the interior cavity defined by the housing.

2. The solar vapor generator of claim 1, wherein the interior cavity of the housing is filled, at least in part, by at least one of a porous material or a finned channel.

3. The solar vapor generator of claim 1, wherein the housing is formed from at least one of aluminum, copper, carbon steel, stainless steel, polypropylene, or polyethylene.

4. The solar vapor generator of claim 1, further comprising the liquid, wherein the liquid is at least one of water, glycol, hydrofluorocarbons, hydrocarbons, or perfluorocarbons.

5. The solar vapor generator of claim 1, wherein the basin comprises:
    a plurality of sidewalls, forming a cavity with a first end and second end, to contain the liquid when present,
    wherein, the first end is substantially open and mechanically coupled to the first side of the emitter, wherein the second end is substantially closed.

6. The solar vapor generator of claim 1, wherein a first portion of the liquid proximate to the emitter and including a surface of the liquid substantially absorbs the thermal radiation, and wherein the basin comprises:
    a plurality of sidewalls, forming a cavity with a first end and second end, the first end being substantially open and mechanically coupled to the first side of the emitter, the second end being substantially open and submerged in the liquid; and
    a thermally insulating layer, disposed within the cavity defined by the plurality of sidewalls and submerged in the liquid, to substantially reduce the transport of heat from the first portion of the liquid to the remaining liquid, the thermally insulating layer having one or more perforations to allow the liquid to flow through the thermally insulating layer.

7. The solar vapor generator of claim 6, wherein the thermally insulating layer provides sufficient buoyancy such that the absorber, the housing, and the emitter floats on the liquid when present.

8. The solar vapor generator of claim 6, further comprising:
at least one of a buoy or a weight, mechanically coupled to at least one of the housing or the basin, to adjust the position of the thermally insulating layer within the liquid when present.

9. The solar vapor generator of claim 1, further comprising:
a radiation shield, disposed between the emitter and the liquid, to control the temperature of the vapor by reflecting a first portion of the thermal radiation back to the emitter, the radiation shield having an aperture to transmit a second portion of the thermal radiation towards the liquid.

10. A solar vapor generator, comprising:
an absorber to absorb sunlight, wherein the sunlight is converted to heat by the absorber;
a housing, disposed on a first side of the absorber, to transport the heat away from the absorber;
an emitter, disposed on a first side of the housing, to receive at least a portion of the heat and to emit the portion of the heat as thermal radiation; and
a basin disposed on a first side of the emitter and coupled to the housing, to contain a liquid that, when present, is physically separated from the emitter to absorb at least some of the thermal radiation and thereby undergo vaporization to generate a vapor, wherein the housing includes at least one opening so as to allow the vapor to flow through the at least one opening into an interior cavity of the housing, wherein the vapor receives a portion of the heat from the housing as it flows along a path through the interior cavity, wherein the housing includes an outlet for vapor to flow out of the solar vapor generator, the outlet being a tubular pipe that is partially inserted through a second opening disposed on a second side of the housing located between the absorber and the emitter.

11. The solar vapor generator of claim 10, wherein the emitter emits the thermal radiation at one or more wavelengths corresponding to one or more absorption bands of the liquid, wherein each one of the absorption bands has a penetration depth up to 100 μm in the liquid, when present.

12. The solar vapor generator of claim 10, further comprising:
a thermally insulating cover, disposed on a second side of the absorber, to thermally insulate the absorber from a surrounding environment, the thermally insulating cover including a first portion that is substantially transparent to the sunlight, the first portion being aligned to the absorber.

13. The solar vapor generator of claim 12, wherein the thermally insulating cover is at least one of a polymer glazing with one or more layers, or an aerogel, or an evacuated space.

14. The solar vapor generator of claim 10, further comprising:
a thermally insulating enclosure, substantially surrounding the absorber, the housing, the emitter, and the basin, to substantially inhibit the transfer of heat from the solar vapor generator to a surrounding environment.

15. The solar vapor generator of claim 10, further comprising:
a solar concentrator, in optical communication with the absorber, to increase the intensity of the sunlight from about 1 sun to about 20 suns.

16. A method of generating vapor, the method comprising:
absorbing at least a portion of sunlight incident on an absorber disposed on a first side of a housing;
converting, by the absorber, at least a portion of the absorbed sunlight to heat;
transferring the heat from the absorber to an emitter disposed on a second side of the housing opposite the first side of the housing;
emitting a first portion of the heat as thermal radiation from the emitter to a first liquid contained in a basin disposed on a first side of the emitter and coupled to the housing so as to cause the first liquid to vaporize and produce a vapor, the production of the vapor increasing the internal pressure in the basin, wherein the emitter is physically separated from the first liquid;
using the internal pressure to drive the vapor to flow into an interior cavity defined by the housing through an opening on the second side of the housing, along a tortuous path through the interior cavity, and out of an outlet disposed on a third side of the housing located between the absorber and the emitter; and
while the vapor flows along the tortuous path, heating the vapor using a second portion of the heat from the absorber.

17. The method of claim 16, further comprising:
varying an intensity of the sunlight from about 0.5 suns to about 20 suns.

18. The method of claim 16, further comprising:
storing a third portion of the heat from the absorber in a thermal storage media; and
controllably generating or controllably heating the vapor based at least in part on the stored portion of the heat in the thermal storage media.

19. The method of claim 16, further comprising:
removing heat from the vapor so as to condense the vapor into a second liquid; and
transporting at least a portion of the heat removed from the vapor back to the emitter to evaporate the first liquid.

20. The method of claim 16, further comprising:
restricting a flow of the vapor so as to increase the pressure of the first liquid; and
directing the flow of the vapor into one or more heat exchangers.

21. The method of claim 20, wherein the one or more heat exchangers includes a second heat exchanger and further comprising:
emitting a portion of the heat from the vapor as thermal radiation from a second emitter to a second liquid physically separated from the second emitter so as to cause the second liquid to vaporize and produce a second vapor,
wherein the second emitter and the second liquid are disposed in the second heat exchanger.

22. The method of claim 20, wherein the one or more heat exchangers includes a second heat exchanger and further comprising:
transferring a portion of the heat from the vapor to a second liquid via at least one of thermal conduction and thermal convection;

absorbing at least a portion of sunlight incident on a second absorber;
converting, by the second absorber, at least a portion of the absorbed sunlight to a second heat;
transferring the second heat from the second absorber to a second emitter;
emitting a first portion of the second heat as thermal radiation from the second emitter to the second liquid, the combination of the portion of the heat from the vapor and the first portion of the second heat causing the second liquid to vaporize and produce a second vapor, wherein the second emitter is physically separated from the second liquid; and
heating the second vapor using a portion of the second heat from the second absorber,
wherein the second liquid, the second absorber, and the second emitter are disposed in the second heat exchanger.

23. The method of claim 20, wherein the one or more heat exchangers includes a second heat exchanger and further comprising:
transferring a portion of the heat from the vapor to a second liquid via at least one of thermal conduction and thermal convection so as to cause the second liquid to vaporize and produce a second vapor,
wherein the second liquid is disposed in the second heat exchanger.

* * * * *